US012809118B2

(12) United States Patent
Chen et al.

(10) Patent No.: US 12,809,118 B2
(45) **Date of Patent: *Nov. 24, 2026**

(54) LENS DRIVING MODULE, PHOTOGRAPHING CAMERA AND ELECTRONIC DEVICE

(71) Applicant: LARGAN DIGITAL CO., LTD., Taichung City (TW)

(72) Inventors: Hao Jan Chen, Taichung City (TW); Yu Chen Lai, Taichung City (TW); Ming-Ta Chou, Taichung City (TW); Te-Sheng Tseng, Taichung City (TW)

(73) Assignee: LARGAN DIGITAL CO., LTD., Taichung City (TW)

( * ) Notice: Subject to any disclaimer, the term of this patent is extended or adjusted under 35 U.S.C. 154(b) by 232 days.

This patent is subject to a terminal disclaimer.

(21) Appl. No.: 18/774,463

(22) Filed: Jul. 16, 2024

(65) Prior Publication Data

US 2024/0369806 A1 Nov. 7, 2024

Related U.S. Application Data

(63) Continuation of application No. 17/239,228, filed on Apr. 23, 2021, now Pat. No. 12,066,691.

(30) Foreign Application Priority Data

Feb. 3, 2021 (TW) ................................ 110103923

(51) Int. Cl.
*G02B 7/09* (2021.01)
*G03B 13/36* (2021.01)

(52) U.S. Cl.
CPC ............... *G02B 7/09* (2013.01); *G03B 13/36* (2013.01)

(58) Field of Classification Search
CPC .. G03B 5/00; G03B 13/36; G03B 2205/0007; G03B 2205/0053; G03B 2205/0069;
(Continued)

(56) References Cited

U.S. PATENT DOCUMENTS 10,761,403 B2 9/2020 Wang et al.
10,816,756 B2 10/2020 Lee
(Continued)

FOREIGN PATENT DOCUMENTS

CN 208337697 U 1/2019
CN 110082878 A 8/2019
(Continued)

*Primary Examiner* — Marin Pichler
(74) *Attorney, Agent, or Firm* — Maschoff Brennan

(57) ABSTRACT

A lens driving module is configured to provide an imaging lens system with auto-focus functionality. The imaging lens system is disposed between a preloading element and a driving base of the lens driving module. The preloading element includes an injection molded part and a ferromagnetic part partially embedded in the injection molded part. A rollable element is disposed in each of mounting structures of the injection molded part and in contact with a displaceable lens carrier of the imaging lens system. The ferromagnetic part and a magnet disposed on the displaceable lens carrier together generate a magnetic attraction force, such that the displaceable lens carrier exerts a preloading force on the rollable element. The driving base includes a driving coil and an electrical wiring pattern. The driving coil corresponds to the magnet for generating a driving force to drive the displaceable lens carrier to move along the optical axis.

21 Claims, 45 Drawing Sheets

(58) Field of Classification Search
CPC ... G03B 3/02; G03B 3/10; G03B 5/04; G03B 30/00; G02B 7/021; G02B 7/08; G02B 7/09; G02B 7/10; G02B 9/62; G02B 13/001; G02B 13/0065; G02B 27/646; H04N 5/2253; H04N 5/2254; H04N 5/2257; H04N 5/23287; H02K 11/33; H02K 11/215; H02K 41/0356
See application file for complete search history.

(56) References Cited

U.S. PATENT DOCUMENTS

| | | | | |
|---|---|---|---|---|
| 11,159,727 | B2 | 10/2021 | Lee et al. | |
| 11,336,830 | B2 | 5/2022 | Shabtay et al. | |
| 2020/0127548 | A1 | 4/2020 | Yeon | |
| 2021/0124145 | A1 | 4/2021 | Zhang | |
| 2021/0231904 | A1 * | 7/2021 | Son | G03B 30/00 |
| 2022/0171157 | A1 | 6/2022 | Roh | |
| 2022/0239808 | A1 | 7/2022 | Jang | |

FOREIGN PATENT DOCUMENTS

| | | | |
|---|---|---|---|
| CN | 210038296 | U | 2/2020 |
| CN | 111175952 | A | 5/2020 |
| CN | 210776140 | U | 6/2020 |
| CN | 111615822 | A | 9/2020 |
| CN | 112104799 | A | 12/2020 |
| KR | 10-2018-0098463 | A | 9/2018 |
| KR | 10-2019-0128279 | A | 11/2019 |
| KR | 10-2020-0012421 | A | 2/2020 |
| KR | 1020200047275 | A | 5/2020 |

* cited by examiner

LENS DRIVING MODULE, PHOTOGRAPHING CAMERA AND ELECTRONIC DEVICE

RELATED APPLICATIONS

This application is a continuation patent application of U.S. application Ser. No. 17/239,228, filed on Apr. 23, 2021, which claims priority to Taiwan Application 110103923, filed on Feb. 3, 2021, which is incorporated by reference herein in its entirety.

BACKGROUND

Technical Field

The present disclosure relates to a lens driving module, a photographing camera and an electronic device, more particularly to a lens driving module and a photographing camera applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

In recent years, there is an increasing demand for electronic devices featuring compact size, but conventional optical systems, especially the telephoto optical systems with a long focal length, are difficult to meet both the requirements of high image quality and compactness. Conventional camera modules usually have functionalities such as auto focus, optical image stabilization and optical zoom. However, in order to achieve the above functionalities, the structure of the camera modules becomes more complex and the size thereof also increases, and thus, the size of electronic devices equipped with the camera modules also increases. In addition, in order to achieve auto focus and optical zoom functionalities, it is necessary to have a design of extra space with a predetermined length for stroke movement of displaceable components along the optical axis in the camera modules. However, due to the size limitation of camera modules, it is difficult to achieve both the requirements of long stroke length of displaceable components and module compactness.

SUMMARY

According to one aspect of the present disclosure, a lens driving module is configured to provide an imaging lens system with auto-focus functionality. The imaging lens system includes a plurality of lens elements and at least one displaceable lens carrier. The plurality of lens elements are arranged along an optical axis of the imaging lens system. At least one of the plurality of lens elements is disposed on the at least one displaceable lens carrier, and the at least one displaceable lens carrier is displaceable along the optical axis.

The lens driving module includes a preloading element, a driving base and at least one first magnet. The imaging lens system is disposed between the preloading element and the driving base. The at least one first magnet is disposed on the at least one displaceable lens carrier.

The preloading element includes an injection molded part and a ferromagnetic part. The injection molded part includes a plurality of mounting structures. At least one rollable element is disposed in each of the plurality of mounting structures, and the at least one rollable element is in contact with the at least one displaceable lens carrier and configured to provide the at least one displaceable lens carrier with a degree of freedom in a direction parallel to the optical axis. The ferromagnetic part is at least partially embedded in the injection molded part. The ferromagnetic part and the at least one first magnet together generate a magnetic attraction force, such that the at least one displaceable lens carrier exerts a preloading force on the at least one rollable element in each of the plurality of mounting structures. The driving base and the preloading element are located on opposite sides of the at least one displaceable lens carrier in a direction of the preloading force.

The driving base includes at least one driving coil and an electrical wiring pattern. The at least one driving coil is disposed corresponding to the at least one first magnet. The at least one driving coil and the at least one first magnet are configured to generate a driving force so as to drive the at least one displaceable lens carrier to move along the optical axis. The electrical wiring pattern is electrically connected to the at least one driving coil. The at least one driving coil and the at least one rollable element are located on opposite sides of the at least one displaceable lens carrier in the direction of the preloading force (that is, the direction along which the preloading force acts).

According to another aspect of the present disclosure, a lens driving module is configured to provide an imaging lens system with auto-focus functionality. The imaging lens system includes a plurality of lens elements and at least one displaceable lens carrier. The plurality of lens elements are arranged along an optical axis of the imaging lens system. At least one of the plurality of lens elements is disposed on the at least one displaceable lens carrier, and the at least one displaceable lens carrier is displaceable along the optical axis. The lens driving module includes a preloading element, a driving base, at least one first magnet and at least one second magnet. The imaging lens system is disposed between the preloading element and the driving base, and the at least one first magnet and the at least one second magnet are disposed on the at least one displaceable lens carrier.

The preloading element includes an injection molded part and a ferromagnetic part. The injection molded part includes a plurality of mounting structures. At least one rollable element is disposed in each of the plurality of mounting structures, and the rollable element is in contact with the at least one displaceable lens carrier and configured to provide the at least one displaceable lens carrier with a degree of freedom in a direction parallel to the optical axis. The ferromagnetic part is at least partially embedded in the injection molded part. The ferromagnetic part and the at least one second magnet together generate a magnetic attraction force, such that the at least one displaceable lens carrier exerts a preloading force on the at least one rollable element in each of the plurality of mounting structures. The driving base and the preloading element are located on opposite sides of the at least one displaceable lens carrier in a direction of the preloading force.

The driving base includes at least one driving coil and an electrical wiring pattern. The at least one driving coil is disposed corresponding to the at least one first magnet. The at least one driving coil and the at least one first magnet are configured to generate a driving force so as to drive the at least one displaceable lens carrier to move along the optical axis. The at least one first magnet is located farther away from the ferromagnetic part than the at least one second magnet is located relative to the ferromagnetic part. The electrical wiring pattern is electrically connected to the at least one driving coil. The at least one driving coil and the at least one rollable element are located on opposite sides of the at least one displaceable lens carrier in the direction of the preloading force.

According to another aspect of the present disclosure, a photographing camera includes one of the aforementioned lens driving modules, an imaging lens system and a light-folding element. The imaging lens system includes a plurality of lens elements and at least one displaceable lens carrier. The plurality of lens elements are arranged along an optical axis of the imaging lens system. At least one of the plurality of lens elements is disposed on the at least one displaceable lens carrier. The at least one displaceable lens carrier is displaceable along the optical axis. The light-folding element is disposed on an object side or an image side of the imaging lens system.

According to another aspect of the present disclosure, an electronic device includes the aforementioned photographing camera and an image sensor, and the image sensor is disposed on an image surface of the imaging lens system.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
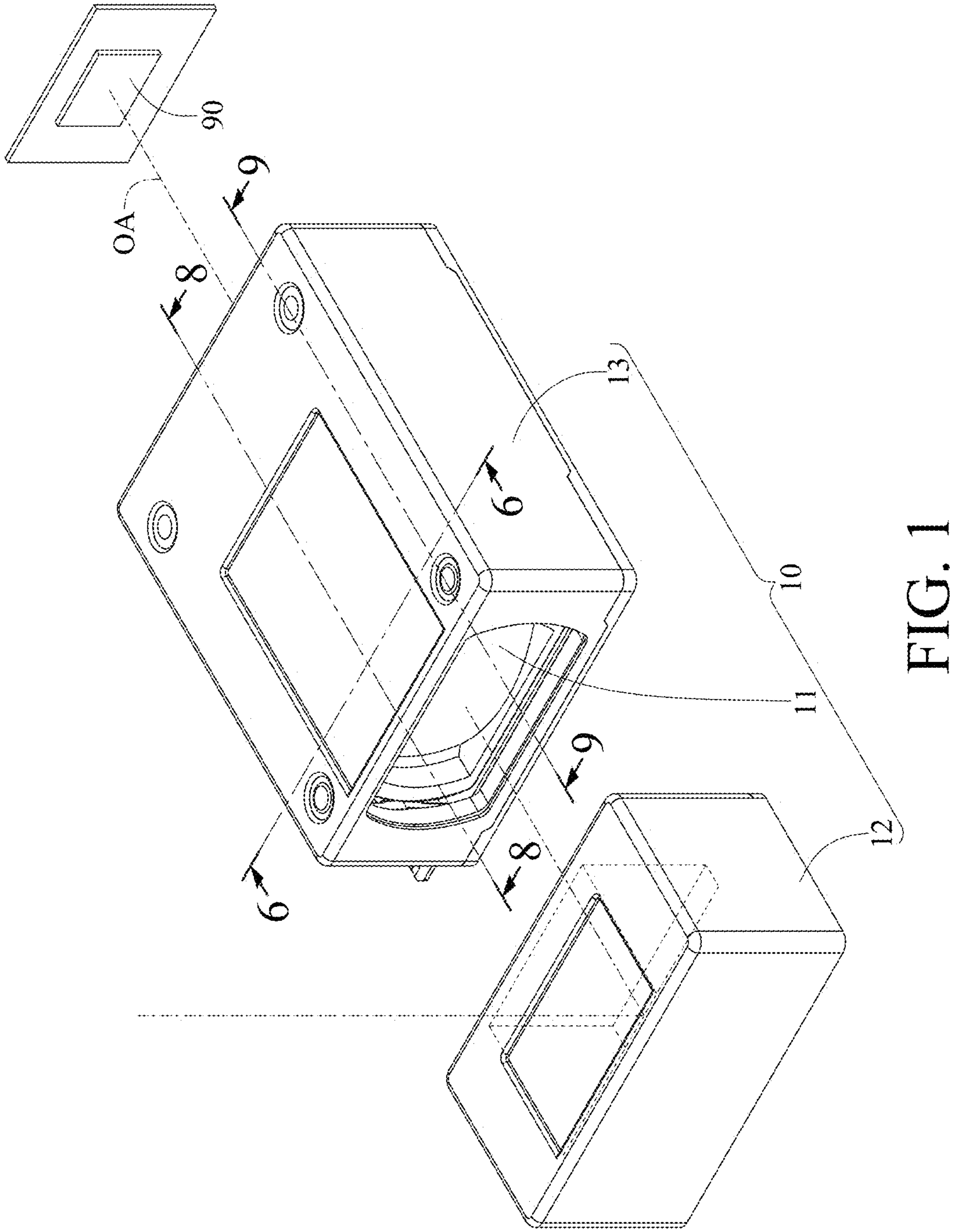
FIG. 1 is a perspective view of a photographing camera and an image sensor according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides a lens driving module configured to provide an imaging lens system with autofocus functionality. The imaging lens system includes a plurality of lens elements and at least one displaceable lens carrier. The plurality of lens elements are arranged along an optical axis of the imaging lens system. At least one of the plurality of lens elements is disposed on the displaceable lens carrier, and the displaceable lens carrier is displaceable along the optical axis.

The lens driving module includes a preloading element, a driving base and at least one first magnet. The imaging lens system is disposed between the preloading element and the driving base, and the first magnet is disposed on the displaceable lens carrier.

The preloading element includes an injection molded part and a ferromagnetic part. The injection molded part includes a plurality of mounting structures and a plurality of rollable elements which are disposed in respective mounting structures. As to each of the mounting structures, at least one of the rollable elements is disposed in said mounting structure, and the rollable elements are in contact with the displaceable lens carrier and configured to provide the displaceable lens carrier with a degree of freedom in a direction parallel to the optical axis. The ferromagnetic part is at least partially embedded in the injection molded part. The ferromagnetic part and the first magnet together can generate a magnetic attraction force, such that the displaceable lens carrier exerts a preloading force on the rollable elements.

The driving base and the preloading element are located on opposite sides of the displaceable lens carrier in a direction along which the preloading force acts. The driving base includes at least one driving coil and an electrical wiring pattern. The driving coil is disposed corresponding to the first magnet, and the driving coil and the first magnet are configured to generate a driving force so as to drive the displaceable lens carrier to move along the optical axis. The electrical wiring pattern is electrically connected to the driving coil. In addition, the driving coil and the rollable elements are on opposite sides of the displaceable lens carrier in the direction of the preloading force (that is, the direction along which the preloading force acts). Therefore, the displaceable lens carrier can be attracted and attached to the preloading element and driven by driving components of the driving base via the first magnet.

According to the present disclosure, the lens driving module having the above described configuration is favorable for preventing mechanical interferences between the rollable elements and coil carrier so as to extend the stroke length of the displaceable lens carrier driven by the lens driving module. Furthermore, having the displaceable lens carrier attracted and attached to a shell of the lens driving module and providing the displaceable lens carrier with a degree of freedom in the direction parallel to the optical axis is favorable for reducing the vibrations of the displaceable lens carrier in a direction non-parallel to the optical axis when the displaceable lens carrier is moving. In addition, since the lens driving module is divided into the preloading element and the driving base, in an assembling process, the position of the imaging lens system in the preloading element can be calibrated by aligning the imaging lens system with an image sensor before the driving base is installed. As such, it is favorable for reducing tolerance stack ups, especially in a configuration where the imaging lens system includes multiple displaceable lens carriers, so as to improve yield rate.

Moreover, the preloading element having the ferromagnetic part can be provided with various functionalities such as protecting the displaceable lens carrier and the circuit, attracting the displaceable lens carrier, calibrating the position of the displaceable lens carrier, and reducing signal interferences generated by peripheral electronic components; furthermore, with the above described spatial arrangement of the coil, magnet and ferromagnetic part, it is favorable for further reducing mechanical interferences during movement of the displaceable lens carrier and achieving good space utilization, thereby reducing the size of the lens driving module.

According to the present disclosure, in the lens driving module, each of the mounting structures may be a guiding groove extending in a direction parallel to the optical axis so as to guide the rollable elements to move in a direction parallel to the optical axis; alternatively, each of the mounting structures may be a fixing recess having a fixing structure for holding the rollable element in position, such that the rollable elements can be moved stably in guiding grooves of the displaceable lens carrier.

According to the present disclosure, in a configuration where an imaging lens system includes a plurality of displaceable lens carriers, a lens driving module can provide the imaging lens system with a zoom functionality by adjusting distances between adjacent displaceable lens carriers.

The ferromagnetic part can be insert-molded with the injection molded part to form the preloading element. Therefore, it is favorable for the combination of the ferromagnetic part and the injection molded part via injection molding process, thereby reducing assembly tolerances; furthermore, it is favorable for reducing the influence of environmental temperature on the preloading element, thereby increasing the control accuracy of the lens driving module. Moreover, the ferromagnetic part and the injection molded part may be joined together in hot riveting process in which a portion of the injection molded part is melted and softened to cover a portion of the ferromagnetic part, but the present disclosure is not limited to the abovementioned manufacturing methods.

The imaging lens system can further include a fixed lens carrier fixed in the lens driving module. At least one of the plurality of lens elements is disposed on the fixed lens carrier. The driving base and the preloading element are disposed on opposite sides of the fixed lens carrier in the direction of the preloading force. Moreover, the lens driving module can further include a carrier-mounting structure, and the fixed lens carrier is in physical contact with the carrier-mounting structure. Therefore, it is favorable for limiting the freedom of movement of the imaging lens system so as to stabilize the image quality. Moreover, the carrier-mounting structure can include a positioning protrusion.

According to the present disclosure, the lens driving module can further include a connection frame in physical contact with the driving base and the preloading element. The connection frame, the driving base and the preloading element together form an accommodation chamber, and the imaging lens system is disposed in the accommodation chamber. Therefore, the connection frame is favorable for further enhancing the mechanical strength of the lens driving module; in addition, the connection frame can further include an alignment structure so as to improve the assembling precision between the preloading element and the driving base.

According to the present disclosure, in the lens driving module, the electrical wiring pattern of the driving base can be formed via a printed circuit board, and the printed circuit board can be a flexible printed circuit attached to an attachment surface of a base body of the driving base so as to prevent the flexible printed circuit from bending, reduce assembling complexity and improve yield rate, thereby extending service life of the flexible printed circuit and simplifying assembling process. The electrical wiring pattern may be insert-molded with the driving base so as to form a driving base having embedded electrical wiring pattern. The electrical wiring pattern may be formed on the surface of the driving base via a laser direct structuring method. Alternatively, the driving base may be a printed circuit board, but the present disclosure is not limited to the abovementioned methods of forming the electrical wiring pattern.

According to the present disclosure, in the lens driving module, the driving coil can be disposed on the flexible printed circuit. Furthermore, the driving coil may be formed in the various types of electrical wiring patterns as described above to be one-piece component so as to simplify the assembling process.

The number of the at least one displaceable lens carrier can be at least two, and each of the at least two displaceable lens carriers has a certain movement range along the optical axis. The lens driving module can further include a spacer structure disposed on the preloading element or the driving base. The spacer structure is located between two of the displaceable lens carriers that are adjacent to each other so as to ensure their certain movement ranges do not overlap. Therefore, the spacer structure is favorable for reducing collisions between adjacent displaceable lens carriers and preventing interferences of magnetic fields generated between magnets respectively disposed on the adjacent displaceable lens carriers, thereby further enhancing the mechanical strength of the lens driving module.

The lens driving module can further include at least one second magnet disposed on the displaceable lens carrier. The first magnet is located farther away from the ferromagnetic part than the second magnet is located relative to the ferromagnetic part. In such a configuration, the ferromagnetic part and the second magnet can together generate a magnetic attraction force, such that the displaceable lens carrier exerts a preloading force on the rollable elements. Therefore, the displaceable lens carrier can be attracted and attached to the preloading element via the second magnet, and the displaceable lens carrier can be driven to move by the driving components on the driving base through the magnetic field of the first magnet.

According to the present disclosure, in the lens driving module, the ferromagnetic part and the driving coil may interact with the same magnet so as to reduce the components; alternatively, the ferromagnetic part and the driving coil may interact with different magnets so as to reduce interferences between magnetic fields, thereby increasing stability of the lens driving module.

The lens driving module can further include a magnetic field sensor disposed corresponding to the first magnet or the second magnet, and the magnetic field sensor is electrically connected to the electrical wiring pattern. Moreover, the magnetic field sensor can be, for example, a Hall Effect sensor that determines the position of the displaceable lens carrier of the imaging lens system by detecting the magnetic field changes, which can be feedback signals to the control system for improving control precision.

The present disclosure provides a photographing camera which includes the aforementioned lens driving module, an imaging lens system and a light-folding element. The light-folding element is disposed on an object side or an image side of the imaging lens system, and the light-folding element changes the travelling direction of light rays so as to reduce the height of the photographing camera.

When a maximum field of view of the imaging lens system is FOV, the following condition can be satisfied: 5 degrees$\leq$FOV$\leq$50 degrees. Moreover, the imaging lens system can be a telephoto imaging lens system.

When a maximum focal length of the imaging lens system is fmax, and a minimum focal length of the imaging lens system is fmin, the following condition can be satisfied: $1.5\leq fmax/fmin\leq 10$. Moreover, the focal length of the imaging lens system is adjustable so as to be applicable to more applications.

When a stroke length of the at least one displaceable lens carrier is Sd, the following condition can be satisfied: 0.3 mm<Sd<19.5 mm. Therefore, it is favorable for the imaging lens system to have a longer stroke length so as to achieve auto-focus functionality of such telephoto imaging lens system. Moreover, the following condition can also be satisfied: 0.6 mm<Sd<8.55 mm.

The present disclosure provides an electronic device which includes the aforementioned photographing camera and an image sensor. The image sensor is on an image surface of the imaging lens system.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
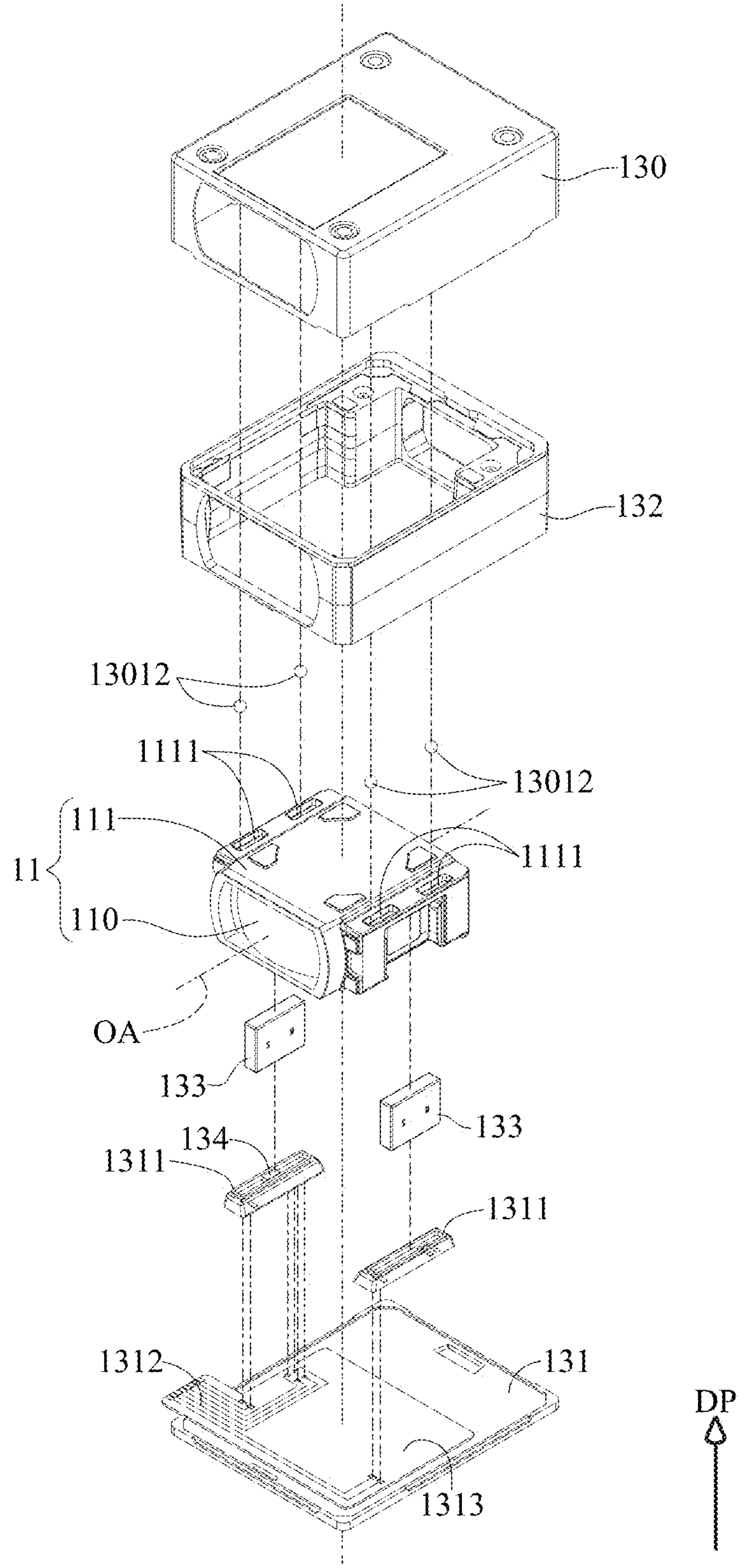
FIG. 2 is an exploded view of an imaging lens system and a lens driving module in FIG. 1.
Figure 3:
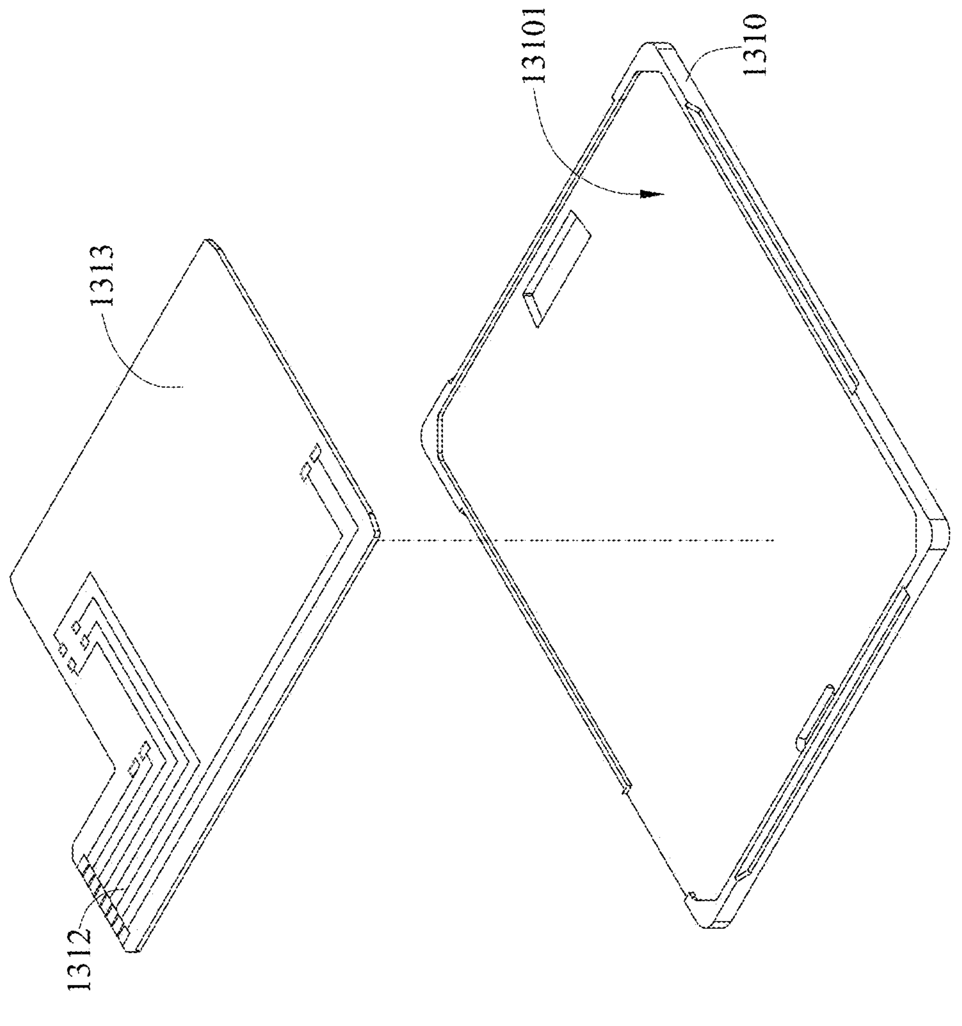
FIG. 3 is an exploded view of a driving base in FIG. 2.
Figure 4:
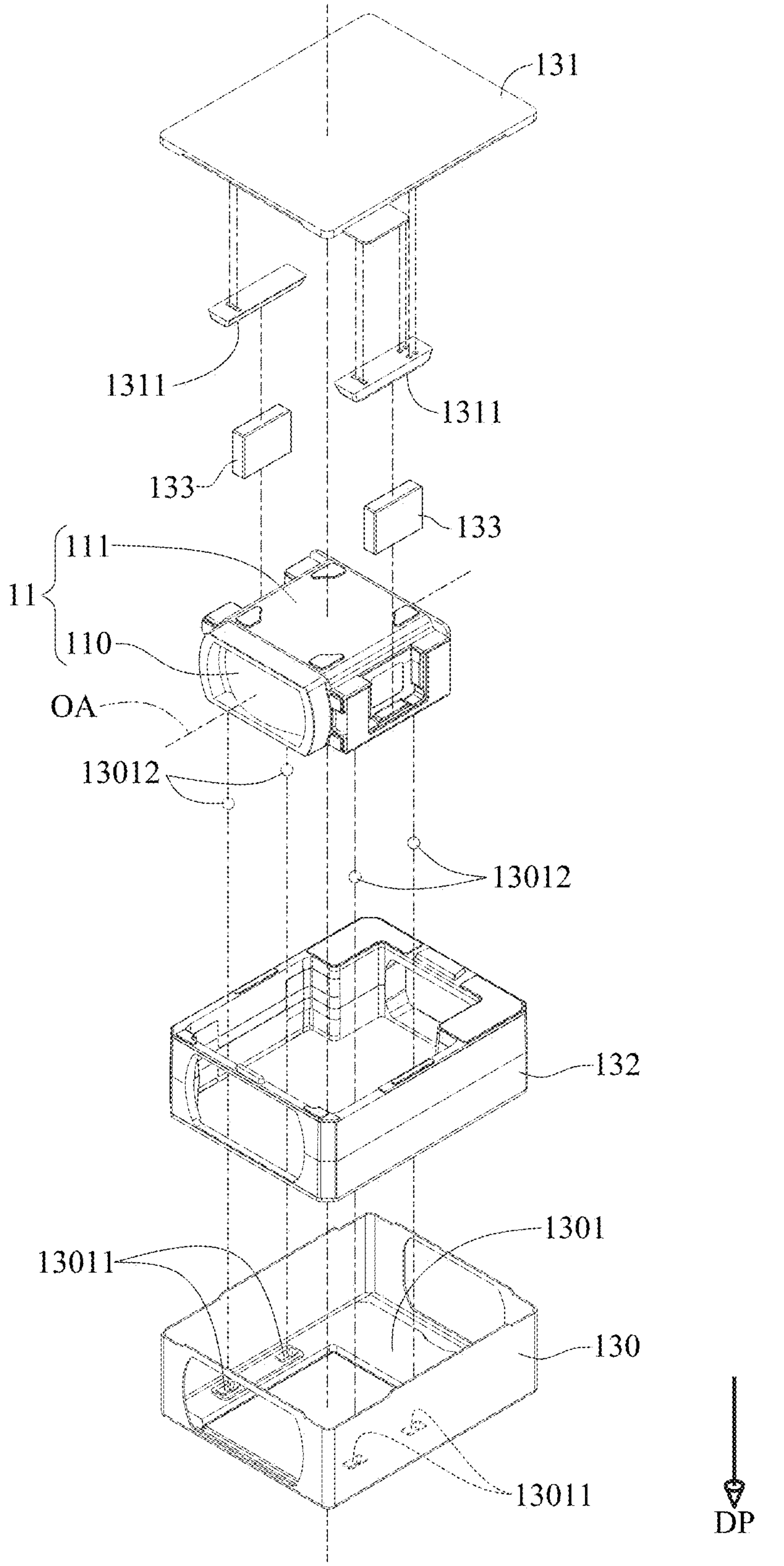
FIG. 4 is another exploded view of the imaging lens system and the lens driving module in FIG. 1.
Figure 5:
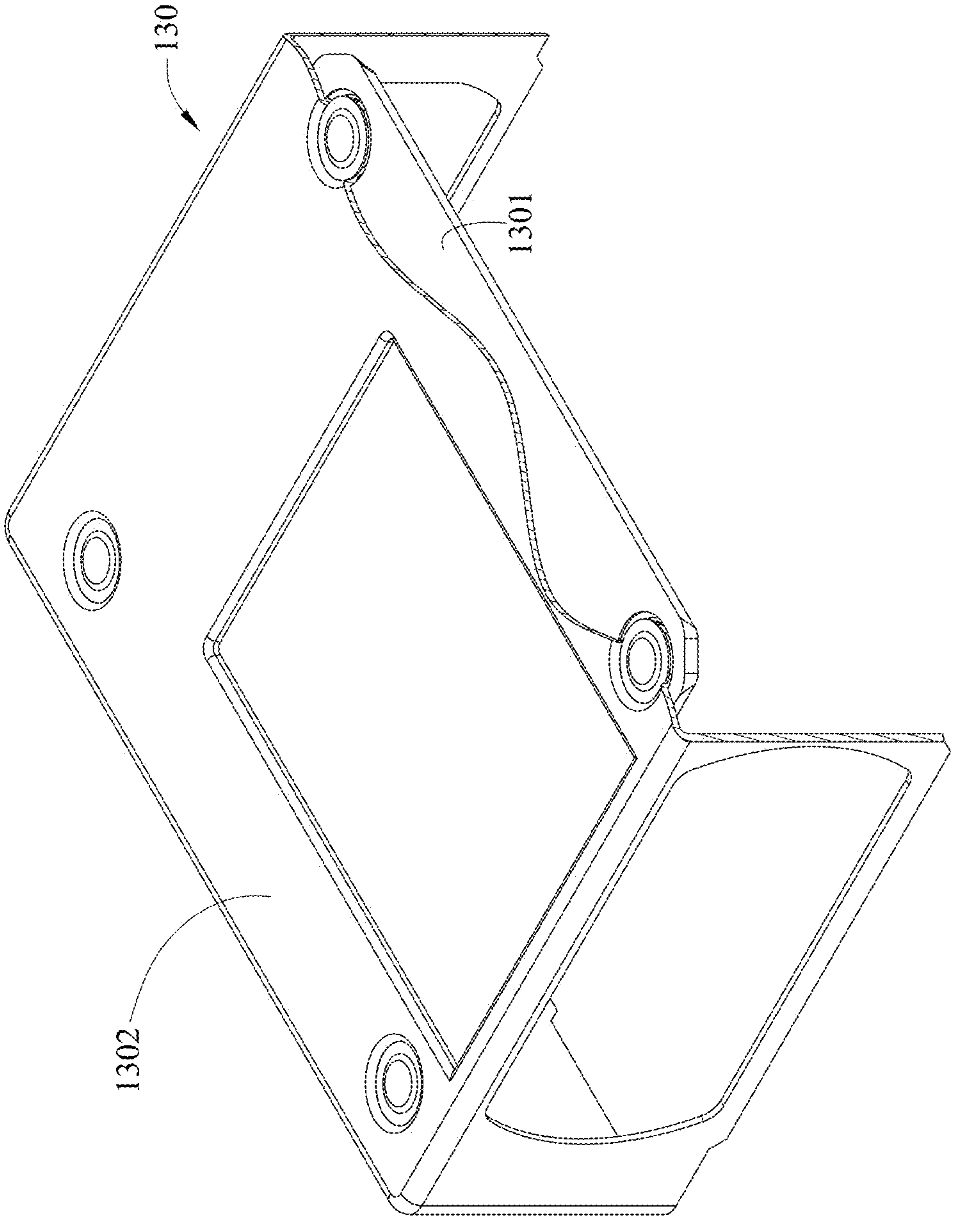
FIG. 5 is a partially sectioned view of a preloading element in FIG. 2.
Figure 6:
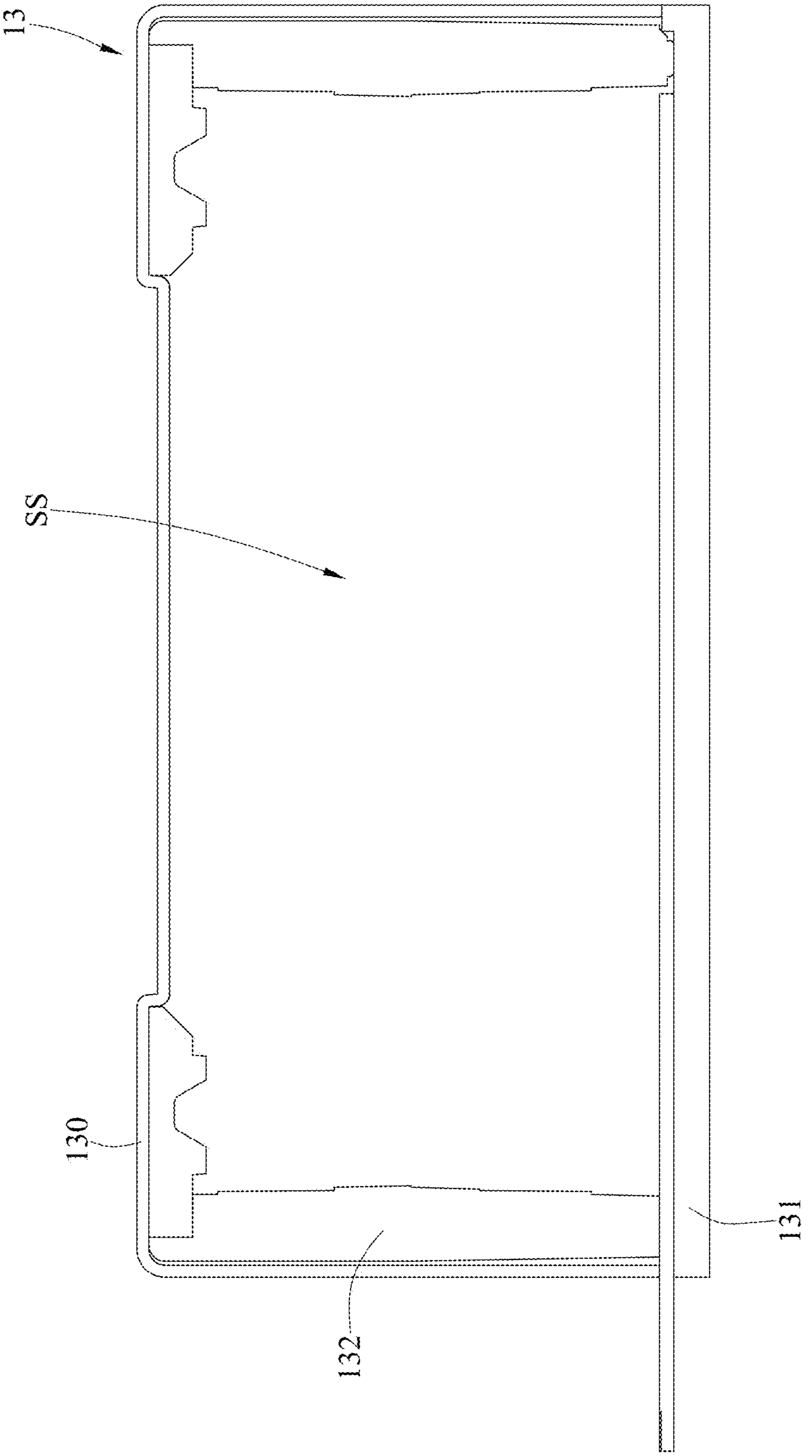
FIG. 6 is a cross-sectional view of the lens driving module along line 6-6 in FIG. 1.
Figure 7:
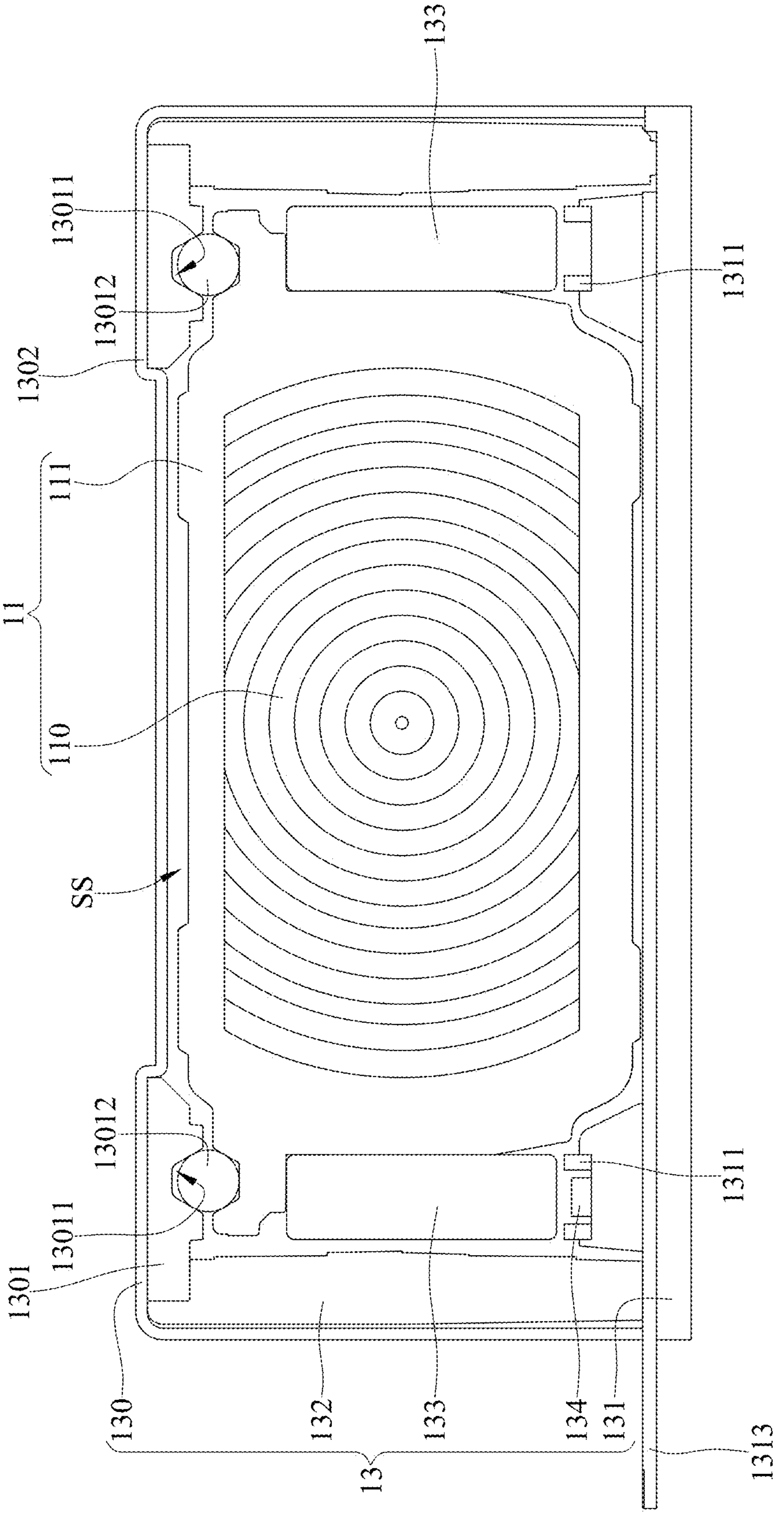
FIG. 7 is a cross-sectional view of the imaging lens system and the lens driving module along line 6-6 in FIG. 1.
Figure 8:
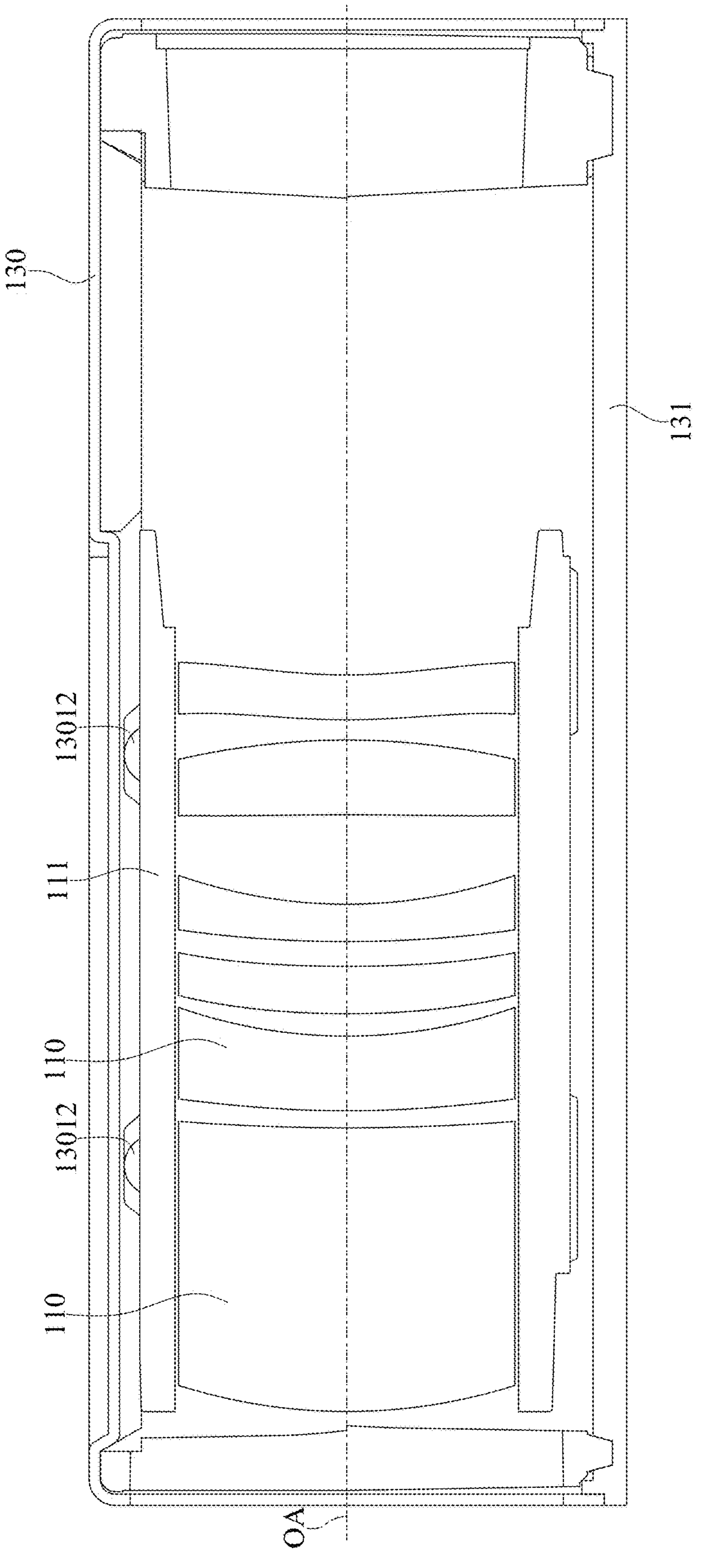
FIG. 8 is a cross-sectional view of the imaging lens system and the lens driving module along line 8-8 in FIG. 1.
Figure 9:
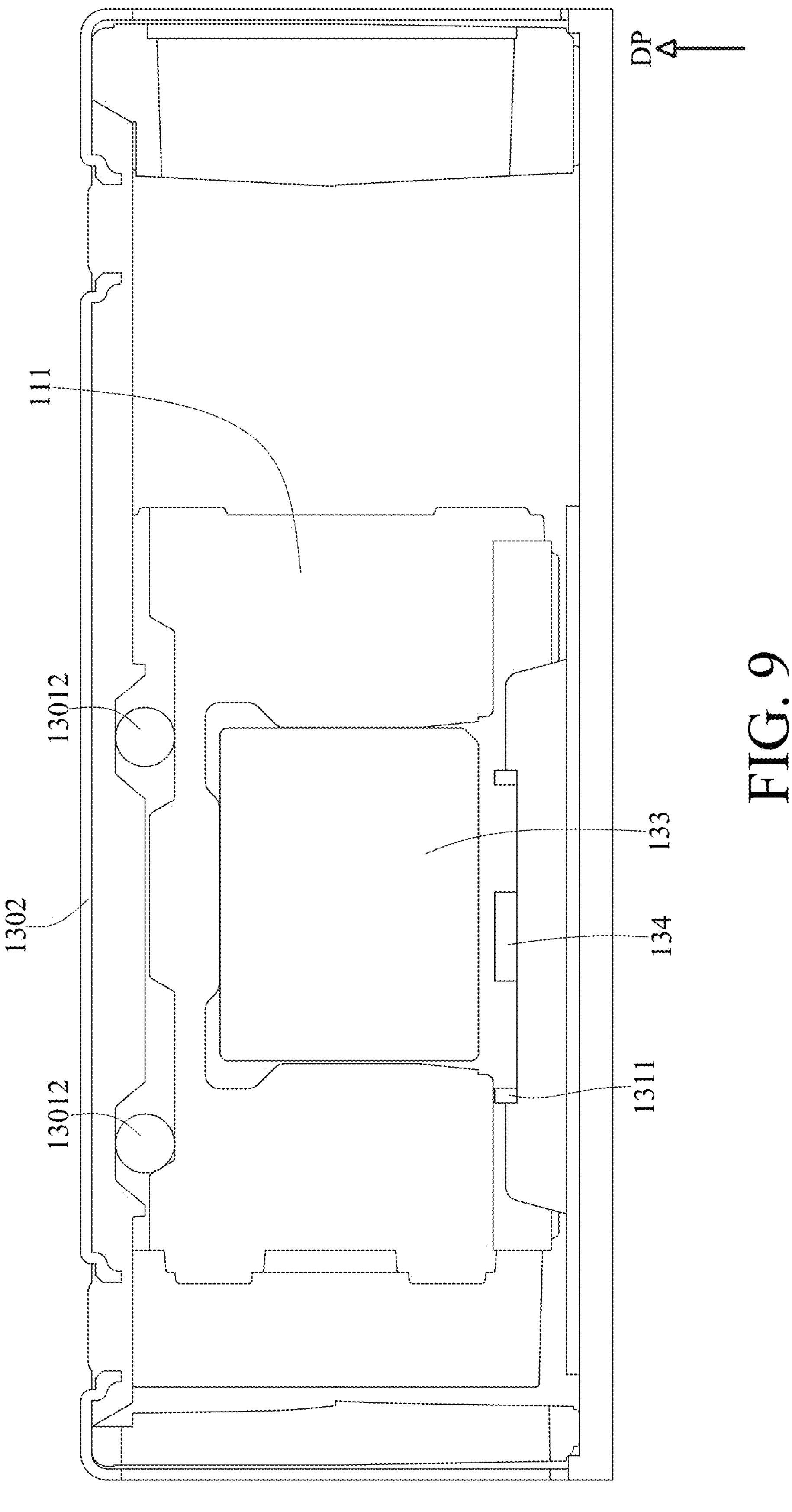
FIG. 9 is a cross-sectional view of the imaging lens system and the lens driving module along line 9-9 in FIG. 1.
Figure 10:
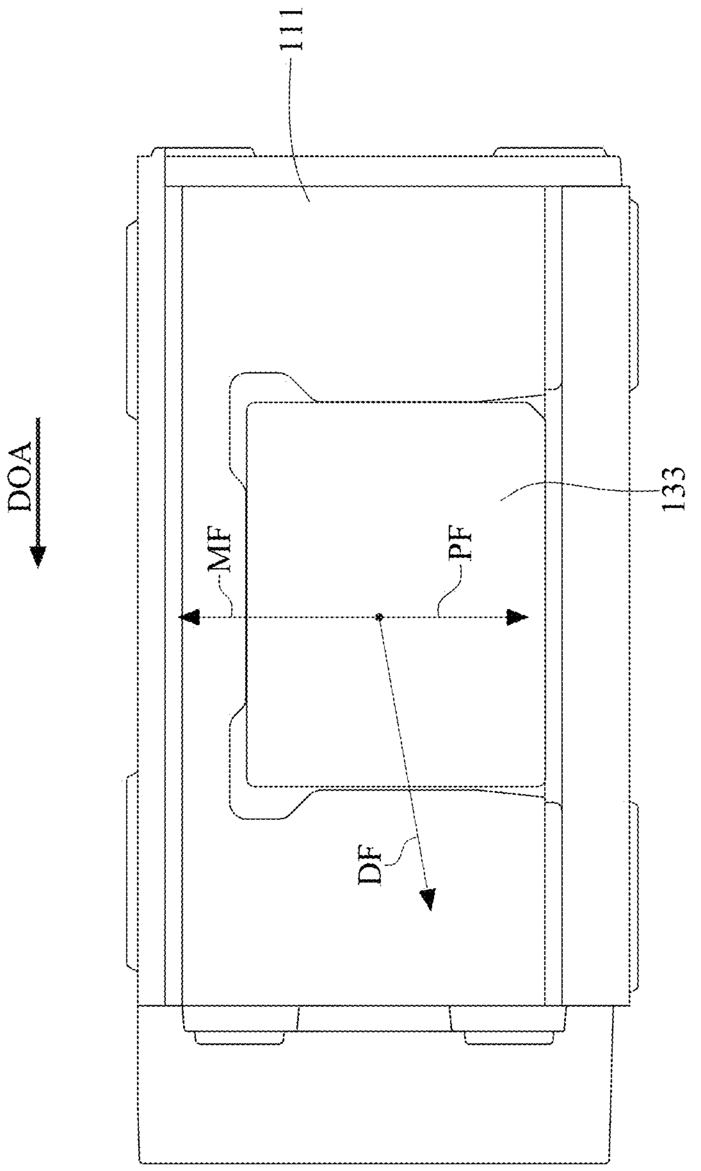
FIG. 10 is a side view of the imaging lens system and a first magnet in FIG. 1.

Please refer to FIG. 1 to FIG. 10. FIG. 1 is a perspective view of a photographing camera and an image sensor according to the 1st embodiment of the present disclosure, FIG. 2 is an exploded view of an imaging lens system and a lens driving module in FIG. 1, FIG. 3 is an exploded view of a driving base in FIG. 2, FIG. 4 is another exploded view of the imaging lens system and the lens driving module in FIG. 1, FIG. 5 is a partially sectioned view of a preloading element in FIG. 2, FIG. 6 is a cross-sectional view of the lens driving module along line 6-6 in FIG. 1, FIG. 7 is a cross-sectional view of the imaging lens system and the lens driving module along line 6-6 in FIG. 1, FIG. 8 is a cross-sectional view of the imaging lens system and the lens driving module along line 8-8 in FIG. 1, FIG. 9 is a cross-sectional view of the imaging lens system and the lens driving module along line 9-9 in FIG. 1, and FIG. 10 is a side view of the imaging lens system and a first magnet in FIG. 1.

In this embodiment, a photographing camera 10 includes an imaging lens system 11, a light-folding element 12 and a lens driving module 13.

The imaging lens system 11 includes six lens elements 110 and a displaceable lens carrier 111. The lens elements 110 are arranged along an optical axis OA of the imaging lens system 11. The lens elements 110 are disposed on the displaceable lens carrier 111, and the displaceable lens carrier 111 is displaceable along the optical axis OA.

The light-folding element 12 is disposed on an object side of the imaging lens system 11 for changing the travelling direction of light rays so as to reduce the height of the imaging lens system 11.

An image sensor 90 is disposed on an image surface of the imaging lens system 11, and the image sensor 90 is configured to receive imaging light and convert said imaging light into electrical signals.

The lens driving module 13 is configured to provide the imaging lens system 11 with auto-focus functionality. The lens driving module 13 includes a preloading element 130, a driving base 131, a connection frame 132, two first magnets 133 and a magnetic field sensor 134. The imaging lens system 11 is disposed between the preloading element 130 and the driving base 131. In specific, the connection frame 132 is in physical contact with the driving base 131 and the preloading element 130 and together form an accommodation chamber SS. The accommodation chamber SS is configured for the imaging lens system 11 to be disposed therein. Therefore, it is favorable for enhancing the mechanical strength of the lens driving module 13, and the displaceable lens carrier 111 of the imaging lens system 11 is displaceable along the optical axis OA in the accommodation chamber SS.

The first magnets 133 are respectively disposed on opposite sides of the displaceable lens carrier 111, and the magnetic field sensor 134 is disposed corresponding to one of the first magnets 133. The magnetic field sensor 134 is configured to detect the magnetic field changes of the first magnet 133 so as to determine the position of the displaceable lens carrier 111 and feed corresponding data back to a control system (not shown).

The preloading element 130 includes an injection molded part 1301 and a ferromagnetic part 1302. The injection molded part 1301 includes four mounting structures 13011 extending in a direction parallel to the optical axis OA and four rollable elements 13012 disposed in respective mounting structures 13011. In addition, the displaceable lens carrier 111 includes four corresponding mounting structures 1111, and the corresponding mounting structures 1111 are disposed respectively corresponding to the four mounting structures 13011 of the injection molded part 1301. The rollable elements 13012 are in contact with the displaceable lens carrier 111 and rollable in the corresponding mounting structures 1111, such that the displaceable lens carrier 111 has a degree of freedom in a direction parallel to the optical axis OA.

The ferromagnetic part 1302 is a rectangular cover having four corners thereof partially embedded in the injection molded part 1301. Furthermore, in this embodiment, the ferromagnetic part 1302 may be insert-molded with the injection molded part 1301 to form the preloading element 130, or the ferromagnetic part 1302 and the injection molded part 1301 may be joined together in a hot riveting process in which a portion of the injection molded part 1301 is melted and jointed with the ferromagnetic part 1302 at specific points so as to form the preloading element 130. The ferromagnetic part 1302 and the first magnets 133 together generate a magnetic attraction force, such that the displaceable lens carrier 111 exerts a preloading force along a direction DP on the rollable elements 13012.

The driving base 131 includes two driving coils 1311, an electrical wiring pattern 1312 and a flexible printed circuit 1313. The driving coils 1311 are disposed corresponding to the first magnets 133, and the driving coils 1311 and the first magnets 133 are configured to generate a driving force so as to drive the displaceable lens carrier 111 to move along the optical axis OA. The electrical wiring pattern 1312 is electrically connected to the driving coils 1311. The magnetic field sensor 134 is disposed in a space surrounded by one of the driving coils 1311 and electrically connected to the electrical wiring pattern 1312. The flexible printed circuit 1313 is attached to an attachment surface 13101 of a base body 1310 of the driving base 131 so as to prevent the flexible printed circuit 1313 from frequently bending, thereby extending the service life of the flexible printed circuit 1313 and simplifying assembling process. In addition, the electrical wiring pattern 1312 is formed on the flexible printed circuit 1313. In the figures of this embodiment, the electrical wiring pattern is only exemplary and illustrated to show its electrical connection functionality, and it is not the actual circuit structure or actual number of circuit contacts.

The driving coils 1311 and the rollable elements 13012 are disposed on opposite sides of the displaceable lens carrier 111 in the direction DP of the preloading force, and the driving base 131 and the preloading element 130 are disposed on opposite sides of the displaceable lens carrier 111 in the direction DP of the preloading force.

As shown in FIG. 9 and FIG. 10, the driving coils 1311, the rollable elements 13012 and the ferromagnetic part 1302 are arranged in order along the direction DP of the preloading force. In one condition where the environmental resistance forces and the gravity are neglected, a resultant force of a driving force DF, a reaction force PF of the preloading force and a magnetic attraction force MF exerted on the displaceable lens carrier 111 respectively by the driving coils 1311, the rollable elements 13012 and the ferromagnetic part 1302 can drive the displaceable lens carrier 111 to move in a direction DOA parallel to the optical axis OA.

When a maximum field of view of the imaging lens system 11 is FOV, the following condition is satisfied: FOV=18.0 degrees.

When a focal length of the imaging lens system 11 is f, the following condition is satisfied: f=26.0 mm.

When a stroke length of the displaceable lens carrier 111 is Sd, the following condition is satisfied: Sd=1.06 mm.

2nd Embodiment

Figure 11:
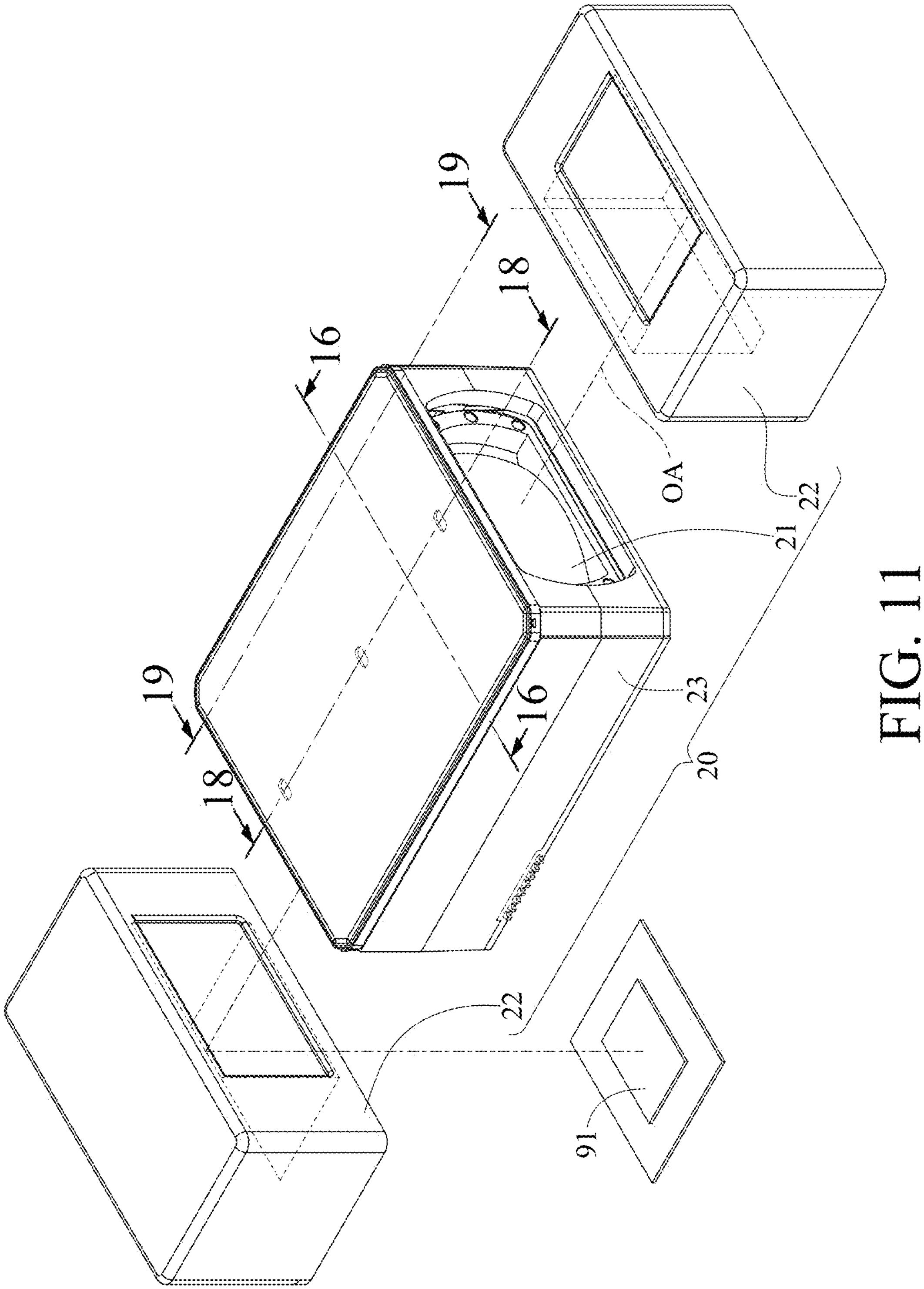
FIG. 11 is a perspective view of a photographing camera and an image sensor according to the 2nd embodiment of the present disclosure.
Figure 12:
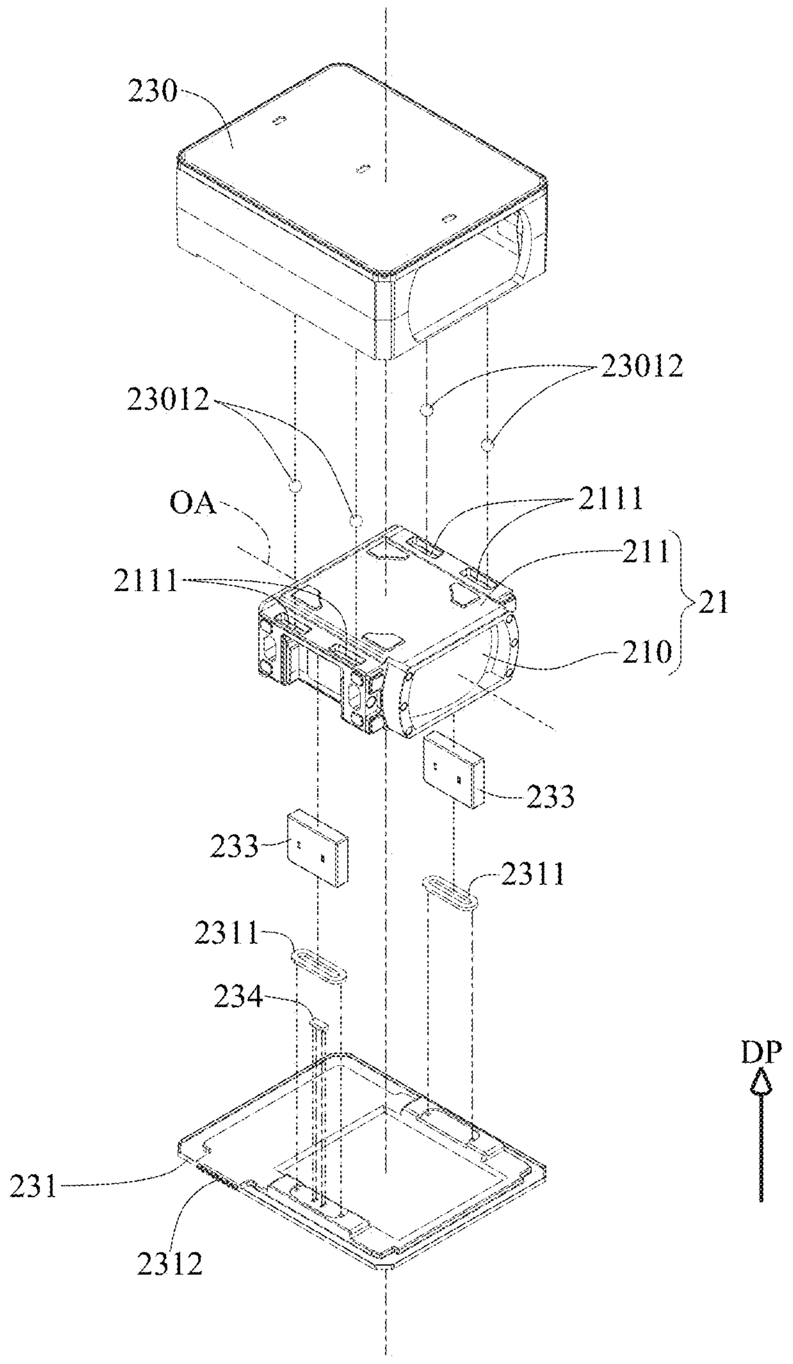
FIG. 12 is an exploded view of an imaging lens system and a lens driving module in FIG. 11.
Figure 13:
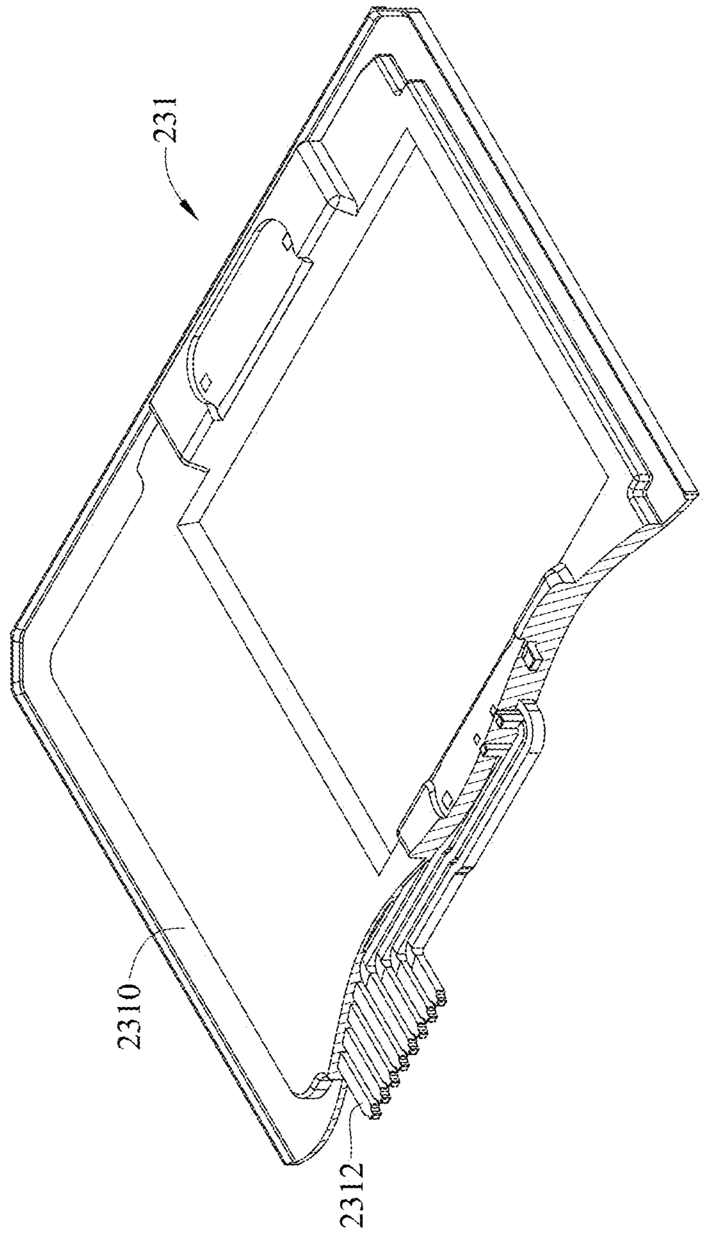
FIG. 13 is a partially sectioned view of a driving base in FIG. 12.
Figure 14:
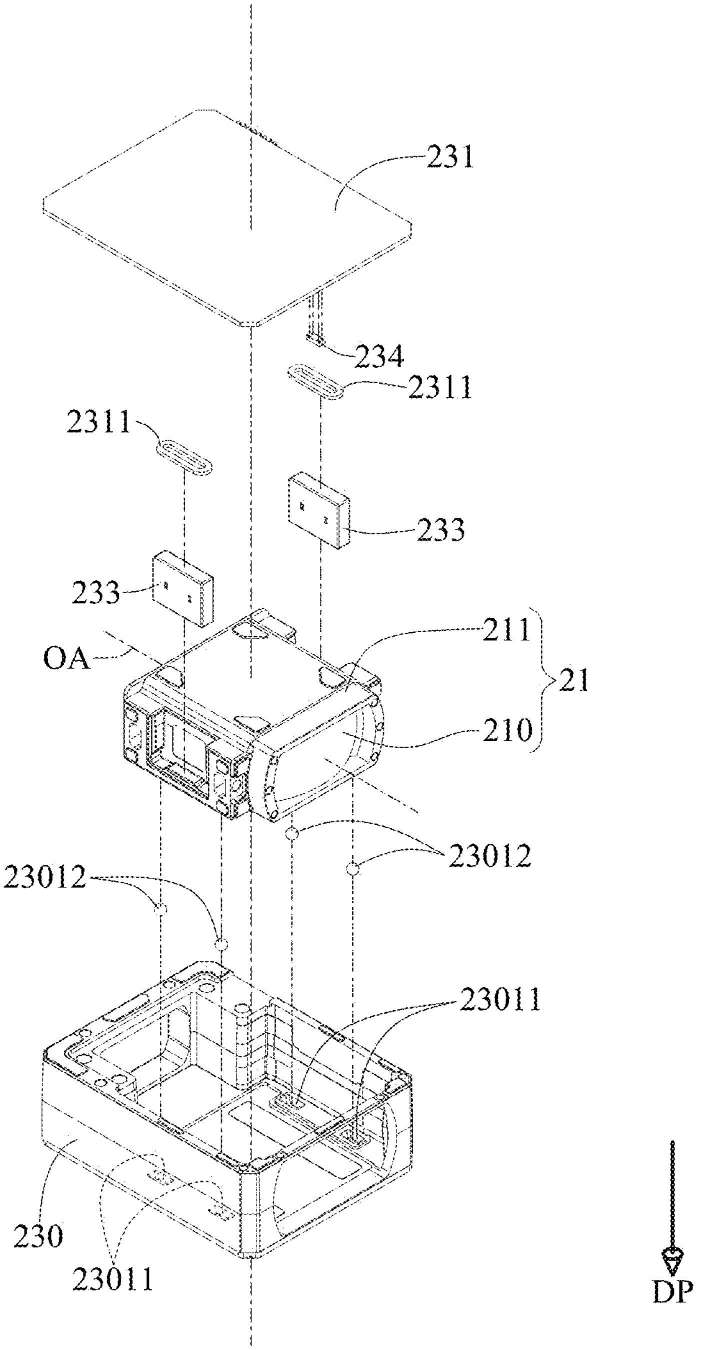
FIG. 14 is another exploded view of the imaging lens system and the lens driving module in FIG. 11.
Figure 15:
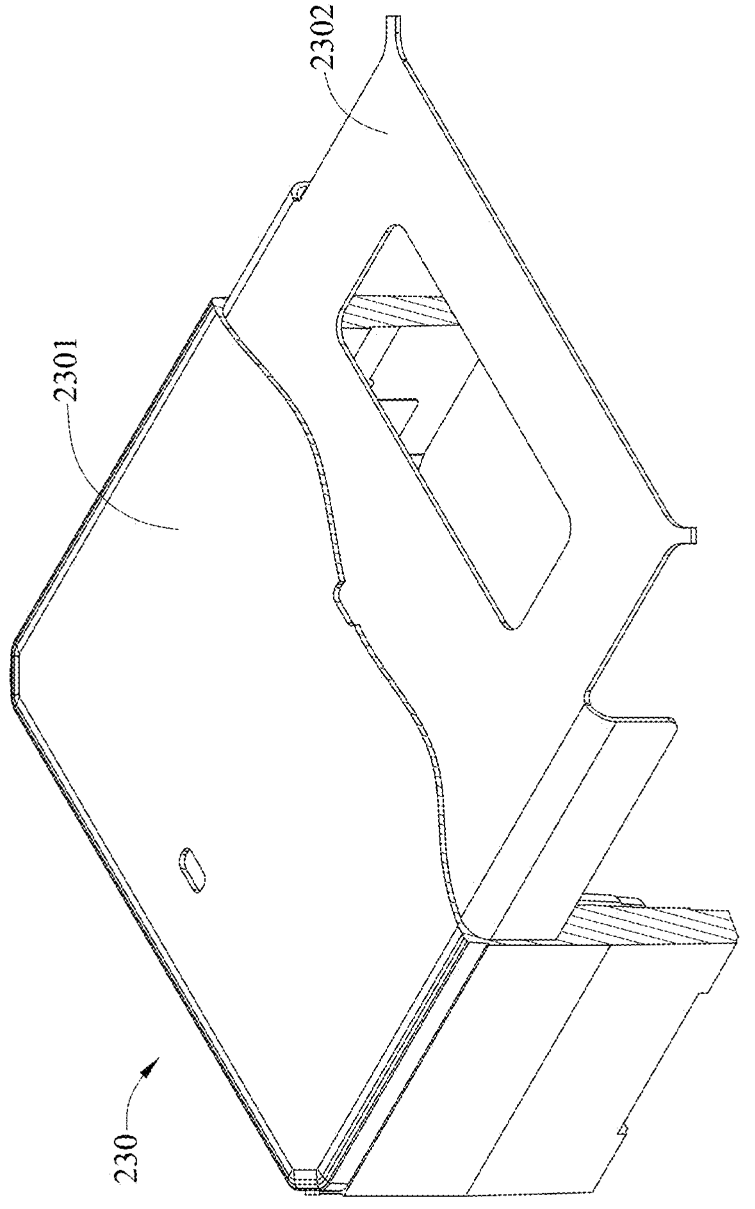
FIG. 15 is a partially sectioned view of a preloading element in FIG. 12.
Figure 16:
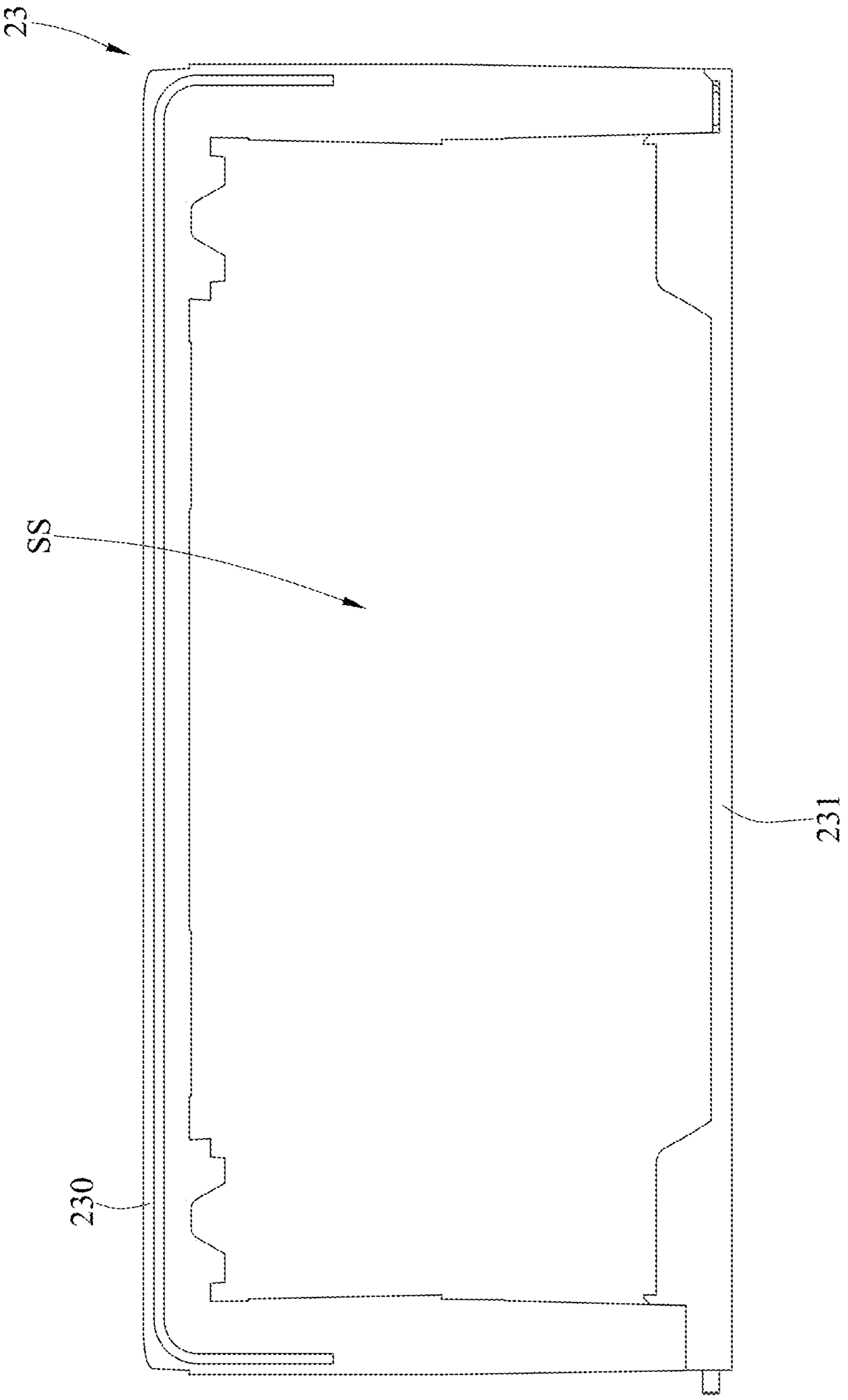
FIG. 16 is a cross-sectional view of the lens driving module along line 16-16 in FIG. 11.
Figure 17:
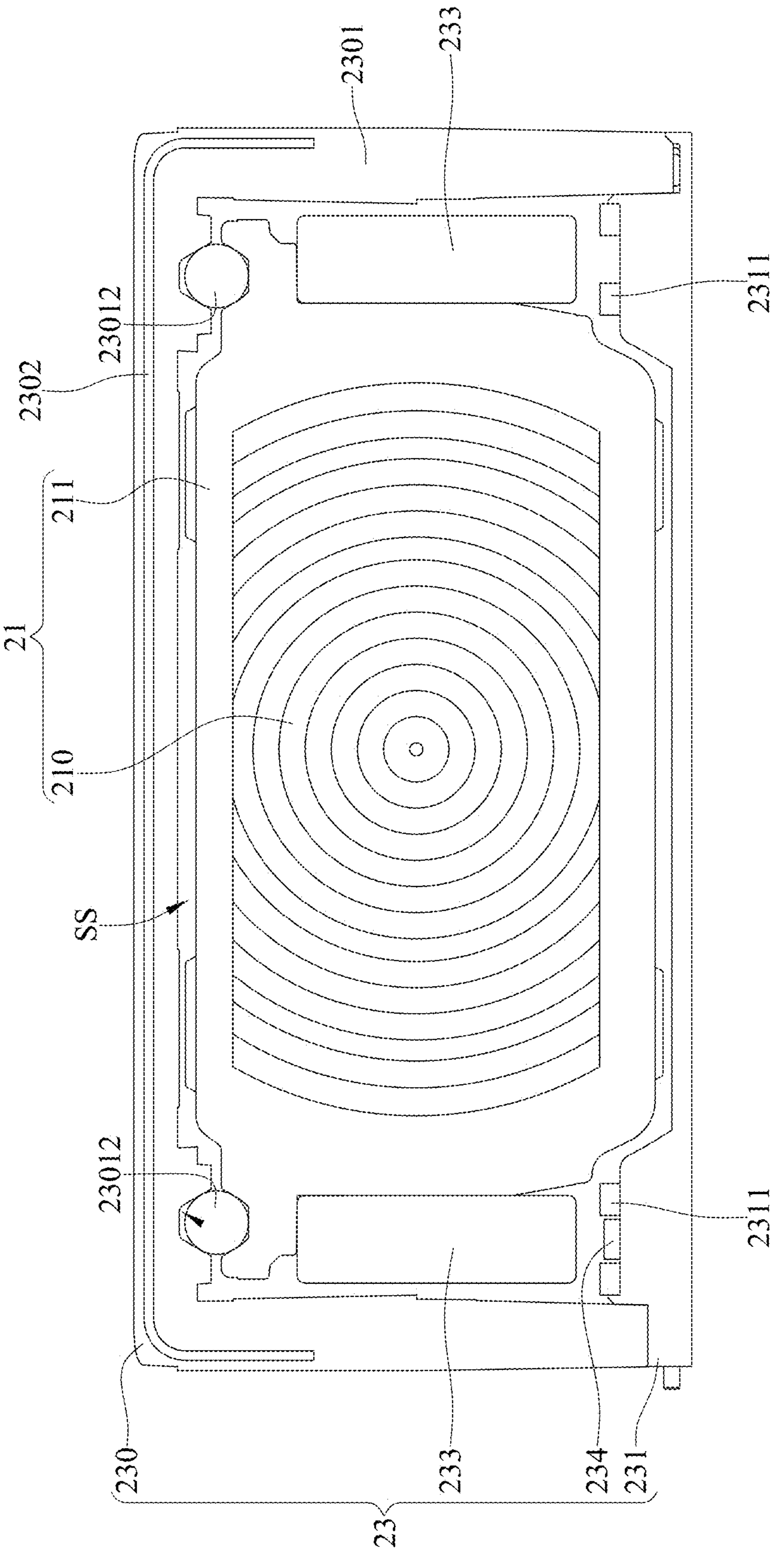
FIG. 17 is a cross-sectional view of the imaging lens system and the lens driving module along line 16-16 in FIG. 11.
Figure 18:
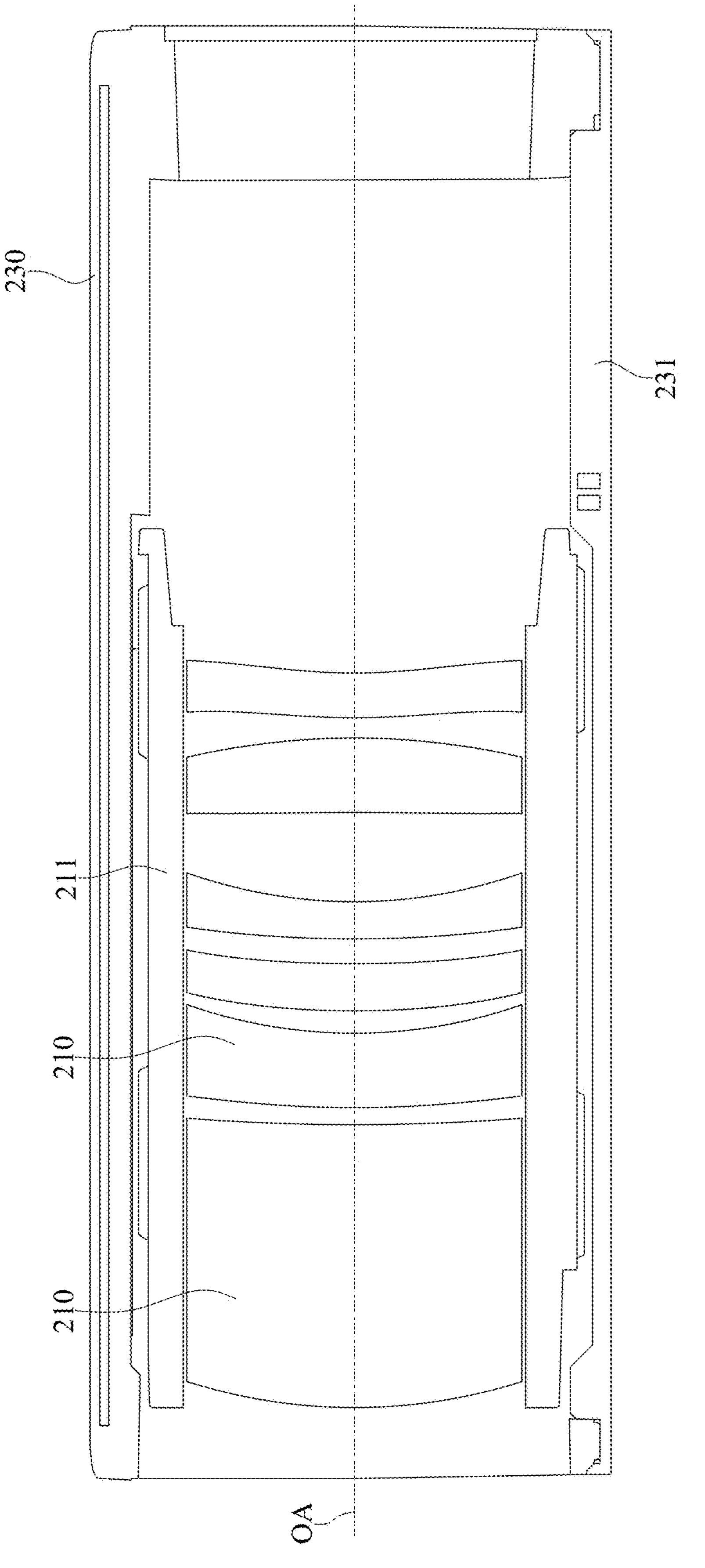
FIG. 18 is a cross-sectional view of the imaging lens system and the lens driving module along line 18-18 in FIG. 11.
Figure 19:
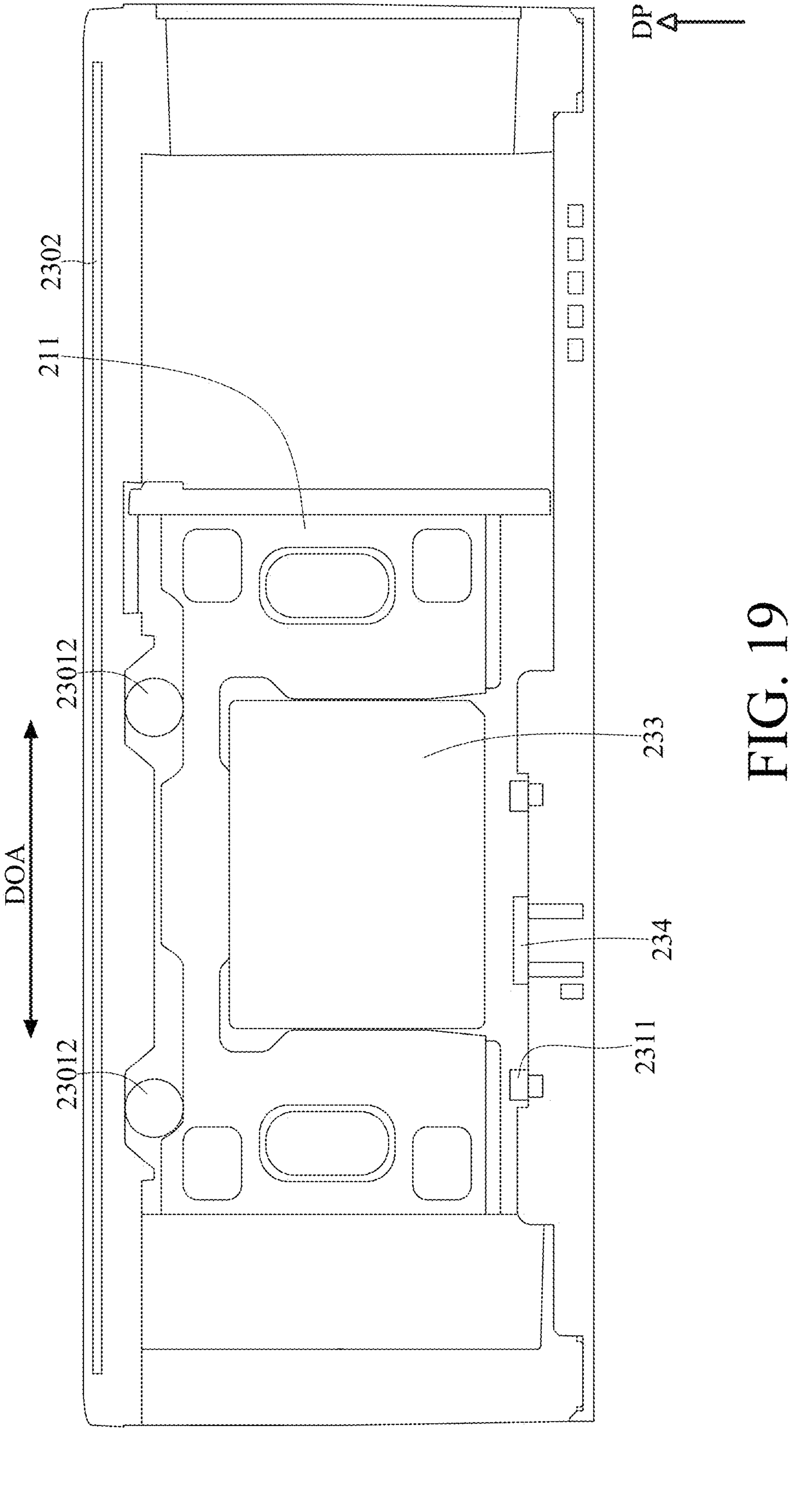
FIG. 19 is a cross-sectional view of the imaging lens system and the lens driving module along line 19-19 in FIG. 11.

Please refer to FIG. 11 to FIG. 19. FIG. 11 is a perspective view of a photographing camera and an image sensor according to the 2nd embodiment of the present disclosure, FIG. 12 is an exploded view of an imaging lens system and a lens driving module in FIG. 11, FIG. 13 is a partially sectioned view of a driving base in FIG. 12, FIG. 14 is another exploded view of the imaging lens system and the lens driving module in FIG. 11, FIG. 15 is a partially sectioned view of a preloading element in FIG. 12, FIG. 16 is a cross-sectional view of the lens driving module along line 16-16 in FIG. 11, FIG. 17 is a cross-sectional view of the imaging lens system and the lens driving module along line 16-16 in FIG. 11, FIG. 18 is a cross-sectional view of the imaging lens system and the lens driving module along line 18-18 in FIG. 11, and FIG. 19 is a cross-sectional view of the imaging lens system and the lens driving module along line 19-19 in FIG. 11.

In this embodiment, a photographing camera 20 includes an imaging lens system 21, two light-folding elements 22 and a lens driving module 23.

The imaging lens system 21 includes six lens elements 210 and a displaceable lens carrier 211. The lens elements 210 are arranged along an optical axis OA of the imaging lens system 21. The lens elements 210 are disposed on the displaceable lens carrier 211, and the displaceable lens carrier 211 is displaceable along the optical axis OA.

The light-folding elements 22 are respectively disposed on an object side and an image side of the imaging lens system 21 for changing the travelling direction of light rays so as to reduce the height of the imaging lens system 21 and extend the back focal length, such that the photographing camera 20 is provided with the imaging lens system 21 having a long focal length.

An image sensor 91 is disposed on an image surface of the imaging lens system 21, and the image sensor 91 is configured to receive imaging light and convert said imaging light into electrical signals.

The lens driving module 23 is configured to provide the imaging lens system 21 with auto-focus functionality. The lens driving module 23 includes a preloading element 230, a driving base 231, two first magnets 233 and a magnetic field sensor 234. The imaging lens system 21 is disposed between the preloading element 230 and the driving base 231. In specific, the driving base 231 and the preloading element 230 together form an accommodation chamber SS configured for the imaging lens system 21 to be disposed therein. Furthermore, the displaceable lens carrier 211 of the imaging lens system 21 is displaceable along the optical axis OA in the accommodation chamber SS.

The first magnets 233 are respectively disposed on opposite sides of the displaceable lens carrier 211, and the magnetic field sensor 234 is disposed corresponding to one of the first magnets 233. The magnetic field sensor 234 is configured to detect the magnetic field changes of the corresponding first magnet 233 so as to determine the position of the displaceable lens carrier 211 and then feed corresponding data back to a control system (not shown).

The preloading element 230 includes an injection molded part 2301 and a ferromagnetic part 2302. The injection molded part 2301 includes four mounting structures 23011 extending in a direction parallel to the optical axis OA and four rollable elements 23012 disposed in respective mounting structures 2301. In addition, the displaceable lens carrier 211 includes four corresponding mounting structures 2111, and the corresponding mounting structures 2111 are disposed respectively corresponding to the four mounting structures 23011 of the injection molded part 2301. The rollable elements 23012 are in contact with the displaceable lens carrier 211 and rollable in the corresponding mounting structures 2111, such that the displaceable lens carrier 211 has a degree of freedom in a direction parallel to the optical axis OA.

The ferromagnetic part 2302 is covered by the injection molded part 2301. Furthermore, in this embodiment, the ferromagnetic part 2302 may be insert-molded with the injection molded part 2301 to form the preloading element 230. The ferromagnetic part 2302 and the first magnets 233 together generate a magnetic attraction force, such that the displaceable lens carrier 211 exerts a preloading force along a direction DP on the rollable elements 23012.

The driving base 231 includes two the driving coils 2311 and an electrical wiring pattern 2312. The driving coils 2311 are disposed corresponding to the first magnets 233, and the driving coils 2311 and the first magnets 233 are configured to generate a driving force so as to drive the displaceable lens carrier 211 to move along the optical axis OA. The electrical wiring pattern 2312 is electrically connected to the driving coils 2311. The magnetic field sensor 234 is disposed in a space surrounded by one of the driving coils 2311 and electrically connected to the electrical wiring pattern 2312. Moreover, the electrical wiring pattern 2312 is insert-molded with a base body 2310 of the driving base 231. In addition, the driving base 231 has a plurality of circuit contacts (its reference numeral is omitted), and the driving coils 2311 are electrically connected to the circuit contacts of the driving base 231. In the figures of this embodiment, the electrical wiring pattern is only exemplary and illustrated to show its electrical connection functionality, and it is not the actual circuit structure or actual number of circuit contacts.

The driving coils 2311 and the rollable elements 23012 are disposed on opposite sides of the displaceable lens carrier 211 in the direction DP of the preloading force, and the driving base 231 and the preloading element 230 are disposed on opposite sides of the displaceable lens carrier 211 in the direction DP of the preloading force.

As shown in FIG. 19, the driving coils 2311, the rollable elements 23012 and the ferromagnetic part 2302 are arranged in order along the direction DP of the preloading force. In one condition where the environmental resistance forces and the gravity are neglected, a resultant force of a driving force, a reaction force of the preloading force and a magnetic attraction force exerted on the displaceable lens carrier 211 respectively by the driving coils 2311, the rollable elements 23012 and the ferromagnetic part 2302 can drive the displaceable lens carrier 211 to move in a direction DOA parallel to the optical axis OA.

When a maximum field of view of the imaging lens system 21 is FOV, the following condition is satisfied: FOV=18.0 degrees.

When a focal length of the imaging lens system 21 is f, the following condition is satisfied: f=26.0 mm.

When a stroke length of the displaceable lens carrier 211 is Sd, the following condition is satisfied: Sd=1.06 mm.

3rd Embodiment

Figure 20:
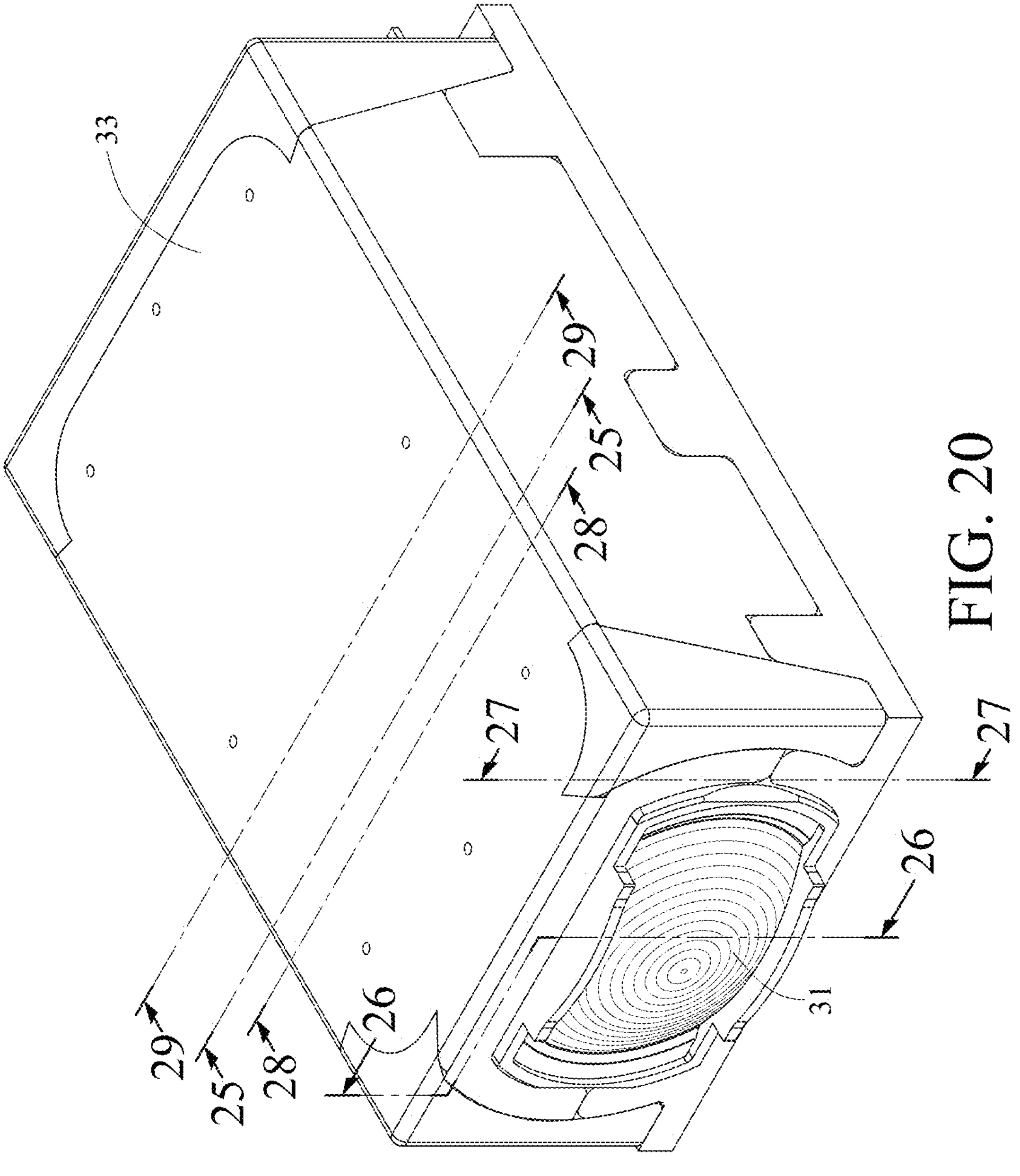
FIG. 20 is a perspective view of an imaging lens system, a lens driving module and an image sensor module according to the 3rd embodiment of the present disclosure.
Figure 21:
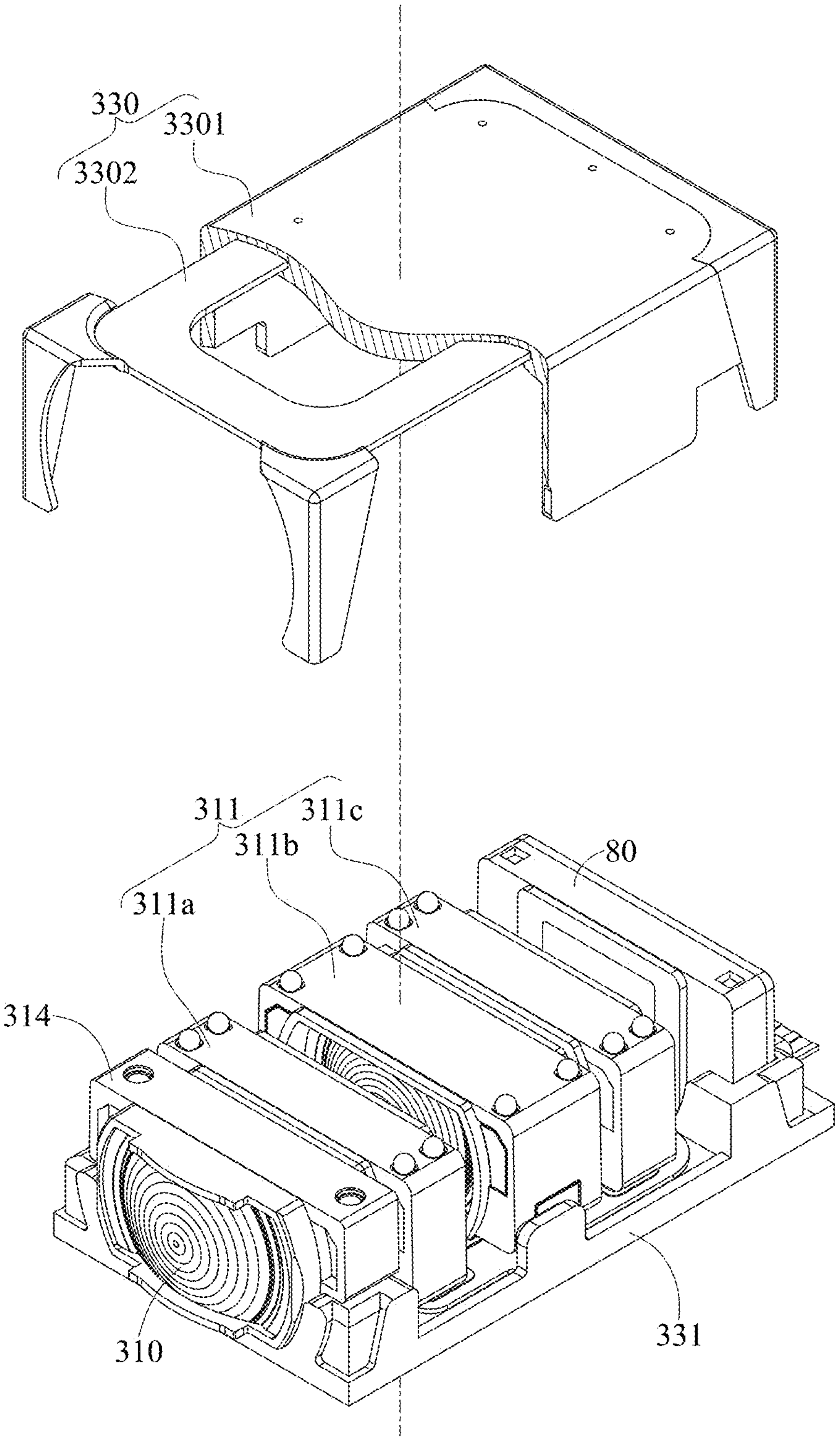
FIG. 21 is a partially exploded and sectioned view of the imaging lens system, the lens driving module and the image sensor module in FIG. 20.
Figure 22:
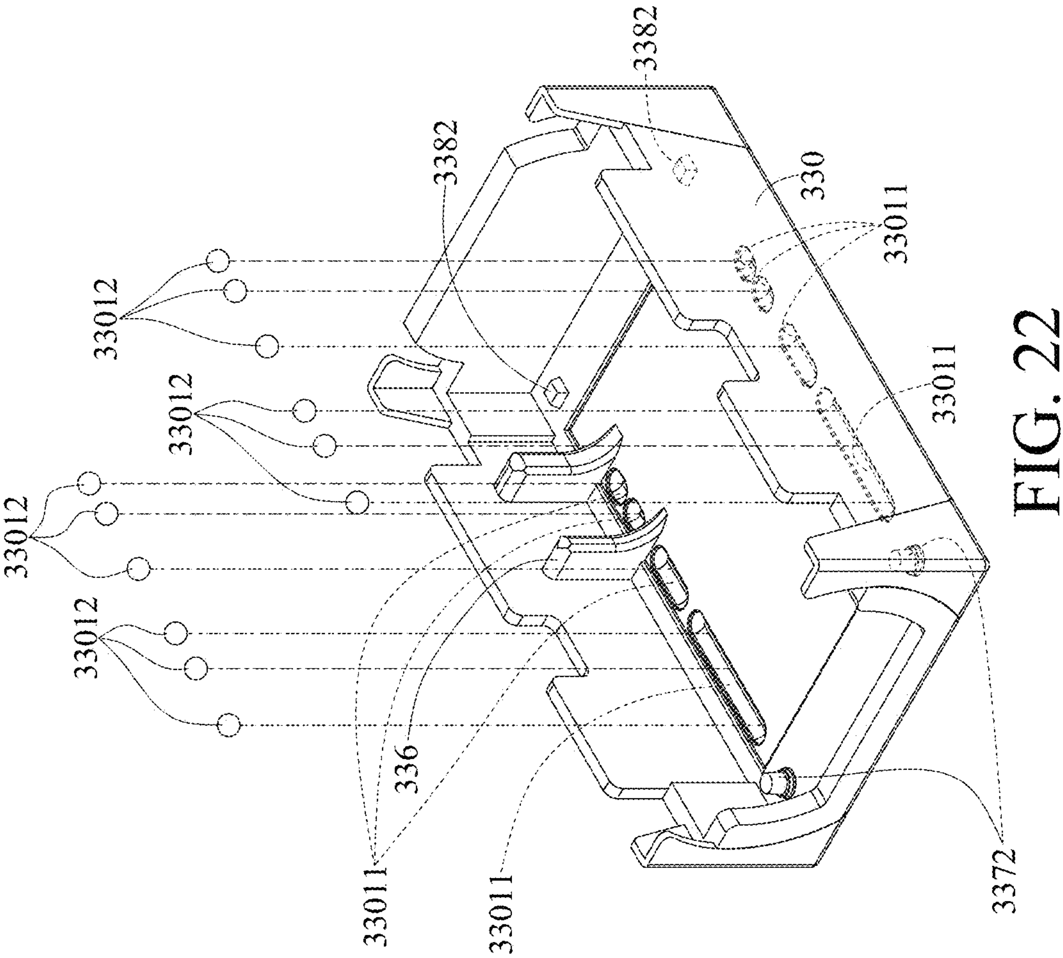
FIG. 22 is an exploded another side view of a preloading element in FIG. 21.
Figure 23:
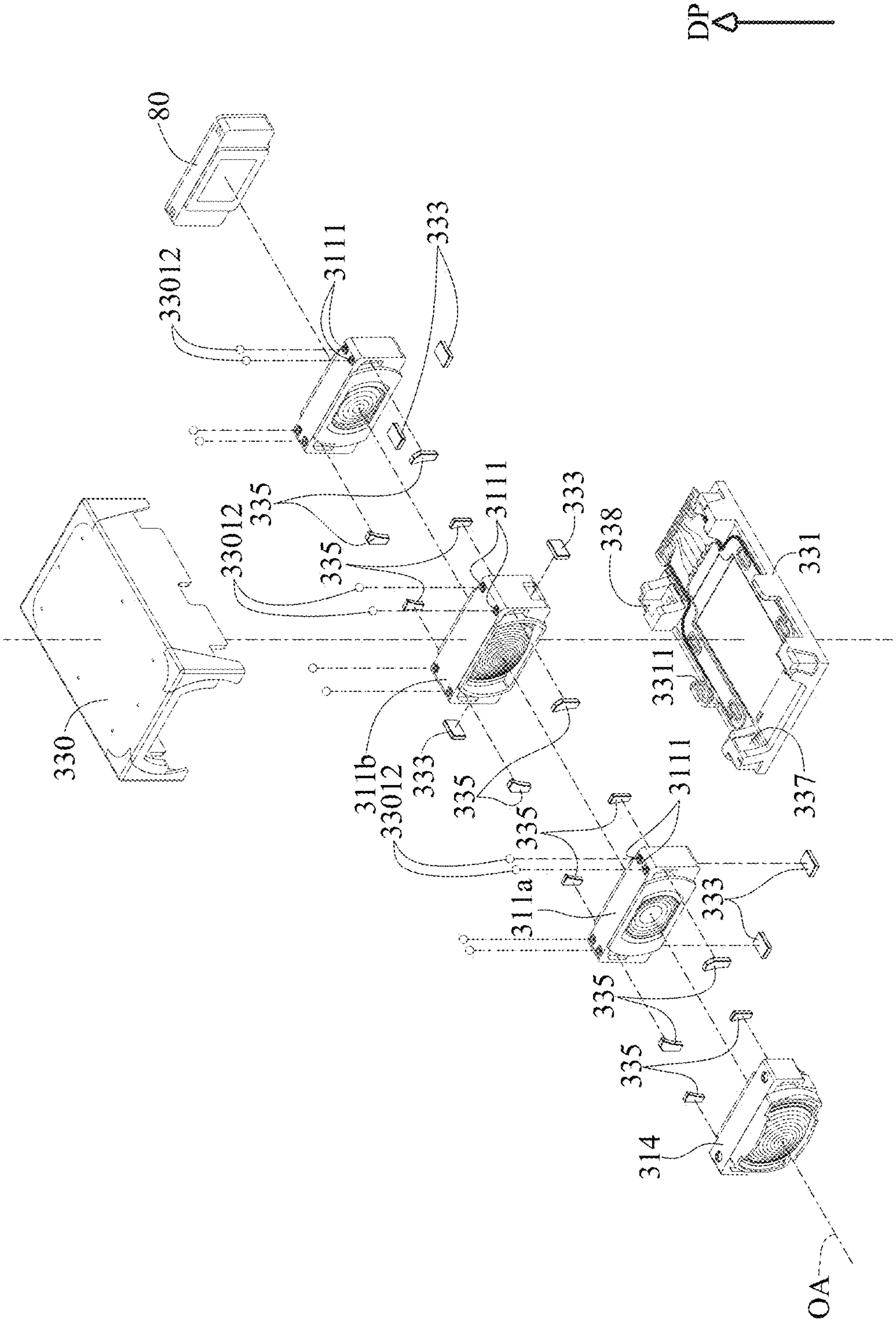
FIG. 23 is an exploded view of the imaging lens system, the lens driving module and the image sensor module in FIG. 20.
Figure 24:
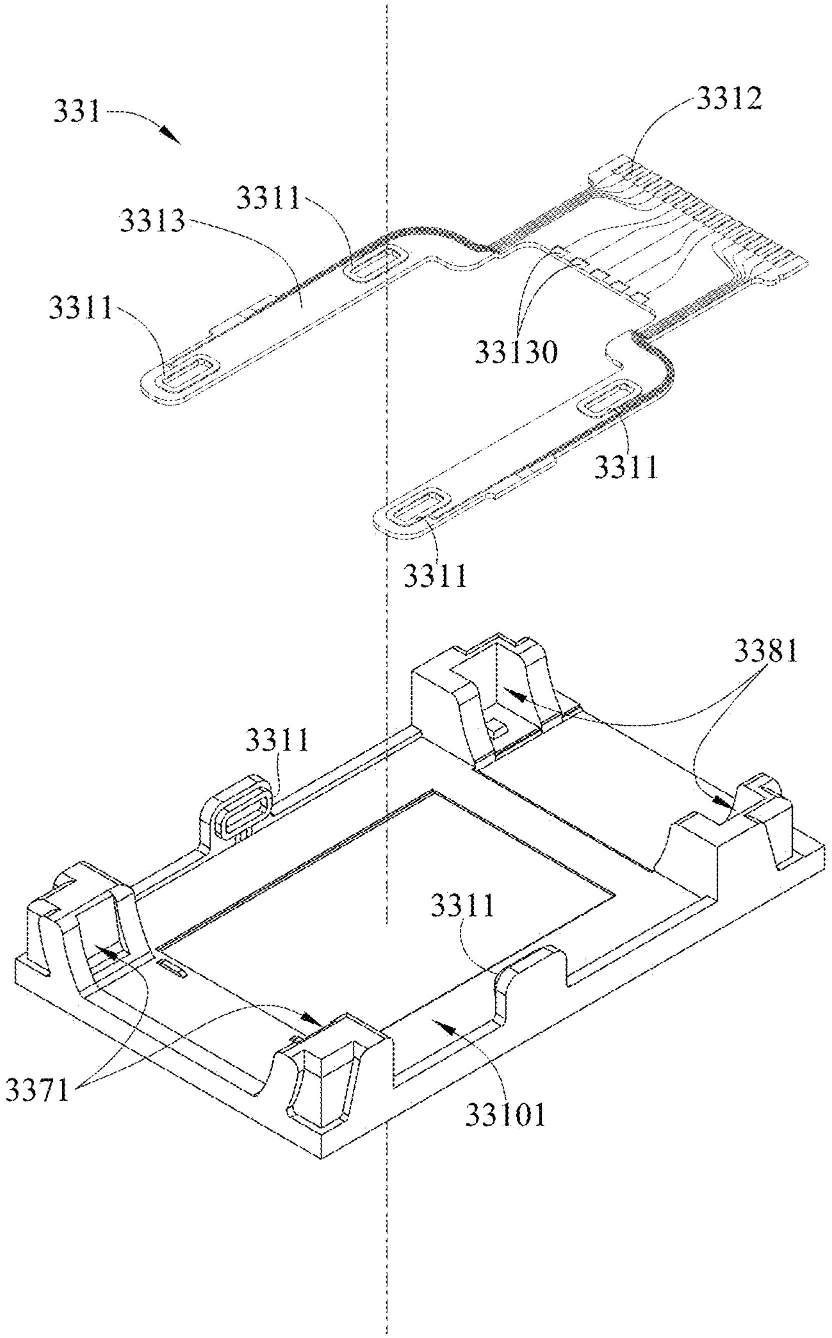
FIG. 24 is an exploded view of a driving base in FIG. 23.
Figure 25:
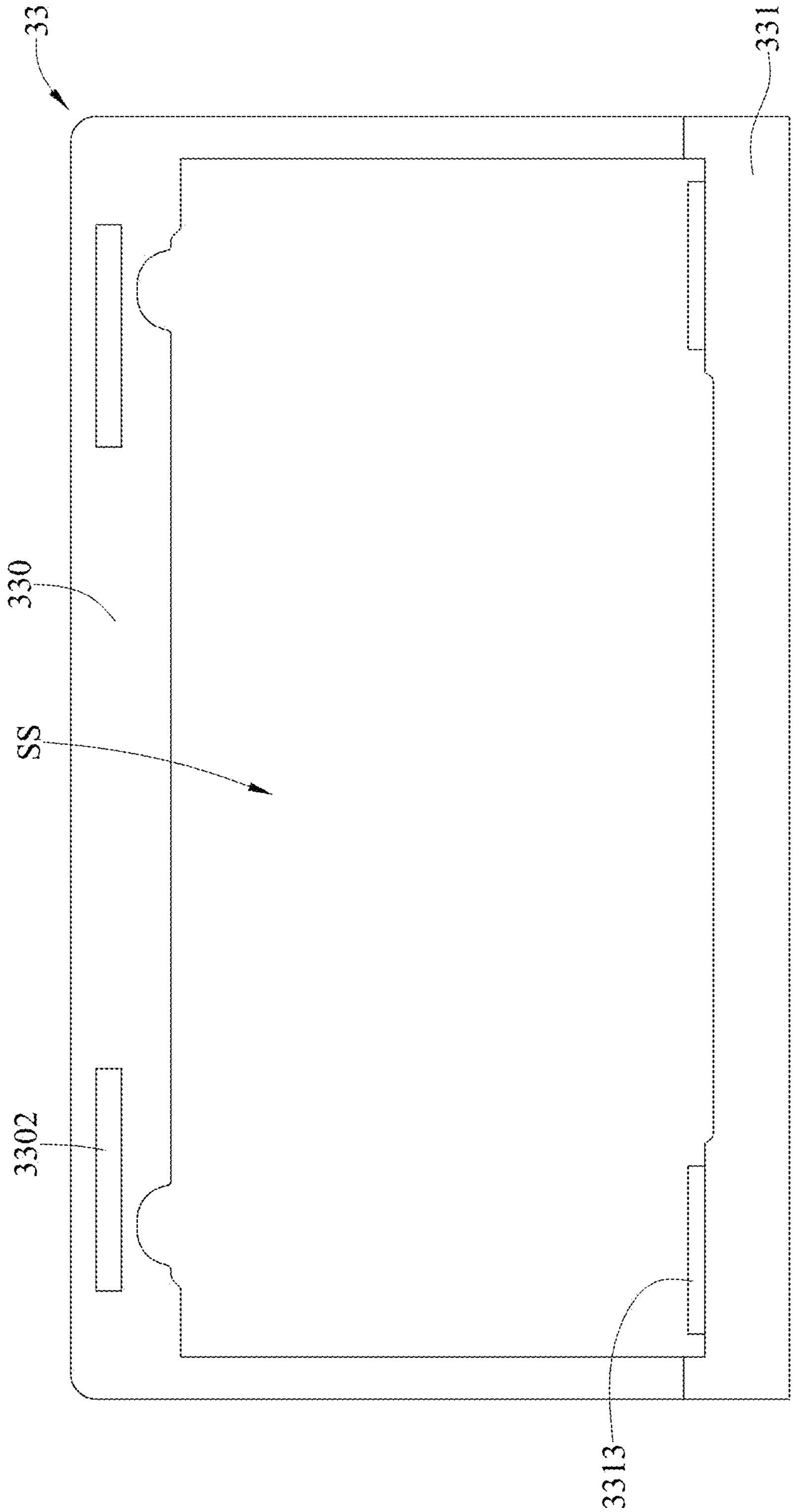
FIG. 25 is a cross-sectional view of the lens driving module along line 25-25 in FIG. 20.
Figure 26:
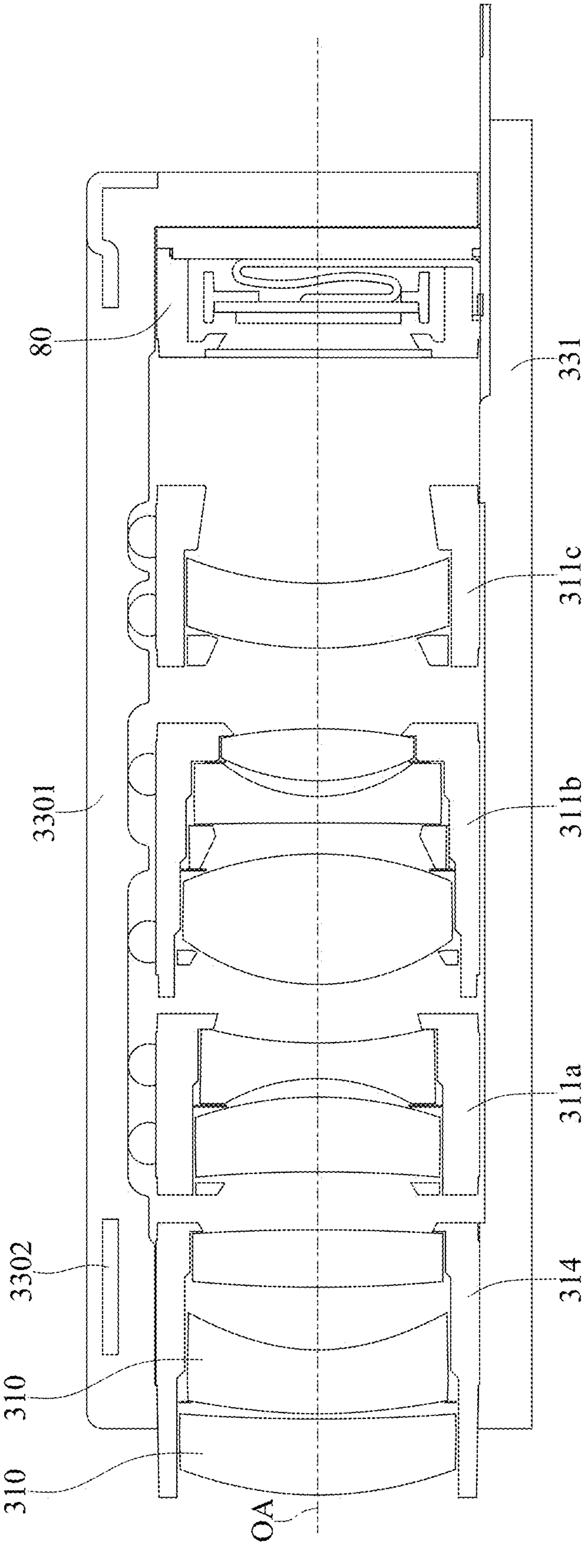
FIG. 26 is a cross-sectional view of the imaging lens system, the lens driving module and the image sensor module along line 26-26 in FIG. 20.
Figure 27:
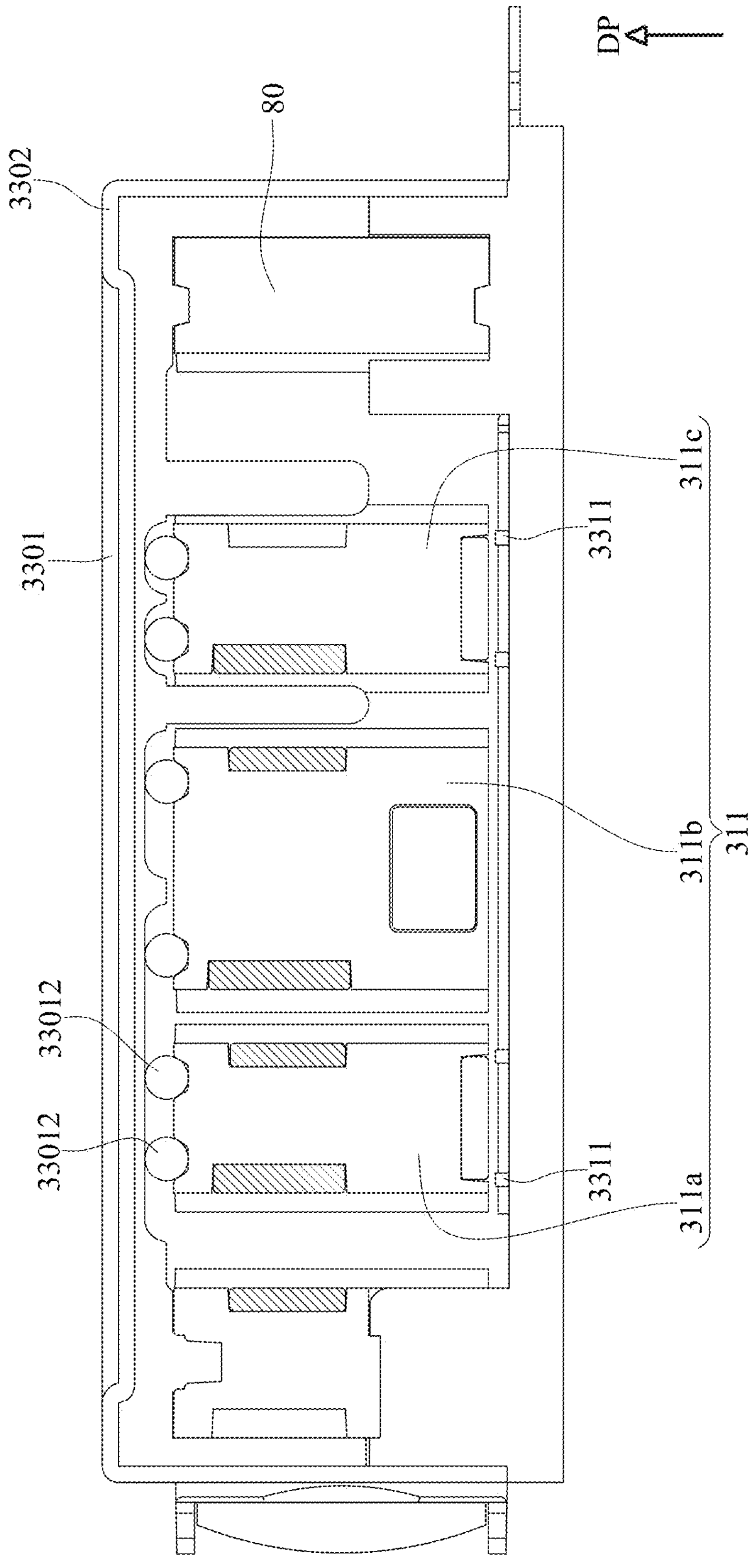
FIG. 27 is a cross-sectional view of the imaging lens system, the lens driving module and the image sensor module along line 27-27 in FIG. 20.
Figure 28:
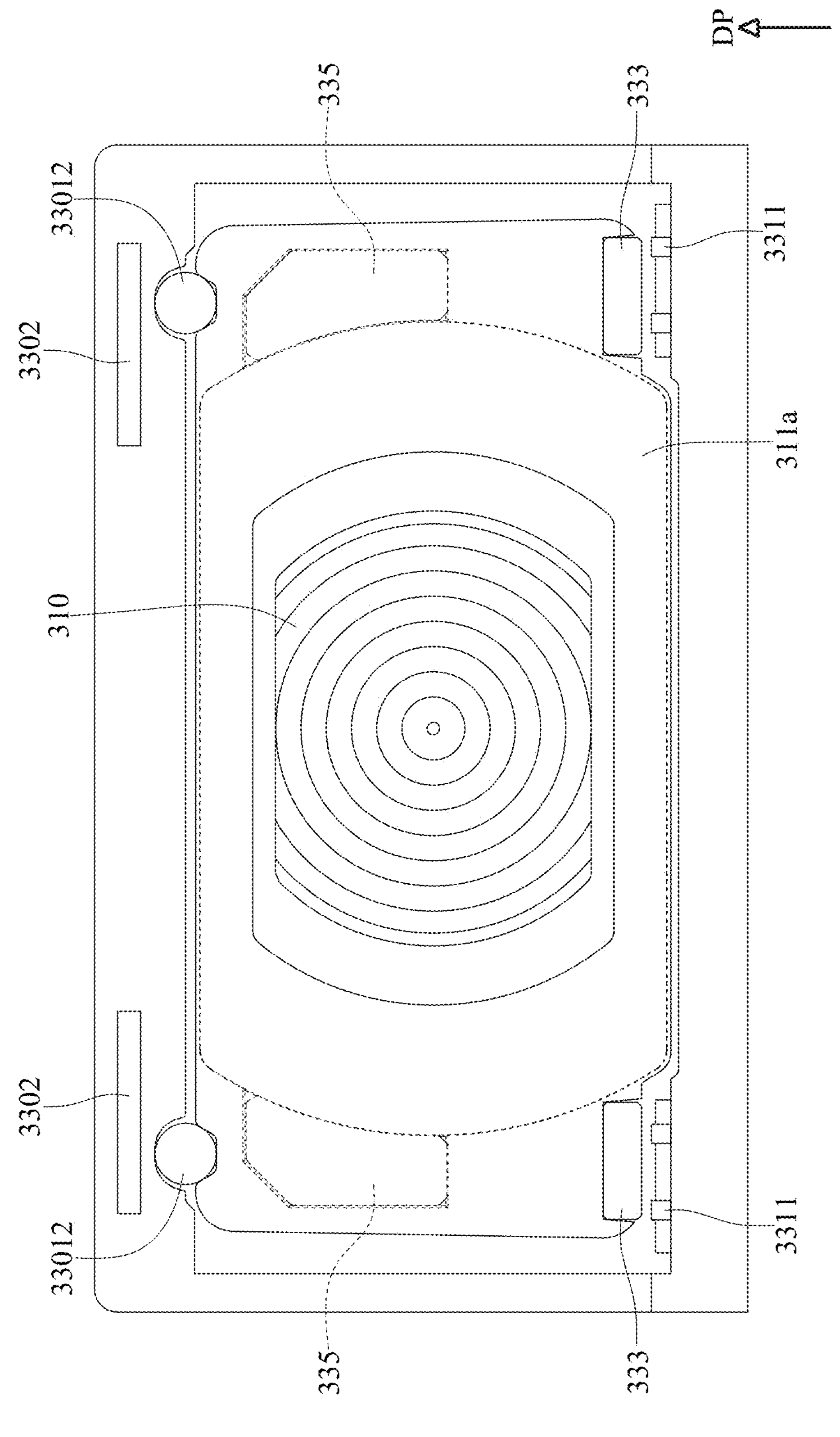
FIG. 28 is a cross-sectional view of the imaging lens system and the lens driving module along line 28-28 in FIG. 20.
Figure 29:
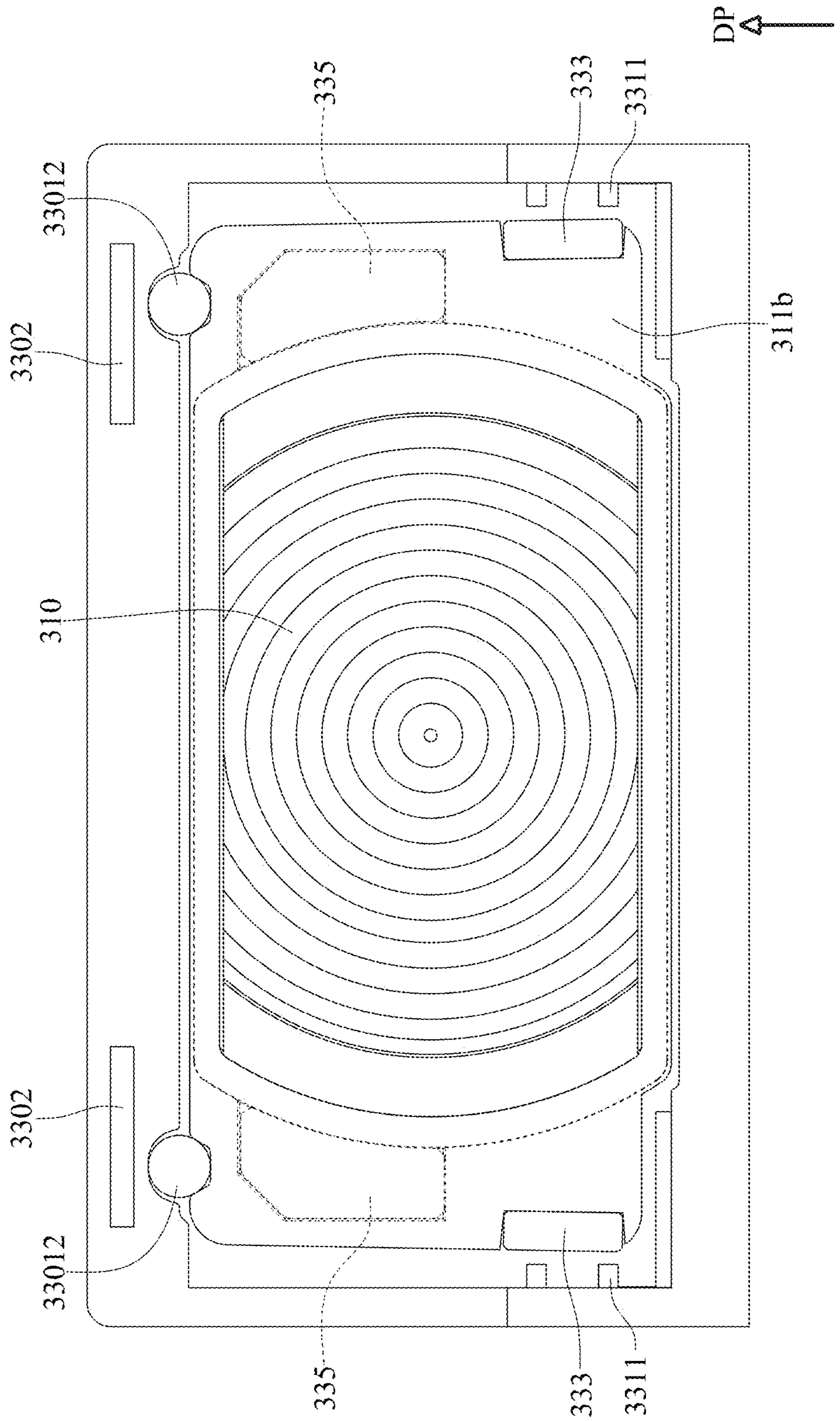
FIG. 29 is a cross-sectional view of the imaging lens system and the lens driving module along line 29-29 in FIG. 20.
Figure 30:
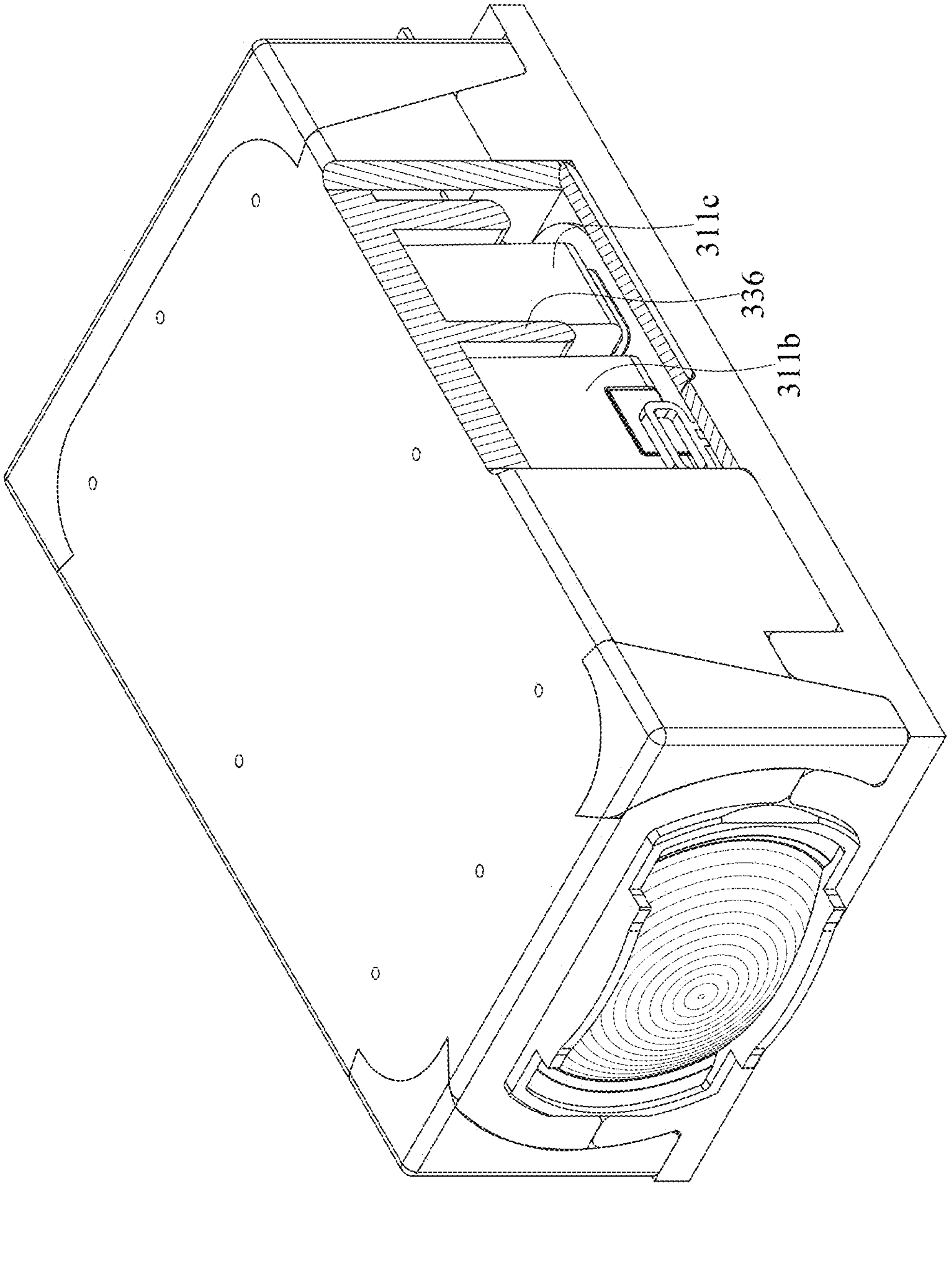
FIG. 30 is a partially sectioned view of the imaging lens system, the lens driving module and the image sensor module in FIG. 20.

Please refer to FIG. 20 to FIG. 30. FIG. 20 is a perspective view of an imaging lens system, a lens driving module and an image sensor module according to the 3rd embodiment of the present disclosure, FIG. 21 is a partially exploded and sectioned view of the imaging lens system, the lens driving module and the image sensor module in FIG. 20, FIG. 22 is an exploded another side view of a preloading element in FIG. 21, FIG. 23 is an exploded view of the imaging lens system, the lens driving module and the image sensor module in FIG. 20, FIG. 24 is an exploded view of a driving base in FIG. 23, FIG. 25 is a cross-sectional view of the lens driving module along line 25-25 in FIG. 20, FIG. 26 is a cross-sectional view of the imaging lens system, the lens driving module and the image sensor module along line 26-26 in FIG. 20, FIG. 27 is a cross-sectional view of the imaging lens system, the lens driving module and the image sensor module along line 27-27 in FIG. 20, FIG. 28 is a cross-sectional view of the imaging lens system and the lens driving module along line 28-28 in FIG. 20, FIG. 29 is a cross-sectional view of the imaging lens system and the lens driving module along line 29-29 in FIG. 20, and FIG. 30 is a partially sectioned view of the imaging lens system, the lens driving module and the image sensor module in FIG. 20.

In this embodiment, an imaging lens system 31 includes nine lens elements 310, a fixed lens carrier 314 and three displaceable lens carriers 311. The fixed lens carrier 314 is fixed in a lens driving module 33, and the displaceable lens carriers 311 are displaceable along an optical axis OA of the imaging lens system 31. The three displaceable lens carriers 311 are respectively a first displaceable lens carrier 311*a*, a second displaceable lens carrier 311*b* and a third displaceable lens carrier 311*c*.

The lens elements 310 are arranged along the optical axis OA, and the lens elements 310 include four groups which are, in order from an object side to an image side along the optical axis OA, a first lens group, a second lens group, a third lens group and a fourth lens group. The first lens group includes three of the lens elements 310, the second lens group includes two of the lens elements 310, the third lens group includes three of the lens elements 310 and the fourth lens group includes one of the lens elements 310. The first lens group is disposed in the fixed lens carrier 314, the second lens group is disposed in the first displaceable lens carrier 311*a*, the third lens group is disposed in the second displaceable lens carrier 311*b* and the fourth lens group is disposed in the third displaceable lens carrier 311*c*.

The lens driving module 33 is configured to provide the imaging lens system 31 with auto-focus functionality. The lens driving module 33 includes a preloading element 330, a driving base 331, six first magnets 333, twelve second magnets 335, a spacer structure 336 and a carrier-mounting structure 337. The imaging lens system 31 is disposed between the preloading element 330 and the driving base 331. In specific, the driving base 331 and the preloading element 330 together form an accommodation chamber SS configured for the imaging lens system 31 to be disposed therein. Furthermore, the first displaceable lens carrier 311*a*, the second displaceable lens carrier 311*b* and the third displaceable lens carrier 311*c* of the imaging lens system 31 are displaceable along the optical axis OA in the accommodation chamber SS.

Two of the first magnets 333 are respectively disposed on opposite sides of the first displaceable lens carrier 311*a*, another two of the first magnets 333 are respectively disposed on opposite sides of the second displaceable lens carrier 311*b*, and the other two of the first magnets 333 are respectively disposed on opposite sides of the third displaceable lens carrier 311*c*.

Two of the second magnets 335 are disposed on an image-side surface of the fixed lens carrier 314, another two of the second magnets 335 are disposed on an object-side of the first displaceable lens carrier 311*a*, another two of the second magnets 335 are disposed on an image-side surface of the first displaceable lens carrier 311*a*, another two of the second magnets 335 are disposed on an object-side of the second displaceable lens carrier 311*b*, another two of the second magnets 335 are disposed on an image-side surface of the second displaceable lens carrier 311*b*, and the other two of the second magnets 335 are disposed on an object-side of the third displaceable lens carrier 311*c*. In addition, the second magnets 335 disposed on the image-side surface of the fixed lens carrier 314 correspond to the second magnets 335 disposed on the object-side surface of the first displaceable lens carrier 311*a*, the second magnets 335 disposed on the image-side surface of the first displaceable lens carrier 311*a* correspond to the second magnets 335 disposed on the object-side surface of the second displaceable lens carrier 311*b*, and the second magnets 335 disposed on the image-side surface of the second displaceable lens carrier 311*b* correspond to the second magnets 335 disposed on the object-side surface of the third displaceable lens carrier 311*c*.

The preloading element 330 includes an injection molded part 3301 and a ferromagnetic part 3302. The injection molded part 3301 includes four pairs of mounting structures 33011 extending in a direction parallel to the optical axis OA and a plurality of rollable elements 33012. As to one pair of mounting structures 33011 closest to the object side, three rollable elements 33012 are disposed in each mounting structure 33011; as to the other pairs of mounting structures 33011, one rollable element 33012 is disposed in each mounting structure 33011. In addition, the first displaceable lens carrier 311*a*, the second displaceable lens carrier 311*b* and the third displaceable lens carrier 311*c* each includes four corresponding mounting structures 3111. The two mounting structures 33011 closest to the object side correspond to the four corresponding mounting structures 3111 of the first displaceable lens carrier 311*a* and the two corresponding mounting structures 3111 of the second displaceable lens carrier 311*b* closer to the object side, and the other mounting structures 33011 correspond to the two corresponding mounting structures 3111 of the second displaceable lens carrier 311*b* closer to the image side and the four corresponding mounting structures 3111 of the third displaceable lens carrier 311*c*. The rollable elements 33012 are in contact with the first displaceable lens carrier 311*a*, the second displaceable lens carrier 311*b* and the third displaceable lens carrier 311*c* and rollable in the corresponding mounting structures 3111, such that the first displaceable lens carrier 311*a*, the second displaceable lens carrier 311*b* and the third displaceable lens carrier 311*c* each has a degree of freedom in a direction parallel to the optical axis OA.

The ferromagnetic part 3302 is partially covered by the injection molded part 3301. Furthermore, in this embodiment, the ferromagnetic part 3302 may be insert-molded with the injection molded part 3301 to form the preloading element 330. The ferromagnetic part 3302 and the second magnets 335 together generate a magnetic attraction force, such that the first displaceable lens carrier 311*a*, the second displaceable lens carrier 311*b* and the third displaceable lens carrier 311*c* respectively exert a preloading force in a direction DP on the rollable elements 33012.

The driving base 331 includes six driving coils 3311, an electrical wiring pattern 3312 and a flexible printed circuit 3313. The driving coils 3311 are respectively disposed corresponding to the first magnets 333, and the driving coils 3311 and the first magnets 333 are configured to generate driving forces so as to drive the first displaceable lens carrier 311*a*, the second displaceable lens carrier 311*b* and the third displaceable lens carrier 311*c* to move along the optical axis OA. In addition, the driving coils 3311 corresponding to the first magnets 333 disposed on the first displaceable lens carrier 311*a* and the third displaceable lens carrier 311*c* are disposed on the flexible printed circuit 3313, and the driving coils 3311 corresponding to the first magnets 333 disposed on the second displaceable lens carrier 311*b* are disposed on side walls of a base body 3310 of the driving base 331 and electrically connected to the flexible printed circuit 3313 via metal wires formed by a laser direct structuring method. Therefore, it is favorable for preventing mechanical interferences between the first displaceable lens carrier 311*a* and the second displaceable lens carrier 311*b*.

In this embodiment, the first magnets 333 are located closer to the driving coils 3311 than the second magnets 335 are located relative to the driving coils 3311, and the first magnets 333 are located farther away from the ferromagnetic part 3302 than the second magnets 335 are located relative to the ferromagnetic part 3302. In addition, the displaceable lens carriers 311 are attracted and attached to the preloading element 330 via the second magnets 335, and the displaceable lens carriers 311 can be driven to move by driving components (e.g., the driving coils 3311) on the driving base 331 through the magnetic field of the first magnets 333. Moreover, the second magnets 335 on adjacent two of the displaceable lens carriers 311 can attract or repel each other.

The flexible printed circuit 3313 is attached to an attachment surface 33101 of the base body 3310 of the driving base 331 so as to prevent the flexible printed circuit 3313 from be frequently bent, thereby extending the service life of the flexible printed circuit 3313 and simplifying the assembling process. In addition, the electrical wiring pattern 3312 is formed on the flexible printed circuit 3313. In the figures of this embodiment, the electrical wiring pattern is only exemplary and illustrated to show its electrical connection functionality, and it is not the actual circuit structure or actual number of circuit contacts.

The driving coils 3311 and the rollable elements 33012 are disposed on opposite sides of the displaceable lens carriers 311 in the direction DP of the preloading force, and the driving base 331 and the preloading element 330 are disposed on opposite sides of the fixed lens carrier 314 and the displaceable lens carriers 311 in the direction DP of the preloading force.

As shown in FIG. 27 to FIG. 29, the driving coils 3311, the rollable elements 33012 and the ferromagnetic part 3302 are arranged in order along the direction DP of the preloading force. In one condition where the environmental resistance forces and the gravity are neglected, a resultant force of a driving force, a reaction force of the preloading force and a magnetic attraction force exerted on each of the displaceable lens carriers 311 respectively by the driving coils 3311, the rollable elements 33012 and the ferromagnetic part 3302 can drive the displaceable lens carriers to move in a direction parallel to the optical axis OA.

The spacer structure 336 is disposed on the preloading element 330 and located between the second displaceable lens carrier 311*b* and the third displaceable lens carrier 311*c* so as to prevent collisions between the second displaceable lens carrier 311*b* and the third displaceable lens carrier 311*c* and control interferences of magnetic fields generated between magnets respectively disposed on the second displaceable lens carrier 311*b* and the third displaceable lens carrier 311*c*.

The carrier-mounting structure 337 includes two positioning recesses 3371 and two positioning protrusions 3372. The positioning recesses 3371 are located on the base body 3310 of the driving base 331, and the positioning protrusions 3372 are located on the preloading element 330. The fixed lens carrier 314 is in physical contact with the positioning recesses 3371 and the positioning protrusions 3372 of the carrier-mounting structure 337 and is fixed in position.

Figure 31:
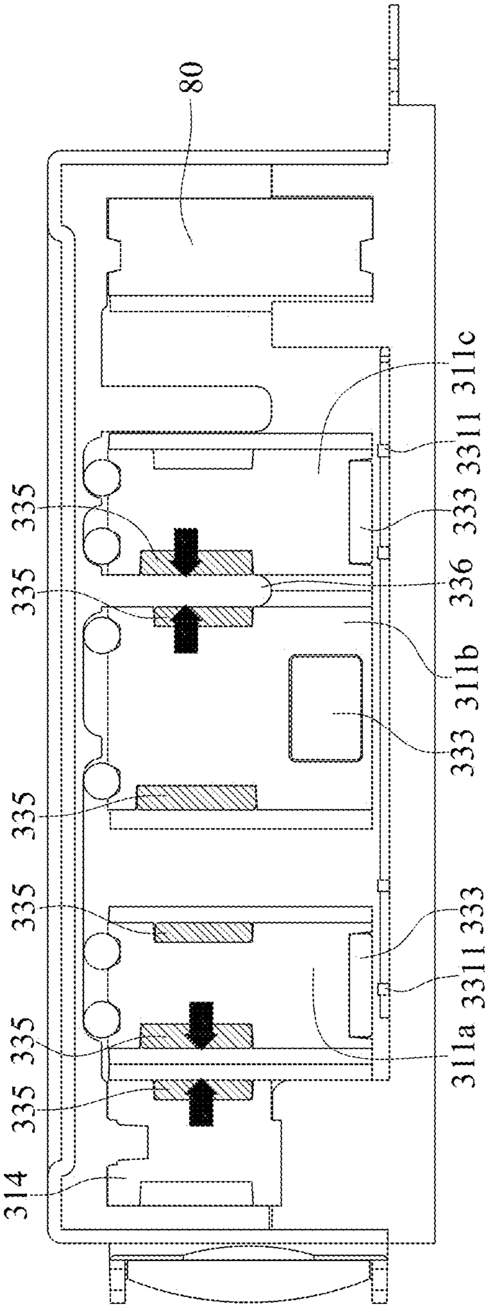
FIG. 31 and FIG. 32 show the operation processes of displaceable lens carriers in one configuration where corresponding two second magnets are attracted to each other.
Figure 32:
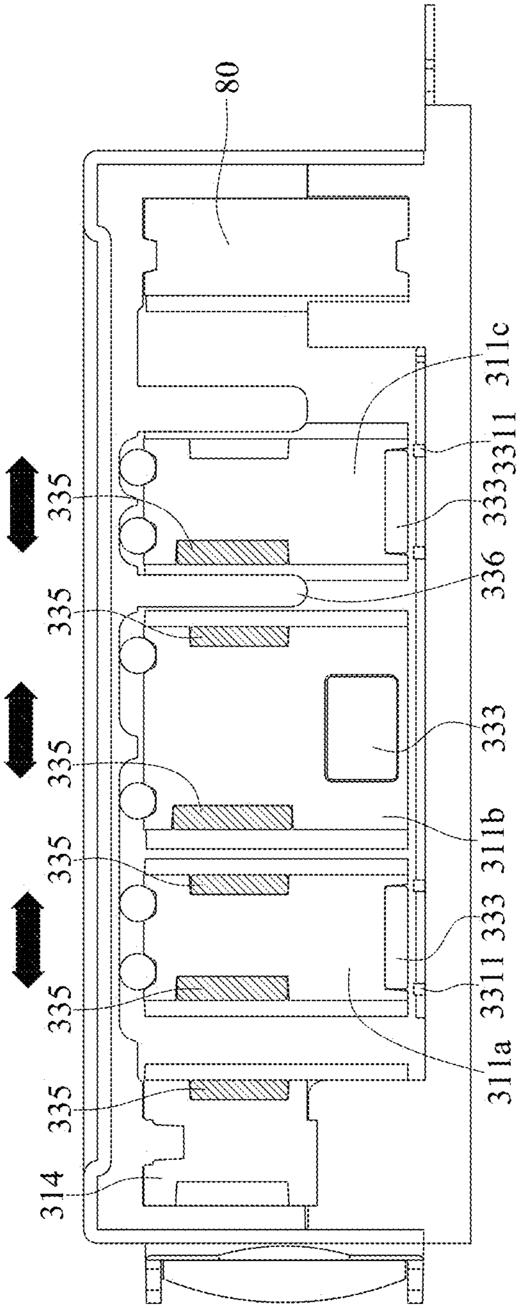
Figure 33:
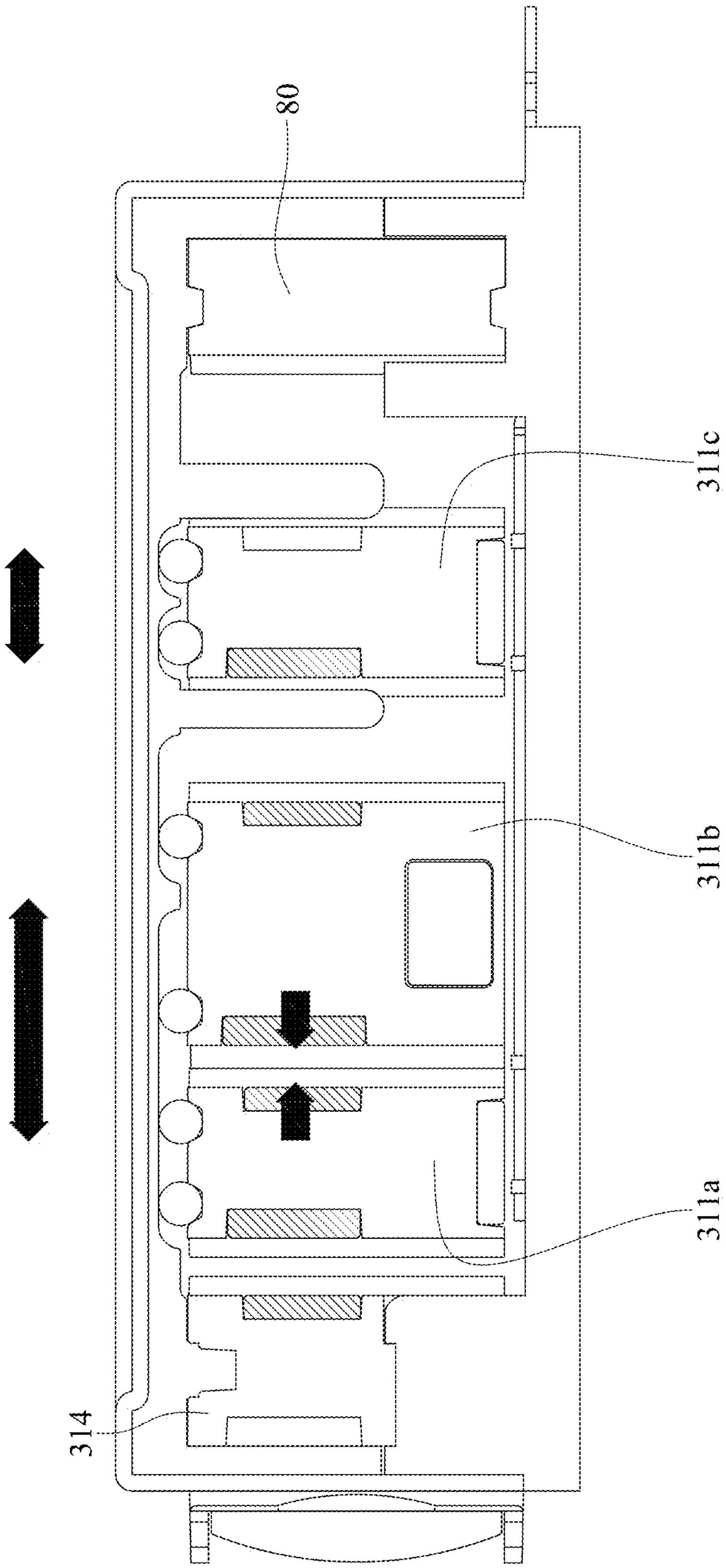
FIG. 33 shows another configuration where corresponding two second magnets are attracted to each other.
Figure 34:
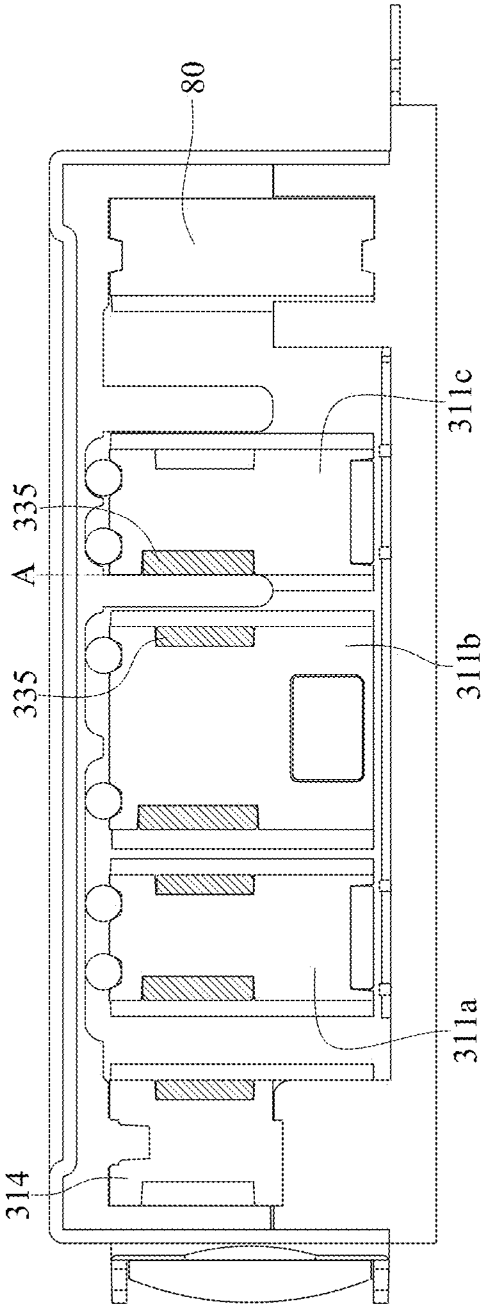
FIG. 34 and FIG. 35 show the operation processes of displaceable lens carriers in one configuration where a second magnet disposed on a second displaceable lens carrier and a second magnet disposed on a third displaceable lens carrier are repelled from each other.
Figure 35:
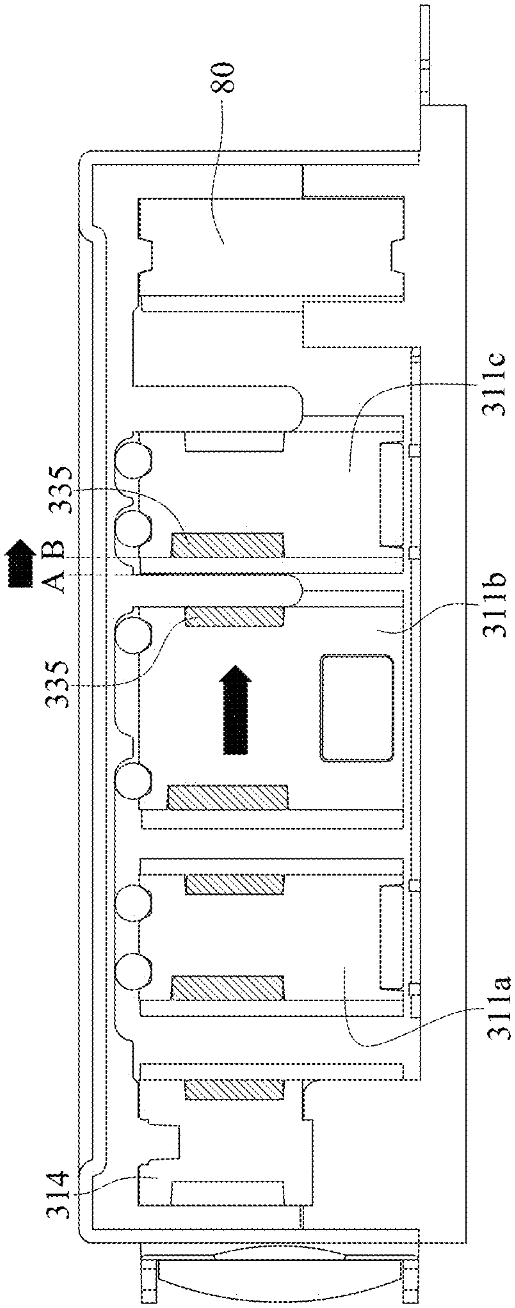

Please refer to FIG. 31 to FIG. 35. FIG. 31 and FIG. 32 show the operation processes of displaceable lens carriers in one configuration where corresponding two second magnets are attracted to each other, FIG. 33 shows another configuration where corresponding two second magnets are attracted to each other, and FIG. 34 and FIG. 35 show the operation processes of displaceable lens carriers in one configuration where a second magnet disposed on a second displaceable lens carrier and a second magnet disposed on a third displaceable lens carrier are repelled from each other.

In this embodiment, each of the first displaceable lens carrier 311*a*, the second displaceable lens carrier 311*b* and the third displaceable lens carrier 311*c* has a certain movement range along the optical axis OA. In one configuration, in one condition where the first displaceable lens carrier 311*a* and the second displaceable lens carrier 311*b* move together and the distance therebetween is constant, the focal point of the imaging lens system 31 is adjusted for focusing; when the distance between the first displaceable lens carrier 311*a* and the second displaceable lens carrier 311*b* is changed, the focal length of the imaging lens system 31 is adjusted for zooming. In addition, referring to FIG. 32 and FIG. 33, the certain movement range of the first displaceable lens carrier 311*a* at least partially overlaps the certain movement range of the second displaceable lens carrier 311*b* in the direction parallel to the optical axis OA. Moreover, the certain movement range of the second displaceable lens carrier 311*b* does not overlap the certain movement range of the third displaceable lens carrier 311*c* in the direction parallel to the optical axis OA. The spacer structure 336 is disposed between the second displaceable lens carrier 311*b* and the third displaceable lens carrier 311*c* so as to limit the certain movement ranges of the second displaceable lens carrier 311*b* and the third displaceable lens carrier 311*c* in the direction parallel to the optical axis OA for preventing collisions and controlling interferences of magnetic fields. The two mounting structures 33011 disposed on the preloading element 330 closest to the object side receive the four rollable elements 33012 corresponding to the first displaceable lens carrier 311*a* and the two rollable element 33012 corresponding to the second displaceable lens carrier 311*b*. The fourth lens group in the third displaceable lens carrier 311*c* is configured to optimize the image quality, and further, the fourth lens group is capable of optimizing the image quality regarding factors of various focal lengths, focusing distances, imaging objects and environmental temperatures, thereby improving the image resolution or making imaging objects stand out.

As shown in FIG. 31 and FIG. 32, in one configuration, the lens carriers 314 and 311 that are adjacent to each other attract each other via the second magnets 335.

When a photographing camera including the imaging lens system 31 and the lens driving module 33 of the present disclosure is not in use, the first displaceable lens carrier 311*a* is attracted and attached to the image side of the fixed lens carrier 314 via the second magnets 335, and the second displaceable lens carrier 311*b* and the third displaceable lens carrier 311*c* are attracted to each other via the second magnets 335 and together clamp the spacer structure 336. The spacer structure 336 is configured to maintain a proper magnetic attraction force between the second and third displaceable lens carriers 311*b* and 311*c* and maintain the second and third displaceable lens carriers 311*b* and 311*c* fixed in position relative to the lens driving module 33, thereby preventing collisions between the lens carries and thus preventing damages of the lens carries.

When the photographing camera is turned on, the displaceable lens carriers 311, which are originally attracted together and fixed in position, are driven to an operation position by the driving force generated by the driving coils 3311 the first magnets 333. In detail, the first displaceable lens carrier 311*a*, the second displaceable lens carrier 311*b* and the third displaceable lens carrier 311_c_ can be driven to move by the lens driving module 33. In addition, the certain movement range of the first displaceable lens carrier 311_a_ partially overlaps the certain movement range of the second displaceable lens carrier 311_b_ in the direction parallel to the optical axis OA. The imaging lens system 31 is provided with focus and zoom functionalities through the movements of the first displaceable lens carrier 311_a_ and the second displaceable lens carrier 311_b_, and the third displaceable lens carrier 311_c_ can be driven to move so as to optimize the image quality.

As shown in FIG. 33, in one configuration, the first displaceable lens carrier 311_a_ and the second displaceable lens carrier 311_b_ can attract each other and be moved together along the optical axis OA so as to increase the stability when the displaceable lens carriers are driven to move, thereby reducing vibrations of the displaceable lens carriers.

In one configuration, some of the second magnets 335 may be replaced with iron sheets or ferromagnetic components so as to achieve identical or similar effects provided by the above described configurations, and the present disclosure is not limited thereto.

As shown in FIG. 34 and FIG. 35, in one configuration, the second magnets 335 disposed on the second displaceable lens carrier 311_b_ and the second magnets 335 disposed on the third displaceable lens carrier 311_c_ repel each other.

When the second displaceable lens carrier 311_b_ is moved to a certain position, the third displaceable lens carrier 311_c_ is moved to another certain position due to a repulsive force so as to optimize the image quality in some particular conditions. In such conditions, the driving coils 3311 and the first magnets 333 corresponding to the third displaceable lens carrier 311_c_ may not in operation or even may not be installed, thereby simplifying the driver control system.

In specific, when the second displaceable lens carrier 311_b_ is driven to move to a certain position close to the spacer structure 336, the third displaceable lens carrier 311_c_ originally located in a position A (as shown in FIG. 34) is moved to a position B (as shown in FIG. 35) so as to optimize the image quality. In such conditions, the driving coils 3311 and the first magnets 333 corresponding to the third displaceable lens carrier 311_c_ may not in operation or even may not be installed, thereby simplifying the driver control system.

When a maximum focal length of the imaging lens system 31 is fmax, and a minimum focal length of the imaging lens system 31 is fmin, the following conditions are satisfied: fmax=26.0 mm; fmin=11.0 mm; and fmax/fmin=2.36.

When a maximum field of view of the imaging lens system 31 is FOV, the following conditions respectively at the maximum focal length and minimum focal length are satisfied: FOV=11.0 degrees; and FOV=25.7 degrees.

When a stroke length of the displaceable lens carriers 311 is Sd, the following condition is satisfied: 0.8 mm≤Sd<8.0 mm. In detail, a stroke length of the first displaceable lens carrier 311_a_, a stroke length of the second displaceable lens carrier 311_b_ and a stroke length of the third displaceable lens carrier 311_c_ are respectively larger than or equal to 0.8 mm and smaller than 8.0 mm.

An image sensor module 80 is disposed in the accommodation chamber SS of the lens driving module 33. In specific, the lens driving module 33 further includes a sensor mounting structure 338, and the sensor mounting structure 338 includes two positioning recesses 3381 and two positioning protrusions 3382. The positioning recesses 3381 are located on the base body 3310 of the driving base 331, and the positioning protrusions 3382 are located on the preloading element 330. In addition, the image sensor module 80 is in physical contact with the positioning recesses 3381 and the positioning protrusions 3382 of the sensor mounting structure 338 and is fixed in position, and the image sensor module 80 is located on the image side of the imaging lens system 31 so as to receive image optical information and convert it into electrical signals.

Figure 36:
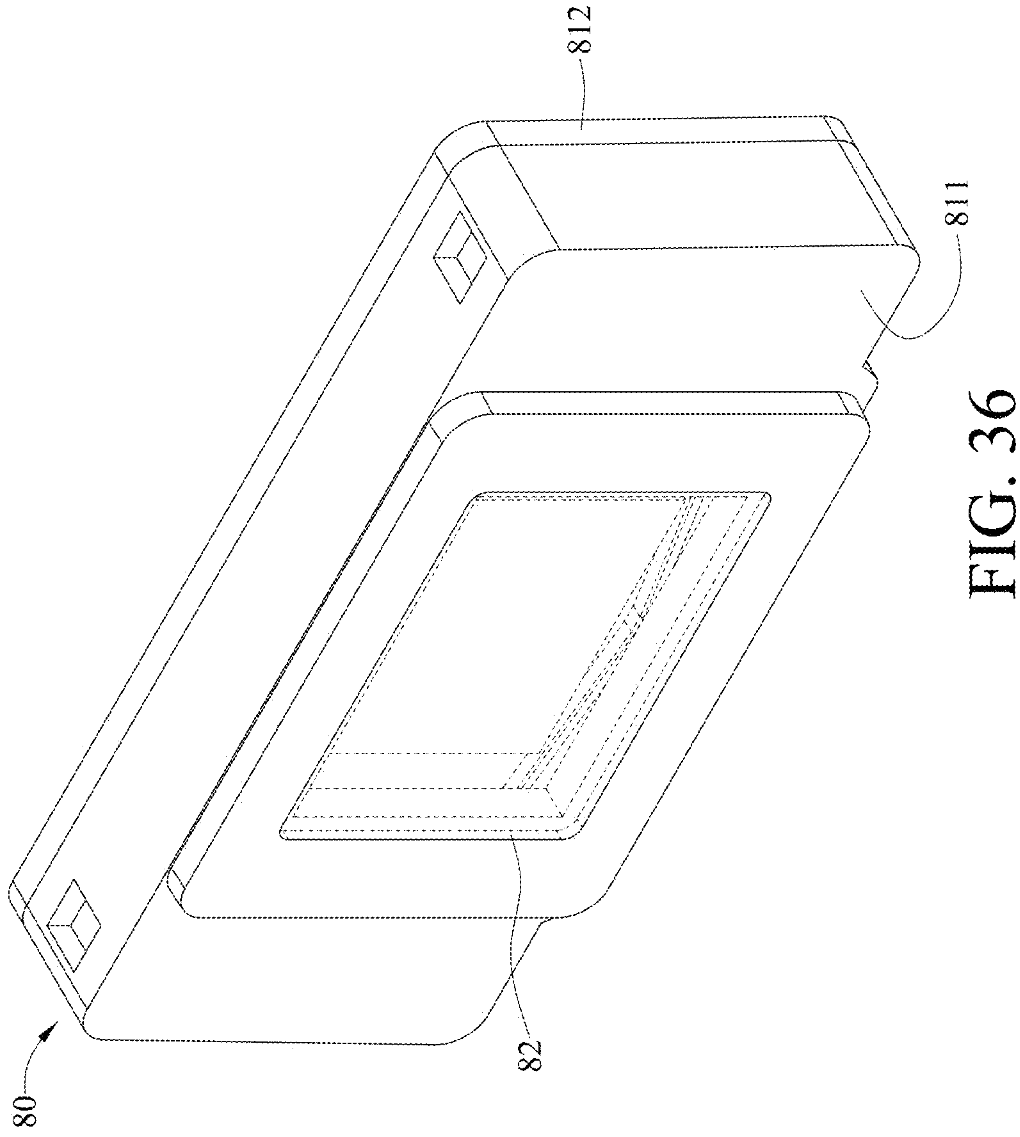
FIG. 36 is a perspective view of the image sensor module in FIG. 20.
Figure 37:
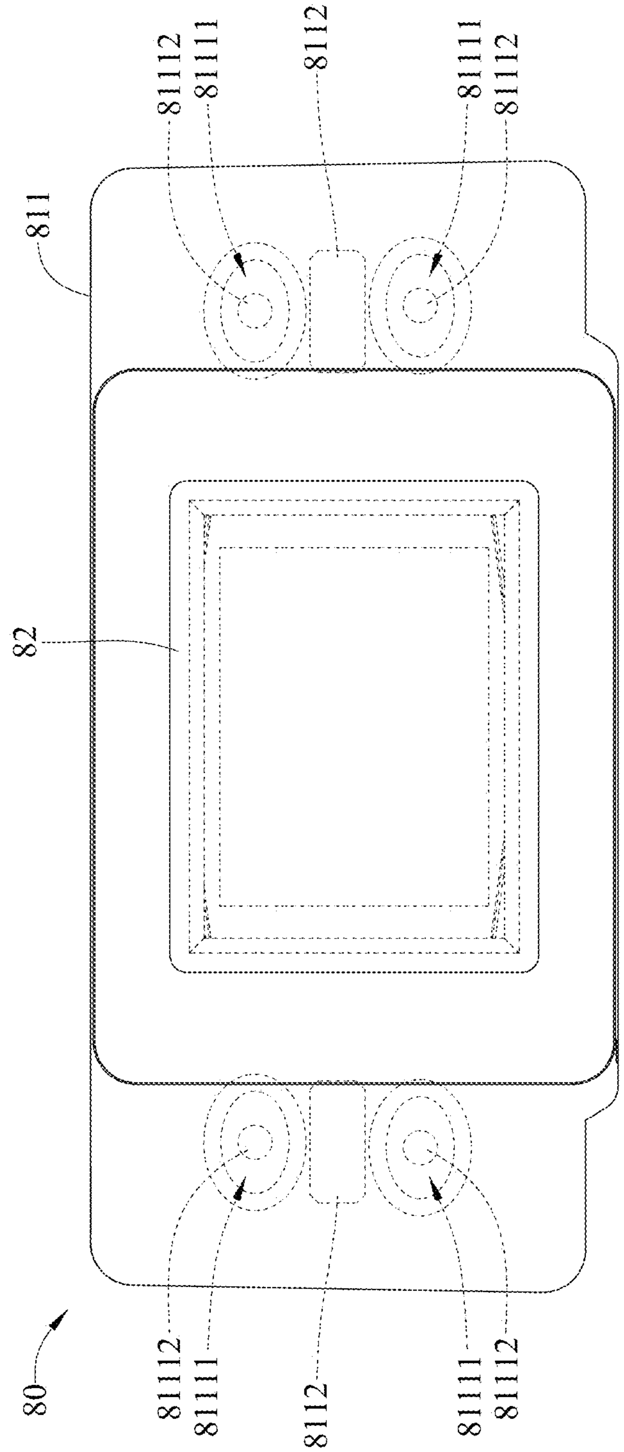
FIG. 37 is a front view of the image sensor module in FIG. 36.
Figure 38:
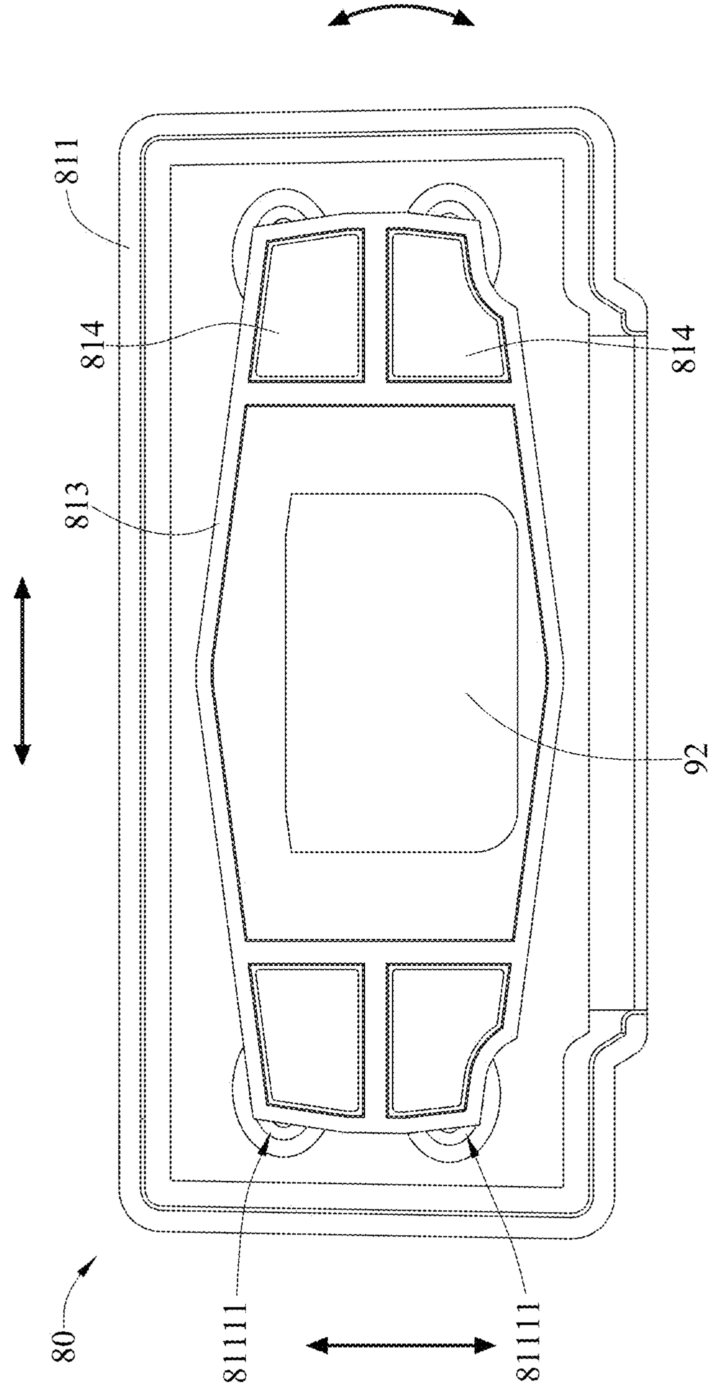
FIG. 38 is a rear view of the image sensor module excluding a driving base in FIG. 36.
Figure 39:
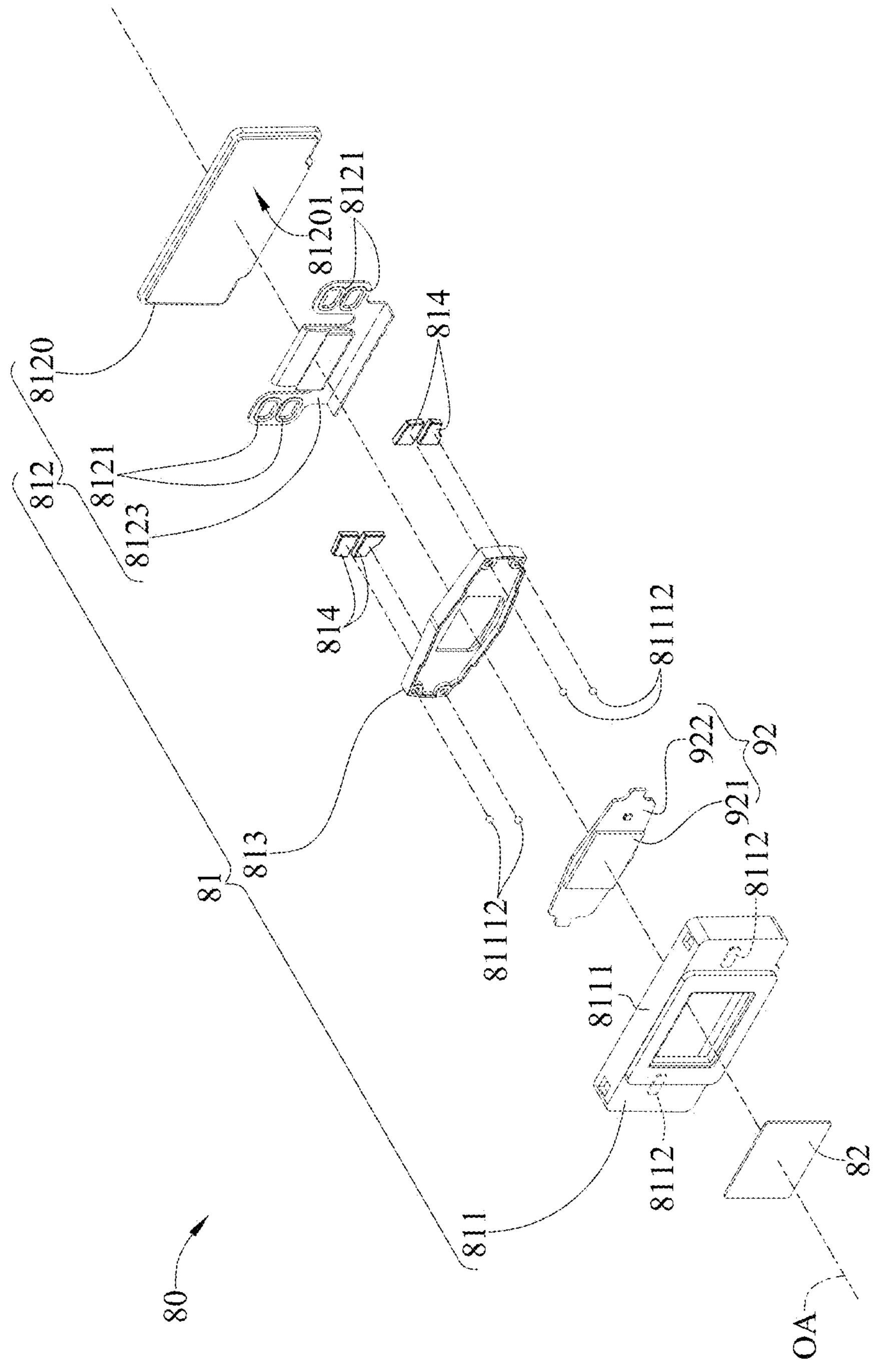
FIG. 39 is an exploded view of the image sensor module in FIG. 36.
Figure 40:
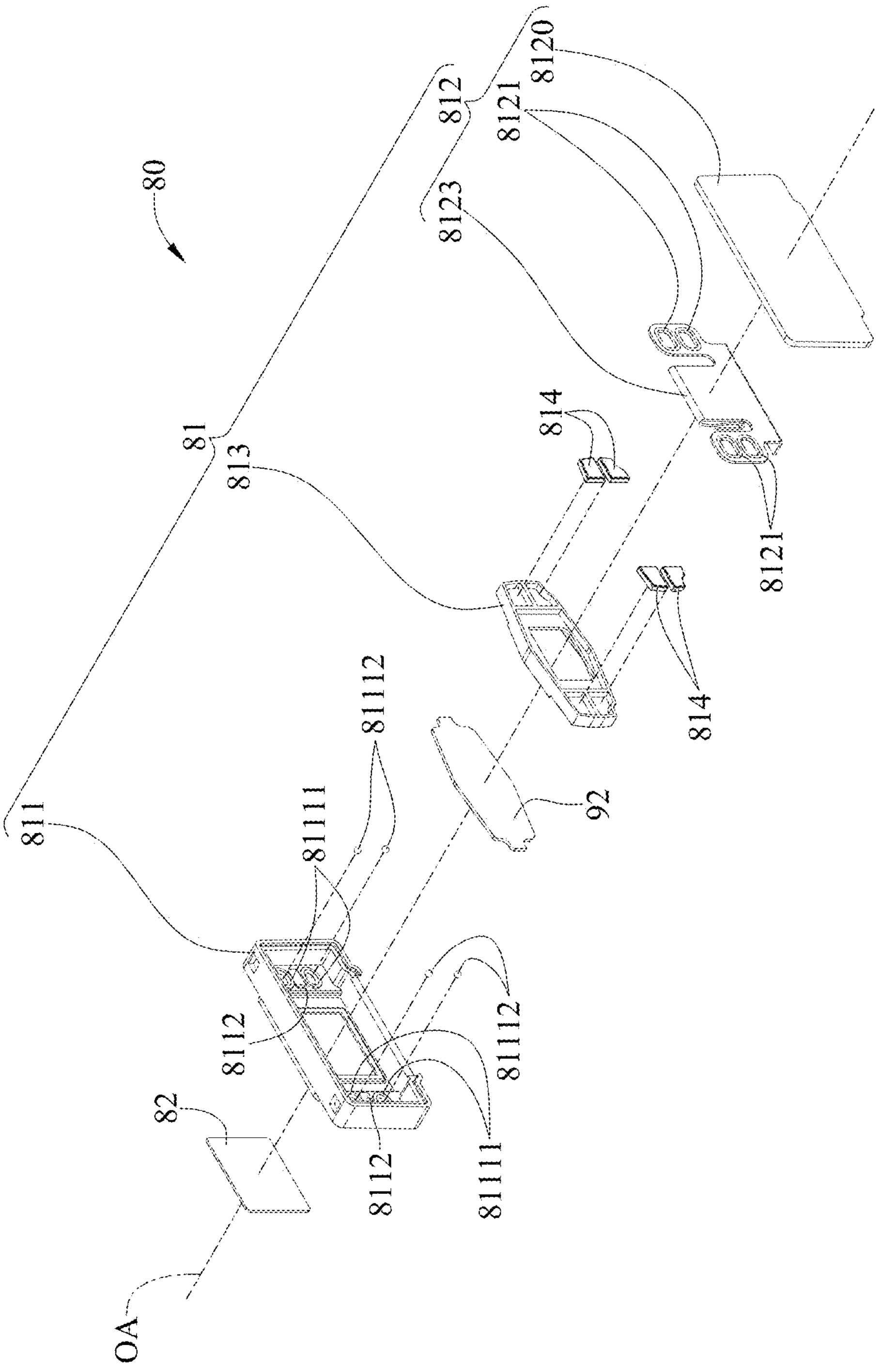
FIG. 40 is another exploded view of the image sensor module in FIG. 36.

Furthermore, please refer to FIG. 36 to FIG. 40. FIG. 36 is a perspective view of the image sensor module in FIG. 20, FIG. 37 is a front view of the image sensor module in FIG. 36, FIG. 38 is a rear view of the image sensor module excluding a driving base in FIG. 36, FIG. 39 is an exploded view of the image sensor module in FIG. 36, and FIG. 40 is another exploded view of the image sensor module in FIG. 36.

The image sensor module 80 includes an image sensor 92 and a component driver device 81.

The image sensor 92 is disposed on an image surface of the imaging lens system 31, and the image sensor 92 includes a photosensitive area 921 and a non-photosensitive area 922. The photosensitive area 921 is configured to receive imaging light and convert said imaging light into electrical signals, and the non-photosensitive area 922 can have electronic components disposed thereon.

The component driver device 81 is configured to drive the image sensor 92 to move in a direction perpendicular to the optical axis OA so as to achieve optical image stabilization. The component driver device 81 includes a preloading element 811, a driving base 812 and an image sensor carrier 813 for holding the image sensor 92. The image sensor carrier 813 is disposed between the preloading element 811 and the driving base 812.

The preloading element 811 includes an injection molded part 8111 and two ferromagnetic parts 8112. The injection molded part 8111 has four mounting structures 81111 facing the image sensor carrier 813 and four rollable elements 81112 disposed in respective mounting structures 81111. The rollable elements 81112 are in contact with the image sensor carrier 813 and provide the image sensor carrier 813 with a degree of freedom on a plane perpendicular to the optical axis OA.

The ferromagnetic parts 8112 are partially embedded into the injection molded part 8111, and the ferromagnetic parts 8112 and four driving magnets 814 disposed on the image sensor carrier 813 together generate a magnetic attraction force, such that the image sensor carrier 813 exerts a preloading force on the rollable elements 81112.

The driving base 812 includes four driving coils 8121, an electrical wiring pattern (not shown) and a flexible printed circuit 8123. The driving coils 8121 and the ferromagnetic parts 8112 are disposed on opposite sides of the image sensor carrier 813, and the driving coils 8121 are disposed corresponding to the driving magnets 814. The driving coils 8121 and the driving magnets 814 are configured to drive the image sensor carrier 813 to move along the optical axis OA. Furthermore, the electrical wiring pattern is electrically connected to the driving coils 8121, and the flexible printed circuit 8123 has the driving coils 8121 and the electrical wiring pattern formed thereon. Moreover, the flexible printed circuit 8123 is attached to an attachment surface 81201 of a base body 8120 of the driving base 812.

In addition, the flexible printed circuit 8123 in the image sensor module 80 is electrically connected to image sensor module contacts 33130 on the flexible printed circuit 3313 in the lens driving module 33 so as to simplify connection lines of the photographing camera to external components, thereby improving assembling yield rate.

Moreover, the image sensor module 80 further includes a filter 82 disposed between the image sensor 92 and the imaging lens system 31 and in physical contact with the preloading element 811.

4th Embodiment

Figure 41:
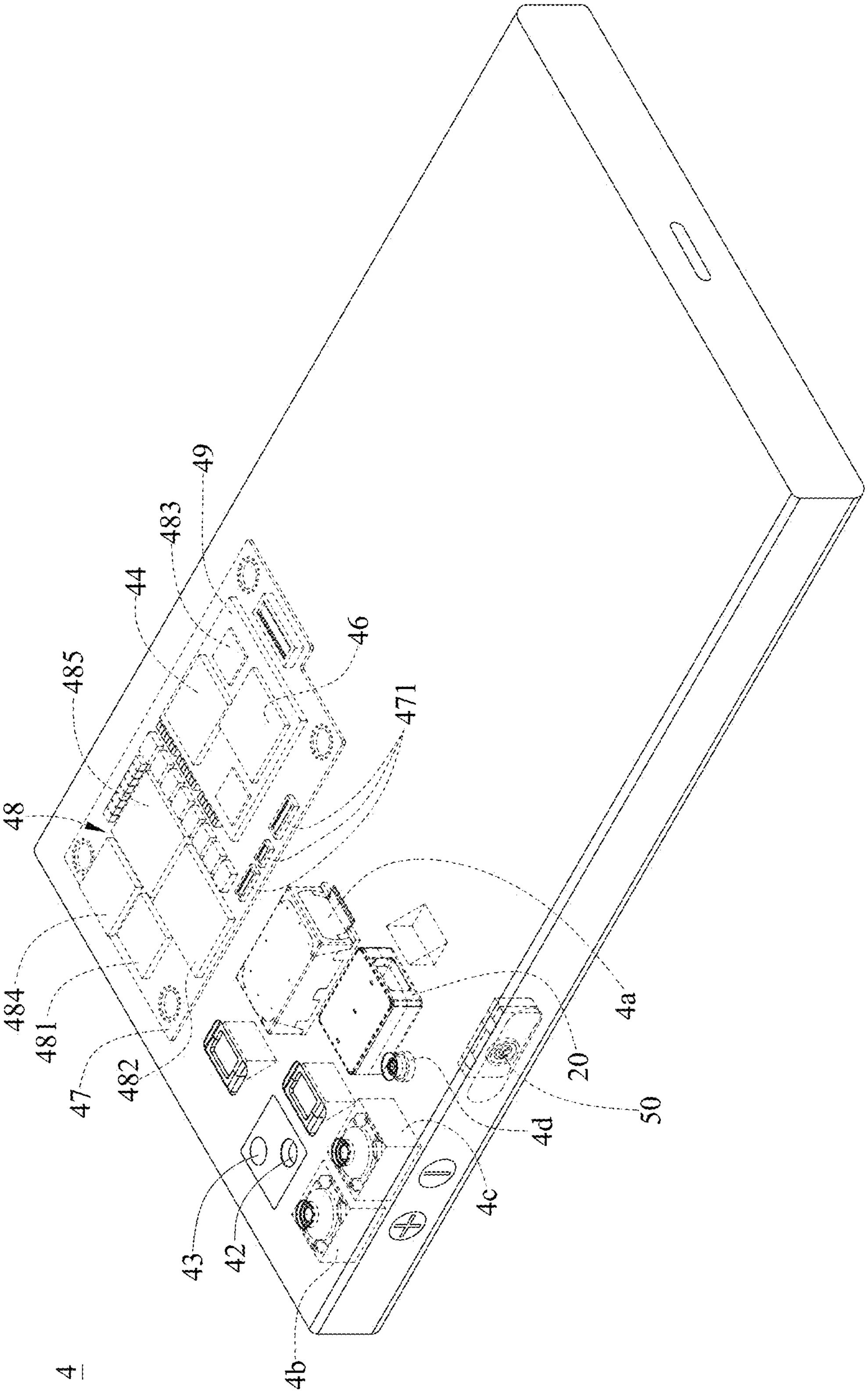
FIG. 41 is one perspective view of an electronic device according to the 4th embodiment of the present disclosure.
Figure 42:
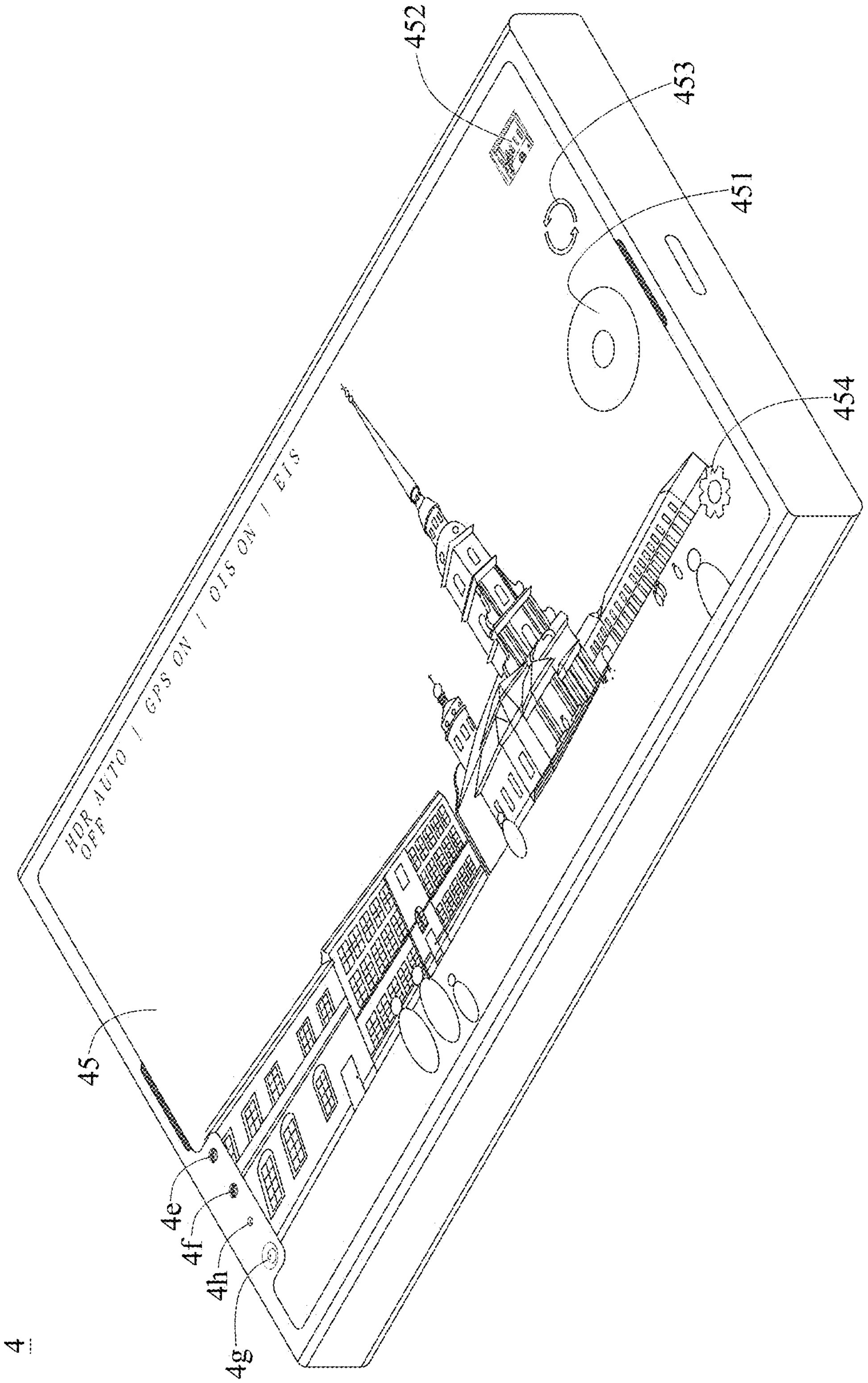
FIG. 42 is another perspective view of the electronic device in FIG. 41.
Figure 43:
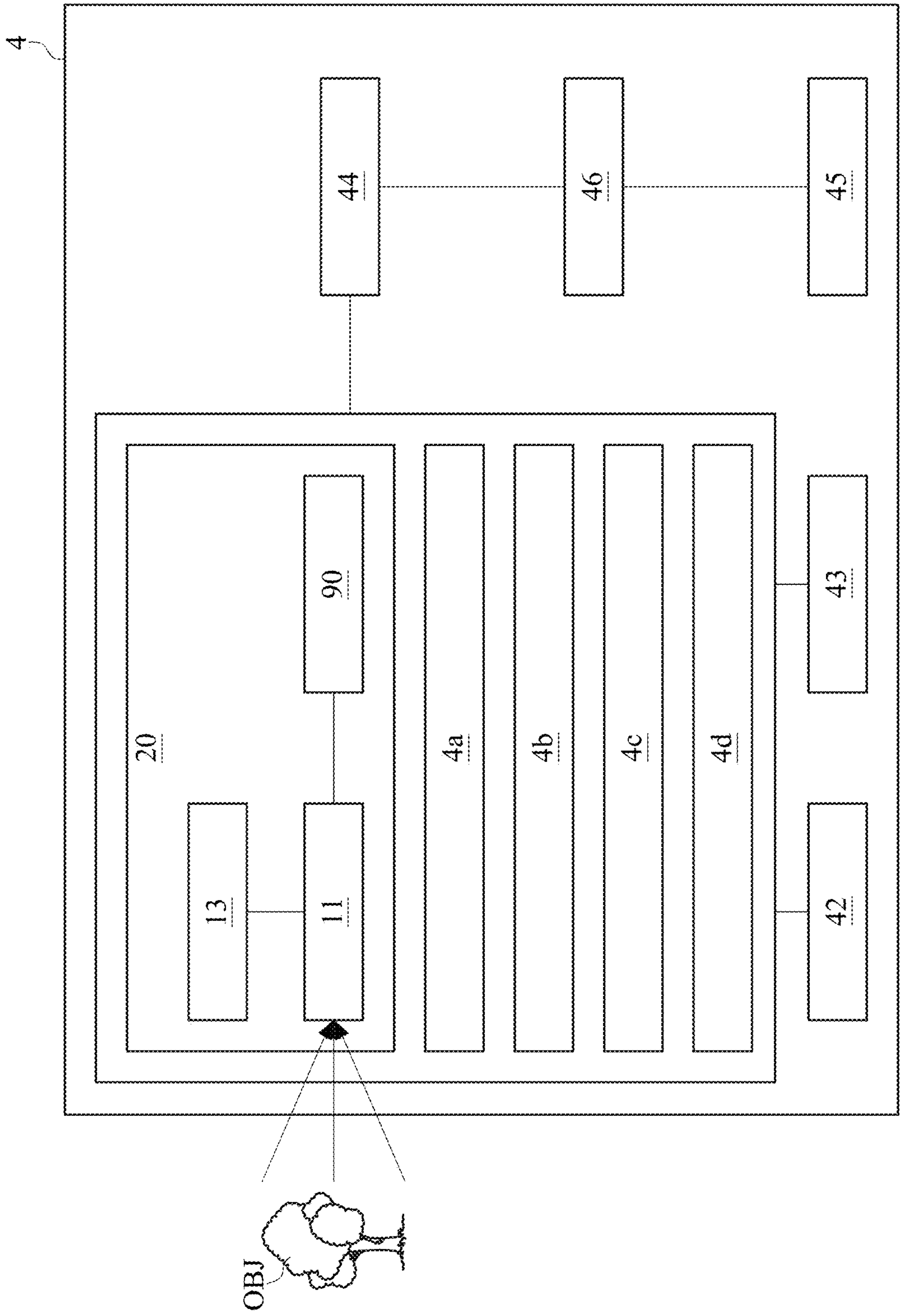
FIG. 43 is a block diagram of the electronic device in FIG. 41.

Please refer to FIG. 41 to FIG. 43. FIG. 41 is one perspective view of an electronic device according to the 4th embodiment of the present disclosure, FIG. 42 is another perspective view of the electronic device in FIG. 41, and FIG. 43 is a block diagram of the electronic device in FIG. 41.

In this embodiment, an electronic device 4 is a mobile device such as a computer, a smartphone, a smart wearable device, a camera drone, a driving recorder and displayer, and the present disclosure is not limited thereto. The electronic device 4 including the photographing camera 20 disclosed in the 2nd embodiment, a photographing camera **4*a*, an image capturing unit 4*b*, an image capturing unit 4*c*, an image capturing unit 4*d*, an image capturing unit 4*e*, an image capturing unit 4*f*, an image capturing unit 4*g*, a flash module 42, a focus assist module 43, an image signal processor 44, a display module 45, an image software processor 46 and a biometric identification device 50. In addition, the photographing camera 4*a* includes the imaging lens system 31 and the lens driving module 33** disclosed in the 3rd embodiment and a light-folding element (not shown).

The photographing camera 20, the photographing camera **4*a*, the image capturing unit 4*b*, the image capturing unit 4*c* and the image capturing unit 4*d* are disposed on the same side of the electronic device 4. The image capturing unit 4*e*, the image capturing unit 4*f*, the image capturing unit 4*g* and the display module 45 are disposed on the opposite side of the electronic device 4. The display module 45 can be a user interface, such that the image capturing units 4*e*, 4*f* can be front-facing cameras of the electronic device 4** for taking selfies, but the present disclosure is not limited thereto.

Each of the image capturing units **4*b*, 4*c*, 4*d*, 4*e*, 4*f* and 4*g* can include the lens driving module of the present disclosure and can have a configuration similar to that of the photographing camera 20 or the photographing camera 4*a*. In detail, each of the image capturing units 4*b*, 4*c*, 4*d*, 4*e*, 4*f* and 4*g* can include an imaging lens system, a lens driving module and an image stabilizer, and each of the lens driving module of the image capturing units 4*b*, 4*c*, 4*d*, 4*e*, 4*f* and 4*g*** can be the lens driving module of the present disclosure.

Figure 44:
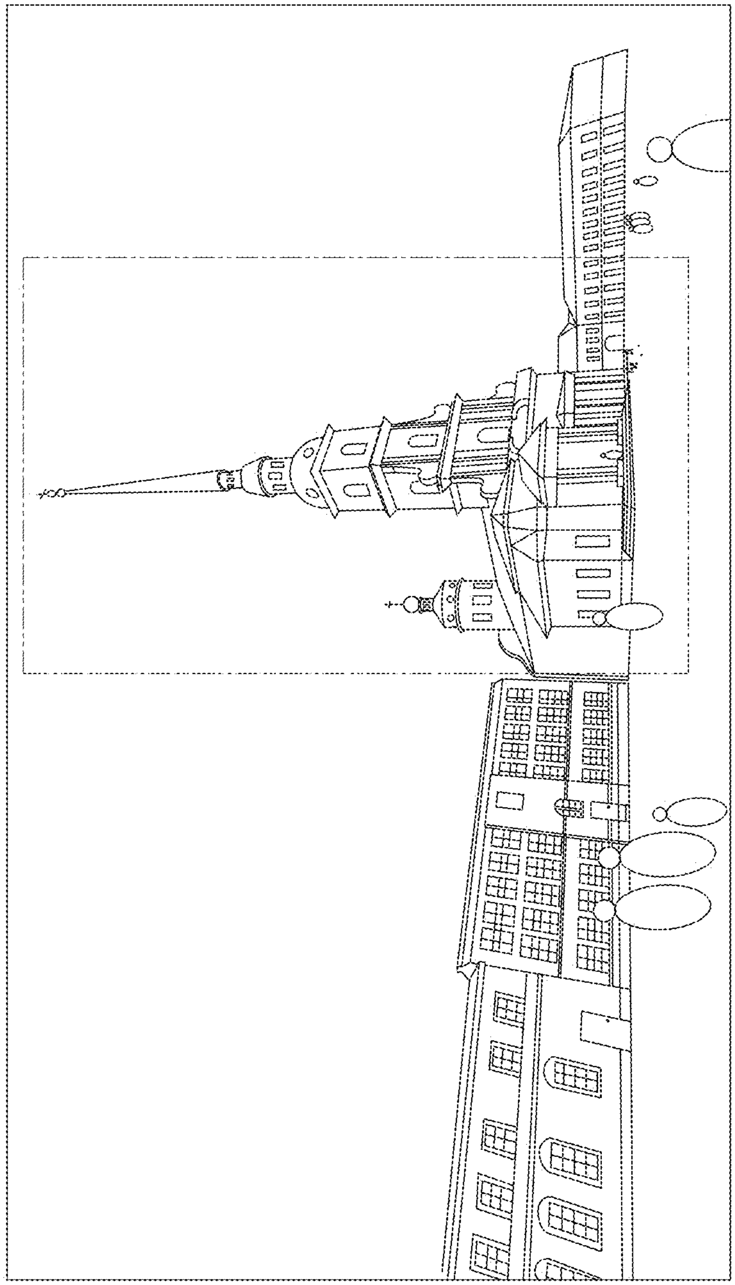
FIG. 44 shows an image captured by the electronic device in FIG. 41 with an equivalent focal length ranging between 11 mm and 14 mm.
Figure 45:
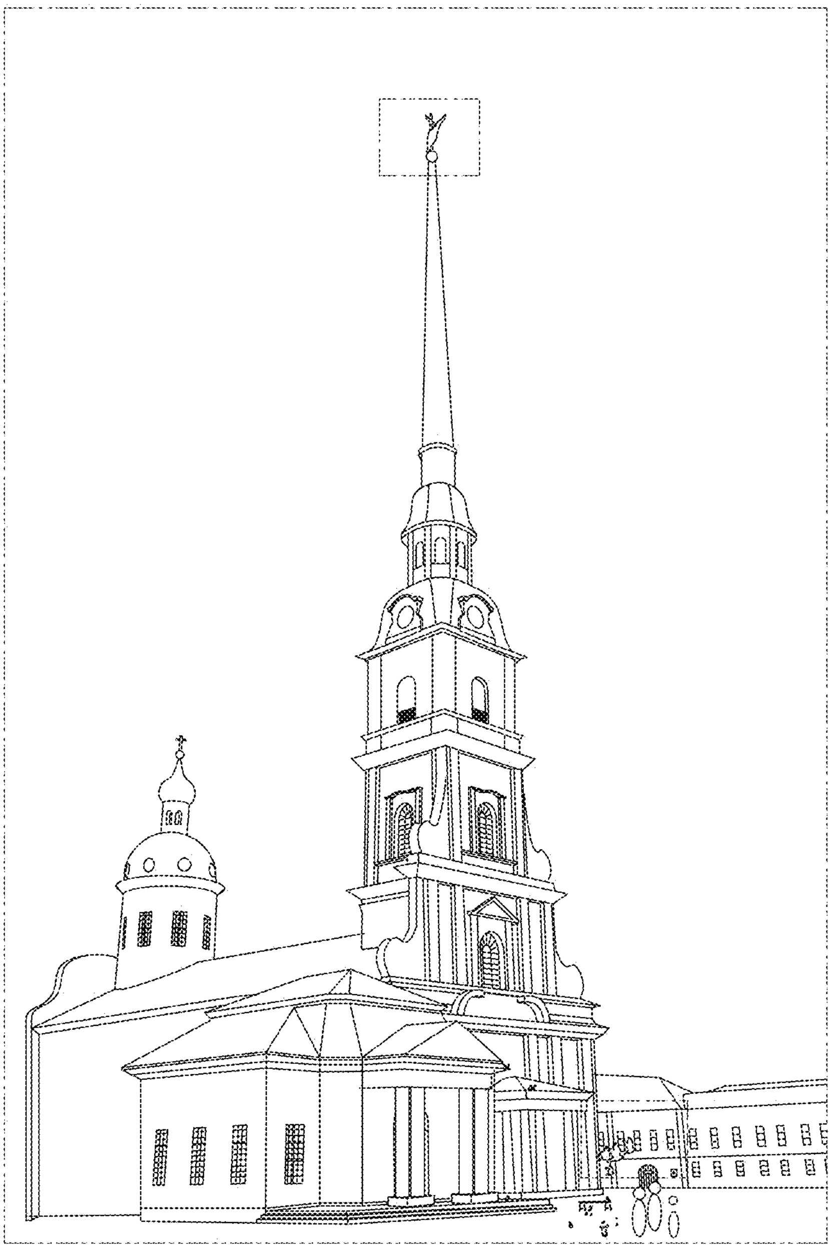
FIG. 45 shows an image captured by the electronic device in FIG. 41 with an equivalent focal length ranging between 22 mm and 30 mm.
Figure 46:
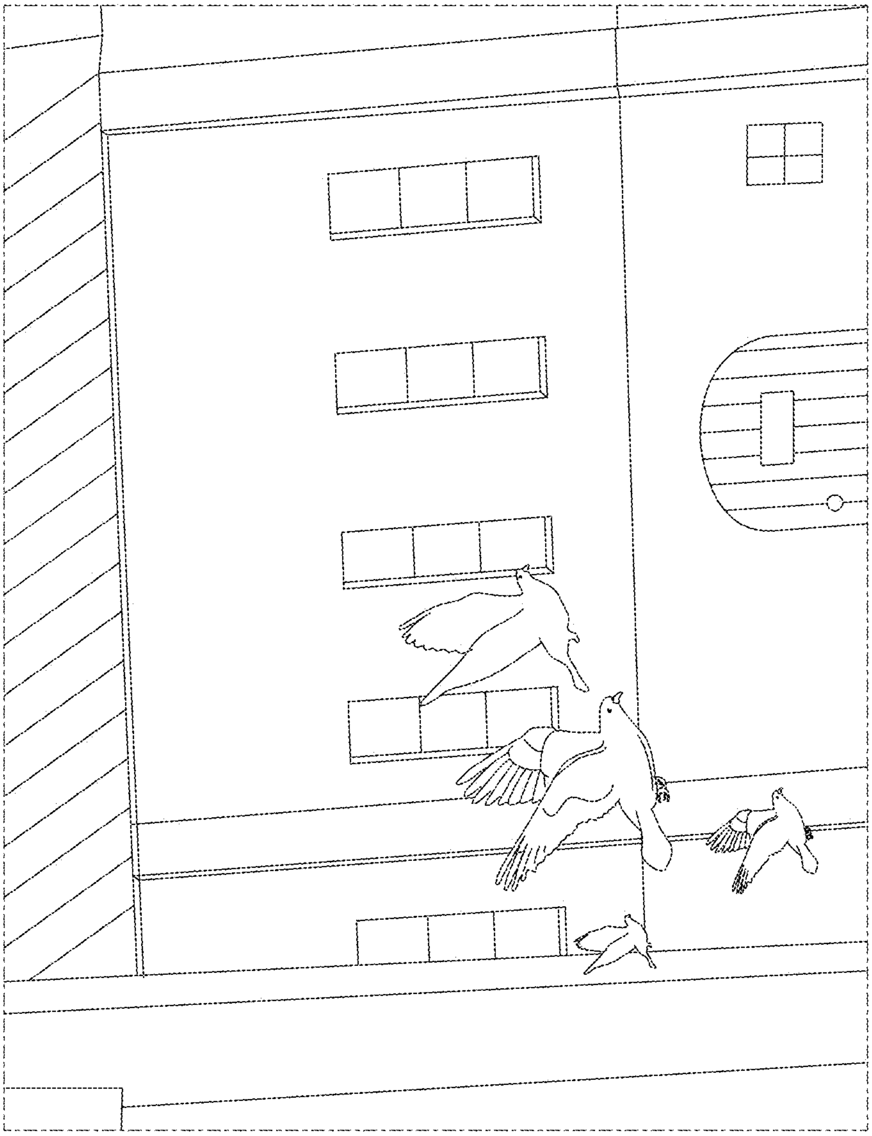
FIG. 46 shows an image captured by the electronic device in FIG. 41 with an equivalent focal length ranging between 60 mm and 300 mm.
Figure 47:
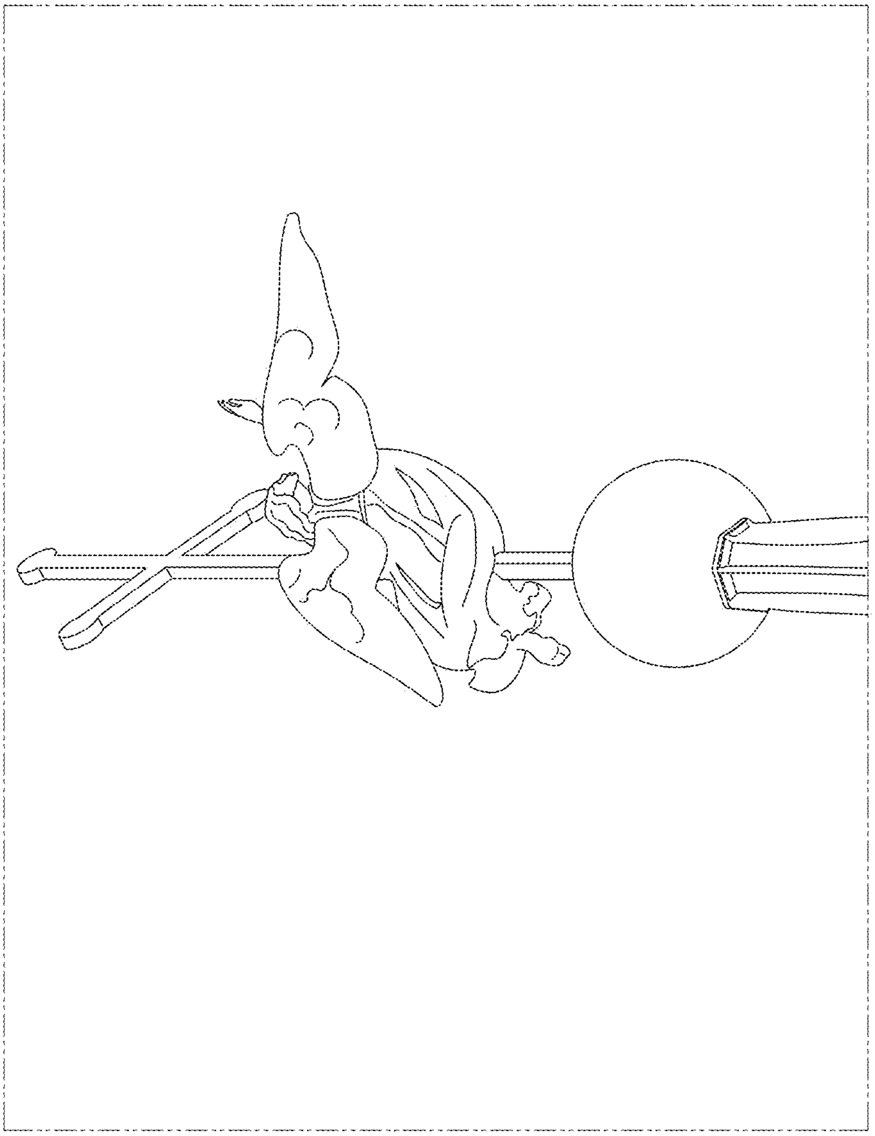
FIG. 47 shows an image captured by the electronic device in FIG. 41 with an equivalent focal length ranging between 400 mm and 600 mm.

The photographing camera 20 is an ultra-telephoto image capturing unit, the image capturing unit **4*a* is a zoom-telephoto image capturing unit, the image capturing unit 4*b* is a wide-angle image capturing unit, the image capturing unit 4*c* is an ultra-wide-angle image capturing unit, the image capturing unit 4*d* is a macro-photo image capturing unit, the image capturing unit 4*e* is an ultra-wide-angle image capturing unit, the image capturing unit 4*f* is a wide-angle image capturing unit and the image capturing unit 4*g* is a ToF (time of flight) image capturing unit. In this embodiment, the photographing camera 20, the photographing camera 4*a*, and the image capturing units 4*b*, 4*c* and 4*d* have different fields of view, such that the electronic device 4 can have various magnification ratios so as to meet the requirement of optical zoom functionality. For example, the ultra-wide-angle image capturing unit 4*c* or 4*e* with the maximum field of view ranging between 105 degrees and 125 degrees can achieve an image with an equivalent focal length between 11 mm and 14 mm. In this case, the image captured by the ultra-wide-angle image capturing unit 4*c* or 4*e* can refer to FIG. 44, which shows an image captured by the electronic device 4 with an equivalent focal length ranging between 11 mm and 14 mm, and the captured image as shown in FIG. 44 includes the whole cathedral, surrounding buildings and people on the square. The captured image as shown in FIG. 44 has a relatively large field of view and depth of view, but it often has a relatively large degree of distortion. The wide-angle image capturing unit 4*b* or 4*f* with the maximum field of view ranging between 70 degrees and 90 degrees can achieve an image with an equivalent focal length between 22 mm and 30 mm. In this case, the image captured by the wide-angle image capturing unit 4*b* or 4*f* can refer to FIG. 45, which shows an image captured by the electronic device 4 with an equivalent focal length ranging between 22 mm and 30 mm, and the captured image as shown in FIG. 45 includes the whole cathedral and people in front of the cathedral. The zoom-telephoto image capturing unit 4*a* with the maximum field of view ranging between 10 degrees and 40 degrees can achieve an image with an equivalent focal length between 60 mm and 300 mm, and the zoom-telephoto image capturing unit 4*a* can be regarded as able to provide 5× magnification. In this case, the image captured by the zoom-telephoto image capturing unit 4*a* can refer to FIG. 46, which shows an image captured by the electronic device 4 with an equivalent focal length ranging between 60 mm and 300 mm, and the captured image as shown in FIG. 46 includes the birds flying in front of the cathedral. The captured image as shown in FIG. 46 has a relatively small field of view and depth of view, and the zoom-telephoto image capturing unit 4*a* can be used for shooting moving targets. For this, the lens driving module 33 can drive the imaging lens system 31 to quickly and continuously autofocus on the target, such that the captured image of the target would not be blurred due to long focusing distance. When imaging, the zoom-telephoto image capturing unit 4*a* can further perform optical zoom for imaged objects so as to obtain images more clear. Said magnification ratio of one image capturing unit is defined as a ratio of the maximum focal length to the minimum focal length of the image capturing unit. For instance, the magnification ratio of the zoom-telephoto image capturing unit 4*a* is 5× magnification. The ultra-telephoto image capturing unit 20 with the maximum field of view ranging between 4 degrees and 8 degrees can achieve an image with an equivalent focal length between 400 mm and 600 mm. In this case, the image captured by the ultra-telephoto image capturing unit 20 can refer to FIG. 47, which shows an image captured by the electronic device 4 with an equivalent focal length ranging between 400 mm and 600 mm, and the captured image as shown in FIG. 47 includes the angel-and-cross-topped spire of the cathedral. The captured image as shown in FIG. 47 has a smaller field of view and depth of view, and the imaging lens system 21 of the ultra-telephoto image capturing unit 20 may be easier to capture an out of focus image due to slight camera shake. For this, the lens driving module 23 can provide a feedback force to correct the shake so as to achieve optical image stabilization while providing a force to drive the imaging lens system 21 of the ultra-telephoto image capturing unit 20 to focus on a target. In addition, the image capturing unit 4*g* can determine depth information of the imaged object. In this embodiment, the electronic device 4 includes multiple image capturing units (photographing cameras) 20, 4*a*, 4*b*, 4*c*, 4*d*, 4*e*, 4*f* and 4*g***, but the present disclosure is not limited to the number and arrangement of image capturing units (photographing cameras). The equivalent focal lengths to which the abovementioned image capturing units correspond are estimated values based on particular conversion functions, and the estimated values may be different from actual focal lengths of the image capturing units due to designs of the imaging lens systems and sizes of the image sensors.

When a user captures images of an object OBJ, light rays converge in the photographing camera 20, the photographing camera 4*a*, the image capturing unit 4*b*, the image capturing unit 4*c* or the image capturing unit 4*d* to generate images, and the flash module 42 is activated for light supplement. The focus assist module 43 detects the object distance of the imaged object OBJ to achieve fast auto focusing. The image signal processor 44 is configured to optimize the captured image to improve image quality. The light beam emitted from the focus assist module 43 can be either conventional infrared or laser.

In addition, the light rays may converge in the image capturing unit 4*e*, 4*f* or 4*g* to generate images. The electronic device 4 can include a reminder light 4*h* that can be illuminated to remind the user that the image capturing unit 4*e*, 4*f* or 4*g* of the electronic device 4 is working. The display module 45 can be a touch screen or a physical button 451. The user is able to interact with the display module 45 and the image software processor 46 having multiple functions to capture images and complete image processing. The image processed by the image software processor 46 can be displayed on the display module 45. The user can replay the previously captured image through an image playback button 452 of the display module 45, can choose a suitable image capturing unit for shooting through an image capturing units switching button 453 of the display module 45, and can properly adjust shooting parameters according to current shooting situations through an integrated menu button 454 of the display module 45.

Further, the electronic device 4 further includes a circuit board 47 and a plurality of electronic components 48 disposed on the circuit board 47. The image capturing units (the photographing cameras) 20, 4*a*, 4*b*, 4*c*, 4*d*, 4*e*, 4*f* and 4*g* are electrically connected to the electronic components 48 via connectors 471 on the circuit board 47. The electronic components 48 can include a signal emitting module 481 and can transmit image(s) to other electronic device or a cloud storage via the signal emitting module 481. The signal emitting module 481 can be a wireless fidelity (WiFi) module, a Bluetooth module, an infrared module, a network service module or an integrated module for transmitting various signals mentioned above, and the present disclosure is not limited thereto.

The electronic components 48 can also include a storage unit 482, a random access memory 483 for storing image information, a gyroscope 484, and a position locator 485 for facilitating the navigation or positioning of the electronic device 4. In this embodiment, the image signal processor 44, the image software processor 46 and the random access memory 483 are integrated into a single chip system 49, but the present disclosure is not limited thereto. In some other embodiments, the electronic components can also be integrated in the image capturing unit or can also be disposed on one of the circuit boards. In addition, the user can use the biometric identification device 50 to turn on and unlock the electronic device 4.

The smartphone in this embodiment is only exemplary for showing the lens driving module and the photographing camera of the present disclosure installed in an electronic device, and the present disclosure is not limited thereto. The lens driving module and the photographing camera can be optionally applied to optical systems with a movable focus. Furthermore, the photographing camera features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A lens driving module, configured to provide an imaging lens system with auto-focus functionality, the imaging lens system comprising a plurality of lens elements and a plurality of displaceable lens carriers, the plurality of lens elements arranged along an optical axis of the imaging lens system, the plurality of displaceable lens carriers being displaceable along the optical axis, and at least one of the plurality of lens elements disposed on one of the plurality of displaceable lens carriers;

wherein the lens driving module comprises a preloading element, a driving base and at least one first magnet, and the at least one first magnet is disposed on the one of the plurality of displaceable lens carriers;

wherein the preloading element comprises:

an injection molded part, comprising a plurality of mounting structures, wherein at least one rollable element is disposed in each of the plurality of mounting structures, and the at least one rollable element is in contact with the one of the plurality of displaceable lens carriers and configured to provide the one of the plurality of displaceable lens carriers with a degree of freedom in a direction parallel to the optical axis; and a ferromagnetic part, at least partially embedded in the injection molded part, wherein the ferromagnetic part and the at least one first magnet together generate a magnetic attraction force, such that the one of the plurality of displaceable lens carriers exerts a preloading force on the at least one rollable element in each of the plurality of mounting structures;

wherein the driving base comprises:

at least one driving coil, disposed corresponding to the at least one first magnet, wherein the at least one driving coil and the at least one first magnet are configured to generate a driving force so as to drive the one of the plurality of displaceable lens carriers to move along the optical axis; and an electrical wiring pattern, electrically connected to the at least one driving coil;

wherein the at least one driving coil and the at least one rollable element are located on opposite sides of the one of the plurality of displaceable lens carriers in a direction of the preloading force;

wherein the imaging lens system is disposed between the preloading element and the at least one driving coil, and the at least one driving coil and the preloading element are located on opposite sides of the one of the plurality of displaceable lens carriers in the direction of the preloading force;

wherein the at least one driving coil comprises one or more driving coils, all of the one or more driving coils are located at a same side of the one of the plurality of displaceable lens carriers in the direction of the preloading force, the at least one rollable element comprises one or more rollable elements, and all of the one or more rollable elements are located at a same side of the one of the plurality of displaceable lens carriers in the direction of the preloading force.

2. The lens driving module of claim 1, wherein the ferromagnetic part is insert-molded with the injection molded part to form the preloading element.

3. The lens driving module of claim 1, wherein the imaging lens system further comprises a fixed lens carrier fixed in the lens driving module, at least one of the plurality of lens elements is disposed on the fixed lens carrier, and the driving base and the preloading element are disposed on opposite sides of the fixed lens carrier in the direction of the preloading force;

wherein the lens driving module further comprises a carrier-mounting structure, and the fixed lens carrier is in physical contact with the carrier-mounting structure.

4. The lens driving module of claim 1, further comprising a connection frame in physical contact with the driving base and the preloading element, wherein the connection frame, the driving base and the preloading element together form an accommodation chamber, and the imaging lens system is disposed in the accommodation chamber.

5. The lens driving module of claim 1, wherein the driving base further comprises a flexible printed circuit, and the electrical wiring pattern is formed on the flexible printed circuit.

6. The lens driving module of claim 1, further comprising a magnetic field sensor disposed corresponding to the at least one first magnet, wherein the magnetic field sensor is electrically connected to the electrical wiring pattern.

7. The lens driving module of claim 1, wherein the one of the plurality of displaceable lens carriers has a certain movement range along the optical axis;

wherein the lens driving module further comprises a spacer structure disposed on the preloading element or the driving base, and the spacer structure is located adjacent to the one of the plurality of displaceable lens carriers in a direction parallel to the optical axis.

8. A photographing camera, comprising:

the lens driving module of claim 1;

the imaging lens system; and a light-folding element, disposed on an object side or an image side of the imaging lens system.

9. The photographing camera of claim 8, wherein a maximum field of view of the imaging lens system is FOV, and the following condition is satisfied:

$$5\ \text{degrees} \leq FOV \leq 50\ \text{degrees}.$$

10. The photographing camera of claim 8, wherein a maximum focal length of the imaging lens system is fmax, a minimum focal length of the imaging lens system is fmin, and the following condition is satisfied:

$$1.5 \leq f\max/f\min \leq 10.$$

11. An electronic device, comprising:

the photographing camera of claim 8; and an image sensor, disposed on an image surface of the imaging lens system.

12. A lens driving module, configured to provide an imaging lens system with auto-focus functionality, the imaging lens system comprising a plurality of lens elements and a plurality of displaceable lens carriers, the plurality of lens elements arranged along an optical axis of the imaging lens system, the plurality of displaceable lens carriers disposed along the optical axis, and at least one of the plurality of lens elements disposed on one of the plurality of displaceable lens carriers;

wherein the lens driving module comprises a preloading element, a driving base, at least one first magnet and a magnetic field sensor, the at least one first magnet is disposed on the one of the plurality of displaceable lens carriers, and the magnetic field sensor is disposed corresponding to the at least one first magnet;

wherein the preloading element comprises:

an injection molded part, comprising a plurality of mounting structures, wherein at least one rollable element is disposed in each of the plurality of mounting structures, and the at least one rollable element is in contact with the one of the plurality of displaceable lens carriers and configured to provide the one of the plurality of displaceable lens carriers with a degree of freedom in a direction parallel to the optical axis; and a ferromagnetic part, at least partially embedded in the injection molded part, wherein the ferromagnetic part and the at least one first magnet together generate a magnetic attraction force, such that the one of the plurality of displaceable lens carriers exerts a preloading force on the at least one rollable element in each of the plurality of mounting structures;

wherein the driving base comprises an electrical wiring pattern electrically connected to the magnetic field sensor;

wherein the magnetic field sensor and the at least one rollable element are located on opposite sides of the one of the plurality of displaceable lens carriers in a direction of the preloading force;

wherein the imaging lens system is disposed between the preloading element and the magnetic field sensor, and the magnetic field sensor and the preloading element are located on opposite sides of the one of the plurality of displaceable lens carriers in the direction of the preloading force;

wherein the magnetic field sensor is located at one side of the one of the plurality of displaceable lens carriers in the direction of the preloading force, the at least one rollable element comprises one or more rollable elements, and all of the one or more rollable elements are located at a same side of the one of the plurality of displaceable lens carriers in the direction of the preloading force.

13. The lens driving module of claim 12, wherein the ferromagnetic part is insert-molded with the injection molded part to form the preloading element.

14. The lens driving module of claim 12, wherein the imaging lens system further comprises a fixed lens carrier fixed in the lens driving module, at least one of the plurality of lens elements is disposed on the fixed lens carrier, and the driving base and the preloading element are disposed on opposite sides of the fixed lens carrier in the direction of the preloading force;

wherein the lens driving module further comprises a carrier-mounting structure, and the fixed lens carrier is in physical contact with the carrier-mounting structure.

15. The lens driving module of claim 12, further comprising a connection frame in physical contact with the driving base and the preloading element, wherein the connection frame, the driving base and the preloading element together form an accommodation chamber, and the imaging lens system is disposed in the accommodation chamber.

16. The lens driving module of claim 12, wherein the driving base further comprises a flexible printed circuit, and the electrical wiring pattern is formed on the flexible printed circuit.

17. The lens driving module of claim 12, wherein the one of the plurality of displaceable lens carriers has a certain movement range along the optical axis;

wherein the lens driving module further comprises a spacer structure disposed on the preloading element or the driving base, and the spacer structure is located adjacent to the one of the plurality of displaceable lens carriers in a direction parallel to the optical axis.

18. A photographing camera, comprising:

the lens driving module of claim 12;

the imaging lens system; and a light-folding element, disposed on an object side or an image side of the imaging lens system.

19. The photographing camera of claim 18, wherein a maximum field of view of the imaging lens system is FOV, and the following condition is satisfied:

$$5\text{ degrees} \leq FOV \leq 50\text{ degrees}.$$

20. The photographing camera of claim 18, wherein a maximum focal length of the imaging lens system is fmax, a minimum focal length of the imaging lens system is fmin, and the following condition is satisfied:

$$1.5 \leq f\text{max}/f\text{min} \leq 10.$$

21. An electronic device, comprising:

the photographing camera of claim 18; and an image sensor, disposed on an image surface of the imaging lens system.

* * * * *